(12) United States Patent
Iida et al.

(10) Patent No.: US 7,032,819 B2
(45) Date of Patent: *Apr. 25, 2006

(54) METHOD AND SYSTEM FOR PURCHASING PERSONAL RECORDING MEDIA

(75) Inventors: Takahito Iida, Kanagawa-ken (JP); Nicholas Givotovsky, Cornwall, CT (US)

(73) Assignee: Dentsu, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/899,179

(22) Filed: Jul. 26, 2004

(65) Prior Publication Data

US 2005/0001025 A1     Jan. 6, 2005

Related U.S. Application Data

(63) Continuation of application No. 10/241,971, filed on Sep. 11, 2002, now Pat. No. 6,766,946, which is a continuation-in-part of application No. 09/655,655, filed on Sep. 5, 2000, now abandoned, which is a continuation-in-part of application No. 09/108,879, filed on Jul. 1, 1998, now Pat. No. 6,209,787, which is a continuation-in-part of application No. 08/991,235, filed on Dec. 16, 1997, now Pat. No. 5,900,608.

(30) Foreign Application Priority Data

Oct. 16, 1997 (JP) .................................. 9-284084

(51) Int. Cl.
*G06F 7/08* (2006.01)
(52) U.S. Cl. ...................................................... 235/381
(58) Field of Classification Search ................ 235/381, 235/380, 379, 375, 449, 493, 382, 382.5; 902/30, 35

See application file for complete search history.

(56) References Cited

U.S. PATENT DOCUMENTS

| 3,718,906 A | 2/1973 | Lightner |
| 3,947,882 A | 3/1976 | Lightner |
| 3,990,710 A | 11/1976 | Hughes |

(Continued)

FOREIGN PATENT DOCUMENTS

| EP | 0 649 121 B1 | 4/1995 |

(Continued)

OTHER PUBLICATIONS

"The Net is Alive With The Sound of Music," Tech Web, Ian Scott Gertler, Oct. 30, 1997.

(Continued)

*Primary Examiner*—Thien M. Le
(74) *Attorney, Agent, or Firm*—Davidson Davidson & Kappel, LLC

(57) ABSTRACT

A system for purchasing a personal recording media includes a first station for converting at least one data composition and a data information corresponding thereto to predetermined signals and for transmitting the signals, and a receiving device for receiving the signals and for enabling a user to sense the data composition transmitted The data information corresponding to the data composition being transmitted is selectively stored, by a predetermined operation by a user, either into a storage device of a card-type storage medium when the card-type storage medium is attached to the receiving device or into a storage device in a second station including the receiving device. A desired musical composition can be recorded into a recording medium, either at the second station or at a third station, based upon the data information stored in the card-type storage medium or in the storage device of the second station, and accounting and royalty processes are implemented.

71 Claims, 53 Drawing Sheets

U.S. PATENT DOCUMENTS

| | | | |
|---|---|---|---|
| 4,114,029 A * | 9/1978 | Lee | 235/449 |
| 4,141,045 A | 2/1979 | Sheehan | |
| 4,396,886 A * | 8/1983 | Koester et al. | 324/212 |
| 4,674,055 A | 6/1987 | Ogaki et al. | |
| 4,703,465 A | 10/1987 | Parker | |
| 4,811,325 A | 3/1989 | Sharples, Jr. et al. | |
| 4,884,698 A * | 12/1989 | Tutamune et al. | 209/534 |
| 4,937,807 A | 6/1990 | Weitz et al. | |
| 5,041,921 A | 8/1991 | Scheffler | |
| 5,166,676 A | 11/1992 | Milheiser | |
| 5,237,157 A | 8/1993 | Kaplan | |
| 5,392,351 A | 2/1995 | Hasebe et al. | |
| 5,408,630 A | 4/1995 | Moss | |
| 5,418,654 A | 5/1995 | Scheffler | |
| 5,418,713 A | 5/1995 | Allen | |
| 5,418,763 A | 5/1995 | Ichikawa et al. | |
| 5,445,295 A | 8/1995 | Brown | |
| 5,491,471 A | 2/1996 | Stobbe | |
| 5,502,601 A | 3/1996 | Scheffler | |
| 5,513,116 A | 4/1996 | Buckley et al. | |
| 5,561,604 A | 10/1996 | Buckley et al. | |
| 5,592,511 A | 1/1997 | Schoen et al. | |
| 5,600,114 A * | 2/1997 | Dunlap et al. | 235/379 |
| 5,633,839 A | 5/1997 | Alexander et al. | |
| 5,641,092 A | 6/1997 | Scott | |
| 5,654,746 A | 8/1997 | McMullan, Jr. et al. | |
| 5,734,719 A | 3/1998 | Tsevdos et al. | |
| 5,740,134 A | 4/1998 | Peterson | |
| 5,900,608 A * | 5/1999 | Iida | 235/381 |
| 6,070,141 A | 5/2000 | Houvener et al. | |
| 6,209,787 B1 * | 4/2001 | Iida | 235/381 |
| 6,766,946 B1 * | 7/2004 | Iida et al. | 235/381 |
| 2001/0035980 A1 | 11/2001 | Kawabata | |
| 2002/0023059 A1 | 2/2002 | Bari et al. | |
| 2002/0049907 A1 | 4/2002 | Woods et al. | |
| 2003/0088520 A1 | 5/2003 | Bohrer et al. | |
| 2005/0001025 A1 * | 1/2005 | Iida et al. | 235/381 |

FOREIGN PATENT DOCUMENTS

| | | |
|---|---|---|
| JP | 09-214935 | 8/1997 |
| JP | 092043784 A | 8/1997 |
| KR | 1995-0012253 | 5/1995 |

OTHER PUBLICATIONS

"DVS Synchrome Will Unveil Four New CD-R Drives at COMDEX: Ideal for Making Custom Music CDs, Multimedia CD-ROMS," Business Wire, Oct. 21, 1997.

"New Venture Aims to Combat Discounters' Deary Selections," Billboard Publications, Ed Christman, Mar. 8, 1997.

"Polygram, Capitol/EMI, Warner and MCA Grant Music Rights to Technical Maintenance Corporation," Business Wire, Jan. 20, 1997.

"Network Music Announces Private Label Division," Network Music, Inc., Jan. 1996.

"Network Music Introduces Promotional Music Series," Network Music, Inc., Jul. 1996.

"Buying Sound Effects CDs on the Internet," Gefen Systems, 1997.

"PPL and MCPS Create New Database," Music Week, Jan. 17, 1998.

"Billboard's Music Database Now An Internet Freebie," The Times Union (Albany, NY), Jan. 28, 199.

\* cited by examiner

FIG. 12

INDEX A JAPANESE MUSIC

| | |
|---|---|
| TITLE OF MUSICAL COMPOSITION | RED SWEETPEA |
| MINUTES OF MUSICSAL COMPOSITION | 5MINUTES 21SECONDS |
| ARTIST | SEIKO MATSUDA |
| SONG WRITER | KARUHO KURETA |
| MUSICAL COMPOSER | KARUHO KURETA |
| MANUFACTURED DATE | 1982.7.1 |
| REPRESENTATIVE COUNTRY OF ORIGINAL DISK | JAPAN |
| REPRESENTATIVE COMPANY OF ORIGINAL DISK | SONY MUSIC (JAPAN) |
| OPTION I | (WORDS) |
| OPTION II | (MUSIC SCORE) |

FIG. 13

INDEX B WESTERN MUSIC

TITLE OF MUSICAL COMPOSITION                    YESTERDAY
MINUTES OF MUSICSAL COMPOSITION                 4MINUTES 50SECONDS
ARTIST                                          BEATLES
SONG WRITER                                     JOHN LENON
MUSICAL COMPOSER                                PAUL MCCARTNEY
MANUFACTURED DATE                               1968.7.1
REPRESENTATIVE COUNTRY OF ORIGINAL DISK         ENGLAND
REPRESENTATIVE COMPANY OF ORIGINAL DISK         APPLE
OPTION I                                        (WORDS)
OPTION II                                       (MUSIC SCORE)

FIG. 16
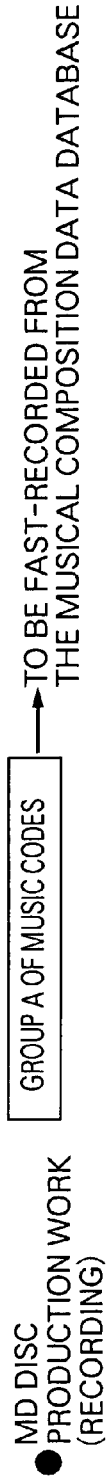
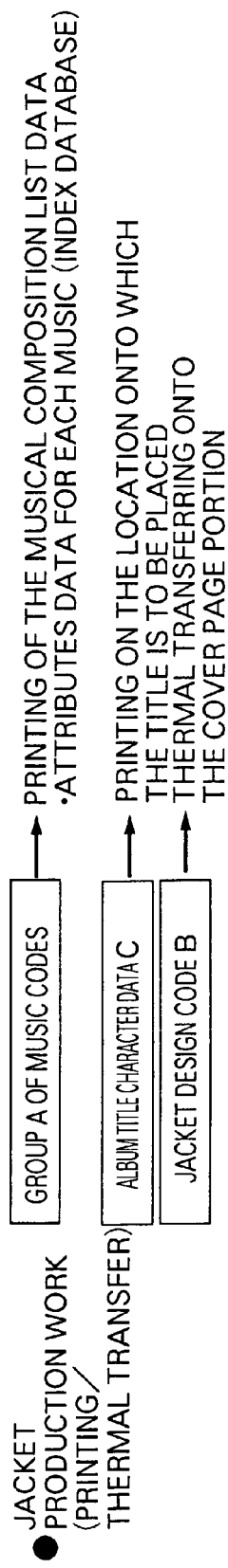
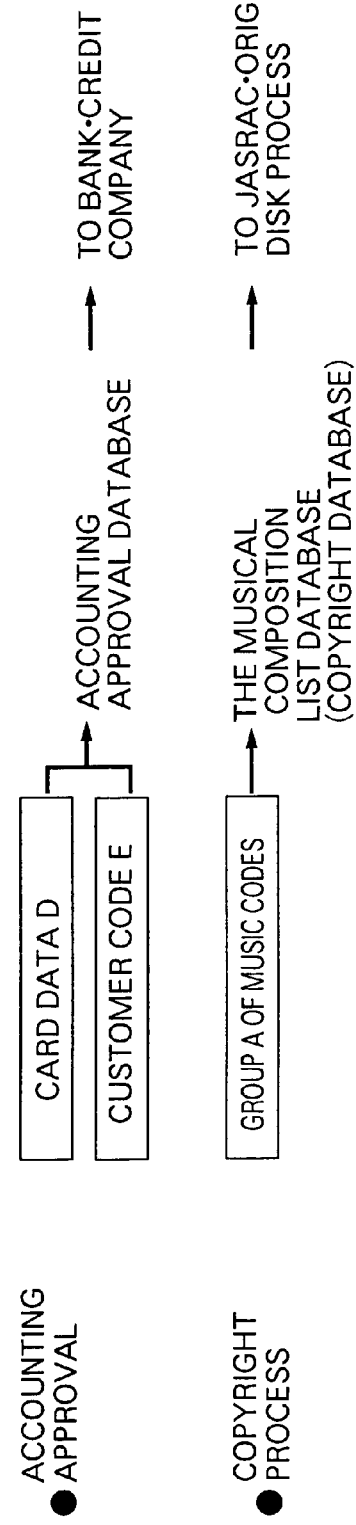

For Identifying ISRC

A: Genre of Titles
    A-1. Title of Musical Composition
    A-2. Title of Western Music
    A-3. Title of Modern Japanese Music
    A-4. Other B: Genre of Personal Names
    B-1. Name(s) of Artist(s)
    B-2. Name(s) of Songwriter(s)
    B-3. Name(s) of Musical Composer(s)
    B-4. Name(s) of Musical Arranger(s)
    B-5. Other C: Genre of Corporations
    C-1. Name(s) of Recording Company(ies)
    C-2. Name(s) of Publisher(s)
    C-3. Name(s) of Entertainment Production(s)
    C-4. Other D: Genre of Organizations
    D-1. JASRAC (Japan)
    D-2. BMI (U.S.A.)
    D-3. ASCAP (U.S.A.)
    D-4. MCPS (U.K.)
    D-5. SDRM (France)
    D-6. Other E: Date of Production
    E-1. Year
    E-2. Month
    E-3. Day

Fig. 36

Permission File

Music Code
- ISRC

Audition
- A1. Business Use
  - A1-1. Full Chorus
  - A1-2. One Chorus
  - A1-3. 45 Seconds
  - A1-4. 60 Seconds
- A2. Personal Use
  - A2-1 Full Chorus
  - A2-2 One Chorus
  - A2-3 45 Seconds
  - A2-4 60 Seconds

Purchase of Musical Composition
- B1. Business Use
- B2. Personal Use
  - B2-1. Juke Box
  - B2-2. CD
  - B2-3. MD
  - B2-4. CD-R (downloaded)
  - B2-5. MD-R (downloaded)
  - B2-6. DVD-R (downloaded)
  - B2-7. PC

Purchase of Music Score(s)
- C1. Business Use
  - C1-1. Purchasing scores as data on the network
  - C1-2. Applying on the network, purchasing hard copies
- C2. Personal Use
  - C2-1. Purchasing scores as data on the network
  - C2-2. Applying on the network, purchasing hard copies

Purchase of MIDI Data
- D1. Business Use
  - D1-1. Purchasing as data on the network
- D2. Personal Use
  - D2-1. Purchasing as data on the network

Application for Performance
- E1. Business Use
  - E1-1. Pro artist or musician applications for live performances
- E2. Personal Use
  - E2-1. Amateur artist or musician applications for live performances

Broadcasting Use of Musical Compositions
- F1. Business Use
  - F1-1. Broadcasting Programs for Radio
  - F1-2. Broadcasting for TV Stations

Synchronization
- G1. Business Use
  - G1-1. Movie Images
  - G1-2. TV Images
  - G1-3. Video-gram Images
  - G1-4. Video Game Images
  - G1-5. CM Images

Application for Alterations
- H1. Business Use
  - H1-1. Permission for usage of existing sound source sampling
  - H1-2. Permission when producing cover music of an existing musical composition

Fig. 38

Charging Rate & Fee File

ISRC

Ratio of the Original Disc: the Copyright

1. Ratio Within the Original Disc
   Initial Original Disc: Common Original Disc
   Original Disc Owner: Licensee
   Individual: Company: Organization
   Production Royalty Rate
   Main Artist Royalty Rate
   Sub-main Artist Royalty Rate 2. Ratio Within the Copyright
   Songwriter: Composer: Arranger: Publisher
   Publisher: Common Publishers
   OP: FSP: SP
   Individual: Company: Organization
   Organization: Organization

Fig. 39

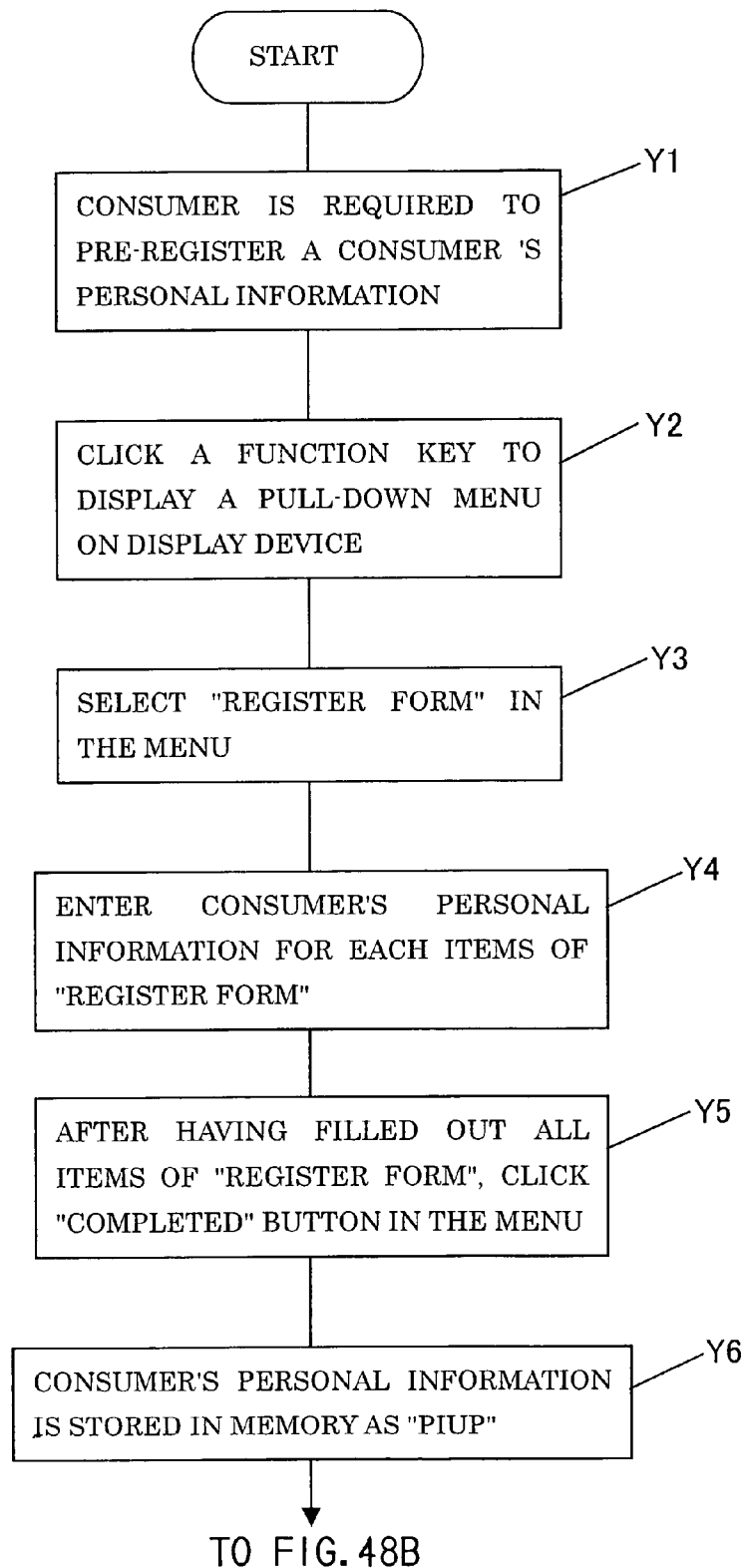

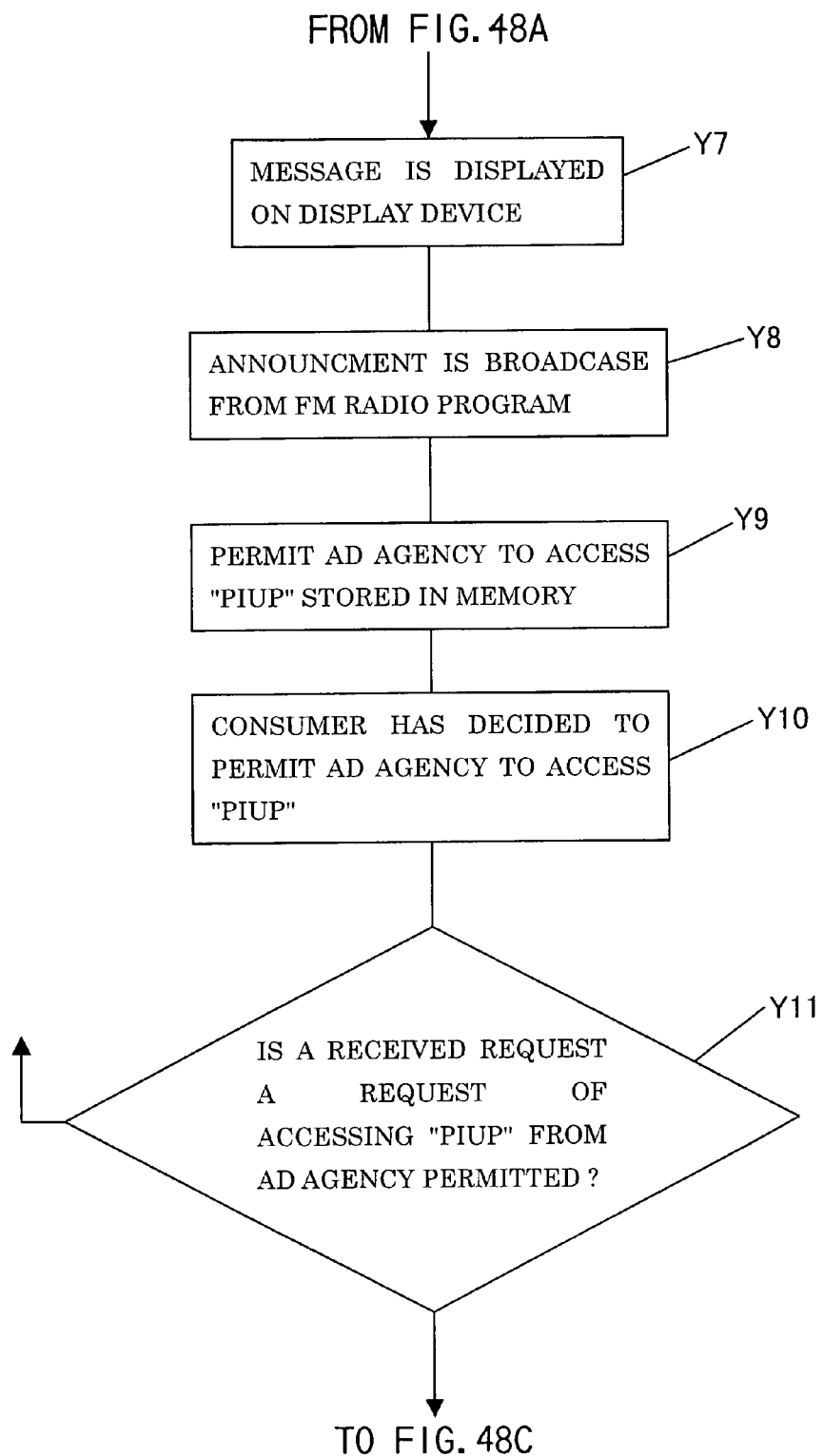

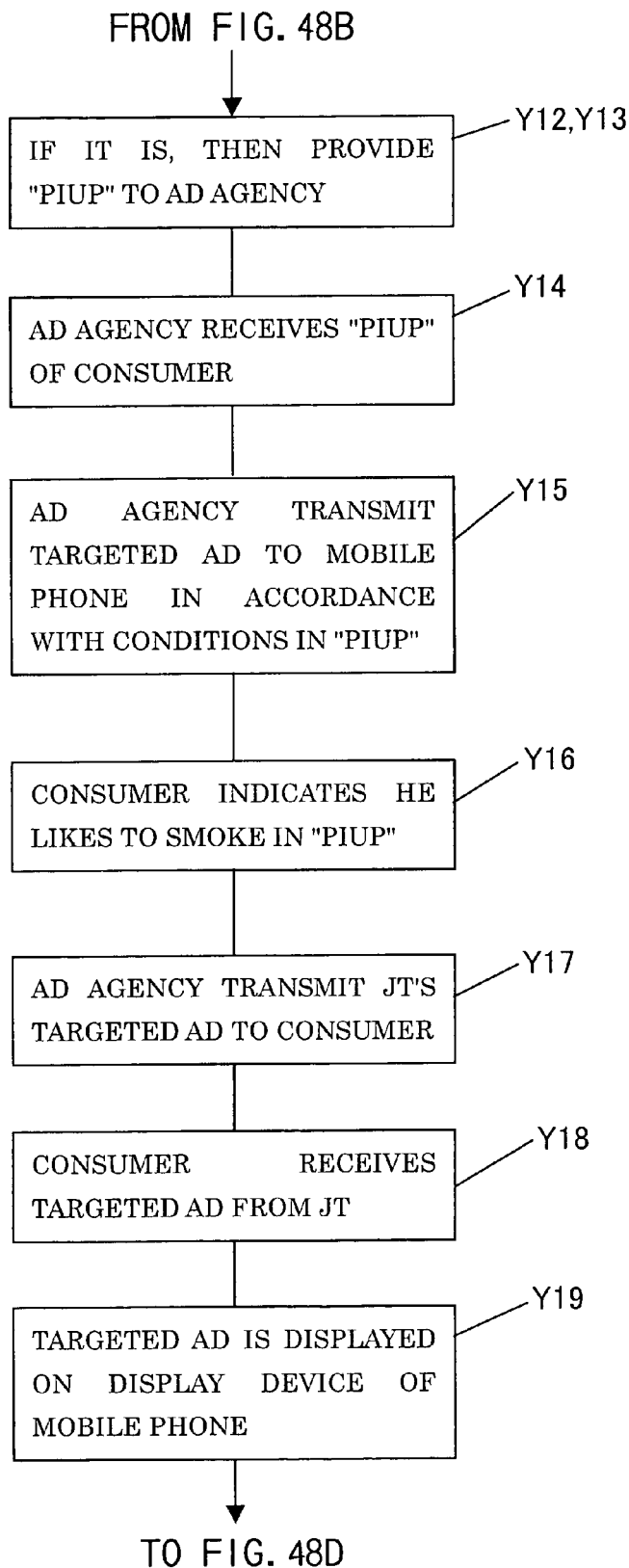

METHOD AND SYSTEM FOR PURCHASING PERSONAL RECORDING MEDIA

CROSS REFERENCE TO RELATED APPLICATIONS

This application is a Continuation of U.S. patent application Ser. No. 10/241,971, filed Sep. 11, 2002, now U.S. Pat. No. 6,766,946 which is a Continuation-In-Part of U.S. patent application Ser. No. 09/655,655 filed on Sep. 5, 2000 and now abandoned, which is a Continuation-In-Part of U.S. patent application Ser. No. 09/108,879, filed Jul. 1, 1998 and now U.S. Pat. No. 6,209,787, which is a Continuation-In-Part of U.S. patent application Ser. No. 08/991,235, filed Dec. 16, 1997 and now U.S. Pat. No. 5,900,608, the disclosures of all of which are incorporated herein in there entireties.

BACKGROUND OF THE INVENTION

1. Field of the Invention

The present invention relates to a system for purchasing a personal recording media, and more particularly to a system capable of searching one or more musical compositions, editing the searched musical compositions, and purchasing a recording media such as CD, MD, cassette tape and the like into which the edited musical compositions are inserted.

2. Description of Related Art

In general, a customer can produce an original compilation recording media which is unique to the customer by renting or purchasing a MD, CD, cassette tape and the like, selecting the customer's favorite musical compositions by utilizing a reproducing/recording apparatus such as a CD player/recorder, a cassette deck and the like, and editing and recording the selected musical compositions into recording media such as a MD, CD, or cassette tape in the customer's preferred order.

For example, even for musical compositions by a single musician or artist, it is rare that all personally favorite musical compositions are recorded in just one album such as an MD, CD, or cassette tape. Accordingly, when the customer desires to produce a personally original compilation recording media such as an album composed of only the customer's personally favorite musical compositions, the customer has to purchase or rent a plurality of MDs, CDs, cassette tapes and the like, and then select, edit, and then record personally favorite musical compositions using reproducing/editing/recording storage apparatus in such a manner that a few musical compositions are selected from one album, more musical compositions are selected from another album and further musical compositions are selected from another album.

Similarly, when the customer desires to produce an album composed of musical compositions by a plurality of musicians or artists, a plurality of albums by each of the musicians or artists have to be purchased or rent, and then the desired personally original compilation recording media must be produced by using the reproducing/editing/recording storage apparatus.

In the above mentioned conventional methods, there is a problem, such that when a customer desires to produce an original compilation recording media, the customer has to purchase or rent a plurality of MDs, CDs, cassette tapes and the like, and then select, edit, and then record personally favorite musical compositions from them using reproducing/editing/recording storage apparatus, and as a result, it would be more costly than purchasing one MD, CD, cassette tape and the like having those personally favorite musical compositions, and also it would take time for reproducing/editing/recording.

Further, there is another problem, such that because a customer freely produces a personally original compilation recording media by copying the musical compositions from a plurality of MDs, CDs, cassette tapes and the like, without concern for the existence of the copyrights of the musical compositions, the copyright owners can not collect royalties for the copyrights regarding their own musical compositions, and as a result, no return has been provided for the music industries as well as for the musical composers.

In the view point of their strategies in businesses, the businesses such as the advertising agencies, broadcasting companies, Internet Service Providers (ISPs), mobile-phone ISPs, and the like, who deal with the customers directly or indirectly, are targeting the personal information of the customers for use in their businesses. As a result, the personal information of the consumers is quite valuable as one of the marketing tools.

However, there are problems in dealing with the personal information of customers.

Remarkably, the acquisition of personal information from the customers by business agencies generates some legal problems such as privacy problems. Because of their values, once they have acquired the personal information of the customers, many business agencies attempt to re-use or to re-distribute the acquired personal information of the customers for other purposes and/or for other agencies in the Internet without notifying the customers of the re-uses and/or re-distributions of the personal information.

In this regard, some customers claim that their privacy is infringed by the business agencies because their personal information are re-used and/or re-distributed without the customer's consent.

Therefore, there needs to be a privacy permission scheme for providing a customer with an access control of his personal information in order to permit an appropriate use or distribution of the customer's personal information while protecting inappropriate use or distribution of the customer's personal information by business agencies and/or third parties.

SUMMARY OF THE INVENTION

It is another object of the present invention to provide a system and method for purchasing a personal recording media for arbitrarily selecting or designating a customer's favorite musicians or artists, arbitrarily selecting or designating musical compositions by selected musicians or artists, and purchasing a personally original compilation recording media composed of the selected or designated musical compositions.

It is still another object of the present invention to provide a recording media of recording a personal recording media purchasing program for arbitrarily selecting or designating a customer's favorite musicians or artists, arbitrarily selecting or designating musical compositions by the selected musicians or artists, and purchasing a personally original compilation recording media composed of the selected or designated musical compositions.

It is another object of the present invention to provide a system and method for purchasing a personal recording media for automatically collecting royalties for copyrights and the like regarding musical compositions incorporated into recording media at a time when a customer purchases a personally original compilation recording media, and for implementing the return and the like concerning the use of the musical compositions for the copyrighters and the like.

It is still another object of the present invention to provide a recording media of recording a personal recording media purchasing program for automatically collecting royalties for copyrights and the like regarding the musical compositions incorporated into recording media at a time when a customer purchases a personally original compilation recording media, and for implementing the return and the like concerning the use of the musical compositions for the copyrighters and the like.

It is an object of the present invention to provide a system and method for providing a customer with an access control of his personal information in order to permit an appropriate use or distribution of the customer's personal information while protecting an inappropriate use or distribution of the customer's personal information by business agencies and/or third parties.

It is yet another object of the present invention to provide a system and method for providing a right holder with an access control of the content(s) created by the right holder in order to permit an appropriate use or distribution of the right holder's content(s) while protecting an inappropriate use or distribution of the right holder's content(s) by business agencies and/or third parties, and for providing a customer with an access control of his personal information in order to permit an appropriate use or distribution of the customer's personal information while protecting an inappropriate use or distribution of the customer's personal information by business agencies and/or third parties.

The objects of the present invention can be achieved by a system for purchasing a personal recording media, comprising:
  a first entering unit for entering identification information in order to identify a customer;
  a unit connected to the first entering unit for identifying whether or not the customer is an authorized customer based on the entered identification information;
  a second entering unit connected to the identifying unit for entering at least one designated information by the customer when the customer is identified as an authorized customer in accordance with the identifying unit;
  a unit for storing a plurality of information;
  a unit connected to the second entering unit and the information storing unit for reading information associated with the designated information by retrieving the plurality of information in the information storing unit based on the designated information entered by the second entering unit; and
  a unit connected to the information reading unit for recording the information read from the information storing unit into a predetermined recording media.

Preferably, a system for purchasing a personal recording media according to the present invention further includes unit for implementing a predetermined accounting process regarding the recording media into which the information has been recorded.

Another object of the present invention can be achieved by a system for purchasing a personal recording media, comprising:
  a first station, including
  a first entering unit for entering identification information in order to identify a customer;
  a second entering unit for entering at least one designated information by the customer when the customer is identified as an authorized customer;
  a second station, including
  a unit connected to the first station for identifying whether or not the customer is an authorized customer based on the identification information entered by the first entering unit;
  a unit for storing a plurality of information;
  a unit for reading information associated with the designated information by retrieving the plurality of information in the information storing unit based on the designated information entered by the second entering unit;
  a unit connected to the information reading unit for recording the information read from the information storing unit into a predetermined recording media; and
  a unit for implementing a predetermined accounting process regarding the recording media into which the information has been recorded,
  wherein, the customer can purchase the recording media at the first station in such a manner that the recording media consisting of the information corresponding to an arbitrary number of the designated information entered from the second entering unit by the customer at the first station is produced at the second station, and then the produced recording media is delivered to the first station.

Preferably, the first station further includes
  a unit for storing a specific information consisting of a part of the plurality of information stored in the information storing unit at the second station; and
  a unit for retrieving the specific information storing unit based on the designated information entered from the second entering unit by the customer and for displaying, to the customer, the specific information associated with the designated information entered.

Yet another object of the present invention can be achieved by a system for purchasing a personal recording media, comprising:
  a first station, including
  a first entering unit for entering identification information in order to identify a customer;
  a second entering unit for entering at least one designated information by the customer when the customer is identified as an authorized customer;
  a first information storing unit for storing a plurality of information;
  a information recording unit for recording information associated with the designated information by retrieving the plurality of information of the first information storing unit based on the designated information entered from the second entering unit;
  a second station, including
  a unit connected to the first station for identifying whether or not the customer is an authorized customer based on the identification information entered by the first entering unit;
  a second information storing unit for storing a plurality of information corresponding to the plurality of information stored in the first storing unit;
  a unit for implementing a predetermined accounting process regarding the recording media into which the information has been recorded;
  a third station, connected to the first station and the second station, respectively, including
  a latest information storing unit for storing the latest information,
  wherein, the first station and the second station update the plurality of information stored in the first information storing unit and the second information storing unit, respectively, based on the latest information stored in the latest information storing unit, wherein the customer can purchase the recording media at the first station in such a manner that the recording media consisting of an arbitrary number of the information is produced at the first station based on the designated information entered by the customer at the first station.

Preferably, the plurality of information stored in the first information storing unit and the plurality of information stored in the second information storing unit are musical composition information which includes information concerning a musical composition list, a musical composition data, an index and a copyright.

Still another object of the present invention can be achieved by a system for purchasing a personal recording media, comprising:

a first station, including a first entering unit for entering identification information in order to identify a customer;

a second entering unit for entering at least one designated information by the customer when the customer is identified as an authorized customer;

a second station, including a unit connected to the first station for identifying whether or not the customer is an authorized customer based on the identification information entered by the first entering unit;

an information storing unit for storing a plurality of information;

a unit for reading the information associated with the designated information by retrieving the plurality of information in the information storing unit based on the designated information entered from the second entering unit;

information recording unit connected to the information reading unit for recording the information read from the information storing unit into a predetermined recording media;

a unit for implementing a predetermined accounting process regarding the recording media into which the information has been recorded;

a third station, connected to the first station and the second station, respectively, including a latest information storing unit for storing the latest information, wherein, the first station and the second station update the plurality of information stored in the information storing unit in the second station based on the latest information stored in the latest information storing unit, as necessary, wherein the customer can purchase the recording media at the first station in such a manner that the recording media consisting of an arbitrary number of the information is produced at the second station, based on the designated information entered by the customer at the first station, and then the produced recording media is delivered to the first station.

It is preferable that the first station further include a unit for storing specific information consisting of a part of the plurality of information stored in the information storing unit at the second station; and a unit for retrieving the specific information storing unit based on the designated information entered from the second entering unit by the customer and for displaying, to the customer, the specific information associated with the designated information entered.

The information storing unit is preferably a musical composition information storing unit, and the plurality of information stored therein are a plurality of musical composition information which includes information concerning a musical composition list, a musical composition data, an index and a copyright.

The musical composition information storing unit is preferably a database having an accumulatable specification which unifies the music, and is constituted by digitizing and unifying a sound source, MIDI data, music score data, and right attribution data.

Further preferably, the musical composition information storing unit includes five categories of a music attribution, an original disc right, a copyright, a music score, and a sound source.

More preferably, the information storing unit is a video information storing unit, and the plurality of information are a plurality of video information which includes information regarding video data, sound data, an index, and a copyright.

It is preferable that the information storing unit is a program storing unit, and the plurality of information are a plurality of program information which includes information regarding a plurality of programs, an index, and a copyright.

Another object of the present invention can be achieved by a method of purchasing a personal recording media, with which a customer can purchase the recording media composed of an arbitrary number of desired information, comprising the steps of:

entering identification information in order to identify a customer;

identifying whether or not the customer is an authorized customer based on the entered identification information;

entering at least one designated piece of information by the customer when the customer is identified as an authorized customer in accordance with a result of the identifying;

reading information associated with the designated information by retrieving a database which includes a plurality of information based on the designated information entered;

storing the read information into a predetermined recording media; and implementing a predetermined accounting process regarding the recording media into which the information is recorded.

Preferably, the plurality of information is the musical composition information which includes information concerning a musical composition list, musical composition data, an index and a copyright.

Further preferably, the plurality of information is a plurality of video information which includes information regarding video data, sound data, an index, and a copyright.

More preferably, the plurality of information is a plurality of program information which includes information regarding a plurality of software programs, an index, and a copyright.

Further objects of the present invention can be achieved by a recording media having a program for purchasing a personal recording media, with which a customer can purchase the recording media composed of an arbitrary number of desired information, the program comprising the steps of:

entering identification information in order to identify a customer;

identifying whether or not the customer is an authorized customer based on the entered identification information;

entering at least one piece of designated information by the customer when the customer is identified as an authorized customer in accordance with a result of the identifying;

reading information associated with the designated information by retrieving a database which includes a plurality of information based on the designated information entered;

storing the read information into a predetermined recording media; and implementing a predetermined accounting process regarding the recording media into which the information is recorded.

Preferably, the plurality of information is the musical composition information which includes information concerning a musical composition list, musical composition data, an index and a copyright.

Further preferably, the plurality of information is a plurality of video information which includes information regarding video data, sound data, an index, and a copyright.

More preferably, the plurality of information is a plurality of program information which includes information regarding a plurality of software programs, an index, and a copyright.

The video data is preferably motion picture data, television program data or a commercial program data.

The plurality of information is preferably a plurality of image information which includes information regarding a graphic data, a sound data, an index, and a copyright.

More preferably, the video information storing unit is a Digital Versatile Disc (DVD) or a video cassette tape (VCT).

The system for purchasing a personal recording media according to the present invention is capable of arbitrarily selecting or designating the customer's favorite musicians or artists, arbitrarily selecting or designating the musical compositions by the selected musicians or artists, and purchasing a personally original compilation recording media composed of the selected or designated musical compositions.

Furthermore, the system for purchasing a personal recording media according to the present invention is capable of automatically collecting the royalty for the copyrights and the like regarding the musical compositions incorporated into the recording media at a time when a customer purchases a personally original compilation recording media, and is also capable of implementing the return and the like concerning the use of the musical compositions for the copyright holders and the like.

The object of the present invention can be achieved by a system for granting access at least one content in a library of contents, the system including:
a) a memory for storing the library of contents;
b) a data input device for entering a set of information attributes for the contents stored in the memory and for entering an identification of a user using the system;
c) a data retriever for retrieving a particular content in the library of contents in accordance with said entered information attributes, if the user is permitted to access said particular content in accordance with the entered identification;
d) an output device for providing said retrieved content to the user; and
e) a collecting/updating device for collecting/updating the contents of the library of contents.

Preferably, the library of contents includes contents that can be put to a practical use as a database by periodically collecting/updating, using the collecting/updating device.

More preferably, the library of contents is a library of music and related information thereof, a library of printed matters, including books, magazines, newspapers or any type of journals, a library of broadcasting information to be used in the broadcasting industries, including a TV station, a radio station and a satellite station, a library of software programs, including video game software programs and/or any kinds of software programs, and/or a library of motion pictures and/or still pictures.

Another object of the present invention can be achieved by a system for granting access to selected of a library of multimedia, including:
a) a memory for storing the library of multimedia;
b) a data input device for entering a set of information attributes for the multimedia stored in the memory;
c) a data retriever for retrieving information about a particular medium of the library in accordance with the entered attribute; and
d) an output device for providing the retrieved information.

Preferably, the library of multimedia is a library of music, a library of printed matter, including books, magazines, newspapers and any type of journals, and/or a library of broadcasting information to be used in the broadcasting industries, including a TV station, a radio station and a satellite station.

Another object of the present invention can be achieved by a system for accessing information related to a musical composition, including:
a) a data input device operable by a user for entering information as to the class of the current user and a candidate musical composition to be accessed;
b) a memory for storing a library of the musical compositions and a set of information items related to at least selected of the stored musical compositions;
c) a display for displaying to the current user selected information related to the candidate musical composition;
d) a processor coupled to the data input device and the memory for performing the following operations on the candidate musical composition related information:
 1) evaluating the class of the current user and the candidate musical composition and, dependent thereon, displaying on the display those information items corresponding to the entered class of the current user from the particular set of information items of the entered candidate musical composition,
 2) permitting the current user to select at least one of the displayed information items for further processing, and
 3) further processing the selected information items.

Preferably, the information items stored in the memory includes intellectual property rights and the further processing calculates the fees due in relation to the entered candidate musical composition and the entered user class.

More preferably, the information items stored in the memory includes permission to access information, and the further processing determines based upon the permission to access information and the user class which, if any, information pertaining to the selected candidate musical composition will be accessible to the current user.

The object of the present invention can be achieved by a method of permitting access by a plurality of class of users to an information system to select and obtain permission to access a particular musical composition from a library of musical compositions for a particular one of a plurality of uses, the information system storing information as to the identity of, the accessible rights to each musical composition in the library, license fees associated with each of the rights, and the claimants of each of the rights, includes the steps of:
   a) permitting a user to activate the information system by inputting an indication of at least the class of the current user and the identity of a candidate musical composition;
   b) identifying from the user input the class of the current user;
   c) retrieving from the information system dependent on the identified class of the current user and the candidate musical composition the availability of the musical composition in the information system and a set of potentially permitted uses selected according to the identified class;
   d) displaying to the user an indication of whether or not the musical composition is available in the information system and, if available, the selected set of potentially permitted uses of the available candidate musical composition;
   e) permitting the user to select a particular use from the displayed set of uses;
   f) accessing from the information system whether or not the selected use is permitted for the identified candidate musical composition and, if the selected use is permitted, retrieving from the information system dependent on the selected use information as to the license fee and claimant related to the selected use; and
   g) processing the license fee with respect to the selected claimant.

Preferably, the identified use as determined in step (b) is claimant, permitting the claimant to alter the license fee information, and processing the altered information to update the content of the information system.

More preferably, there is further included the steps of displaying to the current user the altered information, and permitting the claimant to confirm whether or not the altered information is appropriate and, if appropriate, terminating the processing step (g).

Another object of the present invention can be achieved by a system for purchasing a personal recording media, including:
   a) a first station for converting at least one musical composition and a musical information corresponding to the one musical composition to predetermined signals, respectively, and for transmitting the signals;
   b) a card-type storage medium including a storage device and an integrated circuit;
   c) a receiving device capable of attaching/detaching the card-type storage medium, and of listening to a musical composition by receiving said signal transmitted from the first station, and of selectively storing the musical information corresponding to the musical composition being transmitted into the storage device of the card-type storage medium by a predetermined operation when the card-type storage medium is attached thereto;
   d) a second station including an entering device capable of attaching/detaching the card-type storage medium into which the musical information is stored, and of reading an identification information stored in the storage device of the card-type storage medium when the card-type storage is attached thereto, and of reading the musical information stored in the storage device of the card-type storage medium;
   e) a third station connected to the second station and capable of;
      1) identifying whether or not a user of the system is an authorized user based on the identification information,
      2) reading the musical composition information associated with the musical information by retrieving the plurality of musical composition information in the musical composition information storage means based on the musical information entered with the entering means,
      3) recording the musical composition information read from the musical composition information storage means into a predetermined recording medium, and
      4) implementing a predetermined accounting process based on an accounting information stored in the card-type storage medium, regarding the recording medium into which the musical composition information is recorded,
   wherein a musical information corresponding to the musical composition is stored into the card-type storage medium by a predetermined operation when a user is listening a musical composition being transmitted from the first station, and
   the user can purchase the recording medium into which at least one desired musical composition is recorded, by inserting the card-type storage medium of which the musical information is stored therein into a predetermined entering means at the second station.

Preferably, the third station includes:
   1) an identification means for identifying whether or not the user is an authorized user based on the identification information entered with the entering means of the second station;
   2) a musical composition information storage means for storing a plurality of musical composition information;
   3) a musical composition information reading means for reading the musical composition information associated with the musical information by retrieving the plurality of musical composition information in the musical composition information storage means based on the musical information entered with the entering means;
   4) a musical information recording means connected to the musical composition information reading means, for recording the musical composition information read from the musical composition information storage means into a predetermined recording medium; and
   5) means for implementing a predetermined accounting process based on accounting information stored in the cart-type storage medium regarding the recording medium into which the musical composition information is recorded.

More preferably, the system of the present invention further includes:
   f) a copyright-associated information storage means for storing information associated with a copyright;
   g) an input/output means for inputting/outputting the musical composition information;
   h) a musical composition information registration means for registering and storing the musical composition information inputted with the input/output means into the musical composition information storage means;
   i) a copyright-associated information retrieval and discrimination means for retrieving and discriminating a copyright-associated information regarding the musical composition information registered in the musical composition information registration means from the copyright-associated information storage means based on a musical composition to be used;

j) an account and royalty determination means for determining an account for a user of the musical composition and for determining a royalty for a copyright owner of the musical composition based on the copyright-associated information and the accounting information discriminated by the copyright-associated information retrieval and discrimination means; and k) means for informing the account determined by the account and royalty determination means to the user of the musical composition, and for informing the royalty determined by the account and royalty determination means to the copyright owner of the musical composition.

Preferably, the system of the present invention further includes:

l) a usage purpose registration means for registering an information regarding a usage purpose of the musical composition to be used; and m) an account information alteration means for altering the account information based on information regarding the usage purpose of musical composition registered with the usage purpose registration means.

More preferably, the system of the present invention further includes:

n) a copyright-associated information alteration means connected to the entering means and to the copyright-associated information storage means, for altering the copyright-associated information based on the information of musical composition to be used.

The card-type storage medium including a storage device and an integrated circuit is preferably a smart card. The receiving device is preferably a smart card radio receiver.

The object of the present invention can be achieved by a system for accessing information related to a musical composition, including:

a) a data input device operable by a user for entering an indication as to the current user and a candidate musical composition to be accessed;

b) a memory for storing a library of the musical compositions and a set of information items related to at least selected of the stored musical compositions, wherein the set of information items includes a set of permitted uses for each of the stored musical compositions;

c) a display for displaying to the current user selected information related to the candidate musical composition;

d) a processor coupled to the data input device and the memory for performing the following operations relating to the candidate musical composition related information:

1) evaluating the current user indication and the candidate musical composition and displaying on the display those information items including at least the permitted uses from the particular set of information items of the entered candidate musical composition, 2) permitting the current user to select at least one of the displayed information items for further processing and to input one or more of the current user's desired uses of the musical composition, and 3) further processing the selected information items.

Preferably, the set of permitted uses stored in the memory includes permission to access information related to selective ones of the set of possible uses of the musical composition information, and the further processing determines based upon the permission to access information and the user's desired use selection which information, if any, pertaining to the selected candidate musical composition will be accessible to the current user.

More preferably, the set of possible uses of the musical composition information includes play, copy, transmit, and distribute, wherein possible forms of transmit include surface, cable, internet or satellite, and wherein possible forms of medium for copy include stream, local-HDD, flash memory, stick memory or MD.

Another object of the present invention can be achieved by a method of permitting access by a plurality of users to an information system to select and obtain permission to access a particular musical composition from a library musical compositions for a particular one of a plurality of possible uses, the information system storing information as to the identity of and the accessible rights to each musical composition in the library, a set of permitted potential uses and license fees associated with each of the rights, and the claimants of each of the rights, includes the steps of:

a) permitting a user to activate the information system by inputting an indication of the current user and the identity of a candidate musical composition;

b) retrieving from the information system at least the candidate musical composition and the set of permitted potential uses associated with each accessible right to the selected musical composition;

c) displaying to the user an indication of whether or not the musical composition is available in the information system and, if available, the set of permitted potential uses of the available candidate musical composition;

d) permitting the user to input one or more of the user's desired uses;

e) accessing from the information system whether or not each of the user's inputted desired uses is permitted for said identified candidate musical composition and, if one or more of said desired uses is permitted, retrieving from the information system, dependent on the selected desired use, information as to the license fee and claimant related to the selected desired use; and f) processing the license fee with respect to the selected claimant.

Preferably, the step of permitting the user to activate includes allowing the user to input the one or more desired use selections only from among the displayed set of permitted potential uses of the available candidate musical composition.

More preferably, the set of permitted potential uses of the musical composition information includes play, copy, transmit and distribute, wherein possible forms of transmit include surface, cable, internet or satellite, and possible forms of medium for copy include stream, local-HDD, flash memory, stick memory or MD.

Further preferably, the method of permitting access of the present invention further includes the step of granting the user access to the musical composition information only for the one or more of the inputted desired uses that is permitted for that musical composition.

Another object of the present invention can be achieved by a system for granting access to selected of a library of multimedia, including:

a) a memory for storing the library of multimedia;

b) a data input device for entering a set of attributes for the multimedia stored in the memory;

c) a data retriever for retrieving information about a particular medium of the library in accordance with the entered set of attributes;

d) an update device for updating the retrieved information about the particular medium of the library, if necessary; and e) an output device for providing the retrieved information or the updated information.

Preferably, the update device is only operable by at least one claimant of each of the rights associated with the particular medium of the library.

More preferably, the system for granting access of the present invention further includes:

f) an interactive device for interacting a user of the system with at least one claimant of each of the rights associated with the particular medium of the library, wherein the update device updates the retrieved information in accordance with a result of an interaction of the user and the claimant or claimants, and the output device provides the updated information.

More preferably, the library of multimedia includes at least one of a library of music, a library of printed matter, and a library of broadcasting information to be used in the broadcasting industries. Further preferably, the printed matter includes books, magazines, newspapers and any types of journals, and wherein the broadcasting industries include a TV station, a radio station and a satellite station.

Another object of the present invention can be achieved by a system for accessing information related to a musical composition, including:

a) a data input device operable by a user for entering information as to a class of the current user and a candidate musical composition to be accessed;

b) a memory for storing a library of the musical compositions and a set of information items related to at least selected of the stored musical compositions, the set of information items stored in the memory including at least intellectual property rights information and permission to access information;

c) a display device for displaying to the current user selected information related to the candidate musical composition;

d) a processor coupled to the data input device and the memory for performing the following operations on the selected information related to the candidate musical composition:

1) evaluating the class of the current user and the candidate musical composition and, dependent thereon, displaying on the display device the information items corresponding to the entered class of the current user from the particular set of information items of the entered candidate musical composition, 2) permitting the current user to select at least one of the displayed information items for further processing, and 3) further processing the selected information items to calculate the fees due in relation to the entered candidate musical composition and the entered user class, and to determine, based upon the permission to access information and the user class, which information, if any, pertaining to the selected candidate musical composition will be accessible to the current user, and e) an update device for updating the set of information items stored in the memory, if necessary, the update device being only operable by a claimant or claimants of each of the intellectual property rights associated with the selected of the stored musical compositions.

Preferably, the system for accessing information related to a musical composition of the present invention further includes f) an interactive device for interacting a user of the system with at least one claimant of each of the intellectual property rights associated with the selected of the stored musical compositions, and wherein the update device updates the set of information items stored in the memory in accordance with a result of an interaction of the user and the claimant or claimants.

The object of the present invention can be achieved by a method of permitting access by a plurality of class of users to an information system to select and obtain permission to access a particular musical composition from a library of musical compositions for a particular one of a plurality of uses, the information system storing information as to the identity of each musical composition in the library, the accessible rights to each musical composition in the library, license fees associated with each of the rights, and the claimants of each of the rights, including the steps of:

a) permitting a user to activate the information system by inputting an indication of at least a class of a current user and an identity of a candidate musical composition;

b) identifying the class of the current user from the inputted indication and identifying the candidate musical composition from the inputted identity;

c) retrieving from the information system an availability of the identified candidate musical composition in the information system and a set of potentially permitted uses of the identified candidate musical composition in accordance with the identified class of the current user, d) displaying to the current user an indication of whether or not the identified candidate musical composition is available in the information system and, if available, displaying to the current user the selected set of potentially permitted uses of the candidate musical composition;

e) permitting the current user to select a particular use from the selected set of potentially permitted uses displayed;

f) accessing from the information system whether or not the selected particular use is permitted for the identified candidate musical composition;

g) if the selected particular use is permitted, retrieving information of a license fee and at least one claimant regarding the identified candidate musical composition from the information system in accordance with the selected particular use, and h) processing the license fee with respect to the claimant or claimants regarding the identified candidate musical composition, i) permitting the alteration of the information of the license fee and the selected set of potentially permitted uses of the identified candidate musical composition when the identified current user as determined in the step (b) is the at least one claimant regarding the identified candidate musical composition;

j) processing the altered information to update the content of the information system; and k) displaying to the current user the altered information, and permitting at least one claimant to confirm whether or not the altered information is appropriate and, if appropriate, terminating the processing in the step (g).

The above described object of the present invention can be achieved by a system for purchasing a personal recording media, including:

a) a first station for converting at least one musical composition and a musical information corresponding to the one musical composition to predetermined signals, respectively, and for transmitting the signals;

b) a card-type storage medium including a storage device and an integrated circuit;

c) a receiving device capable of attaching/detaching the card-type storage medium, and of listening to a musical composition by receiving the signals transmitted from the first station, and of selectively storing the musical information corresponding to the musical composition being transmitted into the storage device of the card-type storage medium by predetermined operation when the card-type storage medium is attached thereto;

d) a second station including an entering device capable of attaching/detaching the card-type storage medium into which the musical information is stored, and of reading an identification information stored in the storage device of the card-type storage medium when the card-type storage is attached thereto, and of reading the musical information stored in the storage device of the card-type storage medium;

e) a third station connected to the second station and capable of:
1) identifying whether or not a user of the system is an authorized user based on the identification information,
2) reading the musical composition information associated with the musical information by retrieving the plurality of musical composition information in the musical composition information storage means based on the musical information entered with the entering means,
3) recording the musical composition information read from the musical composition information storage means into a predetermined recording medium, and
4) implementing a predetermined accounting process based on an accounting information stored in the card-type storage medium, in regard with the recording medium into which the musical composition information is recorded, f) a copyright-associated information storage means for storing a copyright-associated information regarding the musical composition information;

g) an input/output means for inputting/outputting the musical composition information;

h) a musical composition information registration means for registering and storing the musical composition information inputted with the input/output means into the musical composition information storage means;

i) a copyright-associated information retrieval and discrimination means for retrieving and discriminating a copyright-associated information regarding the musical composition information registered in the musical composition information registration means from the copyright-associated information storage means based on a musical composition to be used;

j) an account and royalty determination means for determining an account for a user of the musical composition and for determining a royalty for a copyright claimant of the musical composition based on the copyright-associated information and the accounting information discriminated by the copyright-associated information retrieval and discrimination means;

k) means for informing the account determined by the account and royalty determination means to the user of the musical composition;

l) means for informing the royalty determined by the account and royalty determination means to the copyright claimant of the musical composition;

m) a usage purpose registration means for registering information regarding a usage purpose of the musical composition to be used;

n) an account information alteration means for altering the account information based on an information regarding the usage purpose of musical composition registered with the usage purpose registration means; and o) a copyright-associated information alteration means connected to the entering means and to the copyright-associated information storage means, for altering the copyright-associated information based on the information of musical composition to be used, wherein musical information corresponding to the musical composition is stored into the card-type storage medium by a predetermined operation when user is listening to a musical composition being transmitted from the first station, wherein the user can purchase the recording medium into which at least one desired musical composition is recorded, by inserting the card-type storage medium of which the musical information is stored therein into a predetermined entering means at the second station, and wherein the copyright-associated information alteration means is only operable by a rightful claimant or claimants when altering the copyright-associated information.

Preferably, the third station includes:
1) an identification means for identifying whether or not the user is an authorized user based on the identification information entered with the entering means of the second station;
2) a musical composition information storage means for storing a plurality of musical composition information;
3) a musical composition information reading means for reading the musical composition information associated with the musical information by retrieving the plurality of musical composition information in the musical composition information storage means based on the musical information entered with the entering means;
4) a musical information recording means connected to the musical composition information reading means, for recording the musical composition information read from the musical composition information storage means into a predetermined recording medium; and
5) means for implementing a predetermined accounting process based on accounting information stored in the cart-type storage medium regarding the recording medium into which the musical composition information is recorded.

More preferably, the card-type storage medium is a smart card. Further preferably, the receiving device is a smart card radio receiver.

The above-mentioned object of the present invention can be achieved by a system for granting permission of a user's personal information to a third party, which includes:

a terminal means for entering a personal information of a user and a permission information indicating at least one permissible use of the personal information of the user by a third party, for storing the personal information and the permission information entered, for receiving from the third party an item in accordance with the permission information stored therein from the third party; and an information management means electrically connected to the terminal means for managing the personal information and the permission information stored in the terminal means, for evaluating the personal information stored therein in accordance with the permission information stored therein if an access to the personal information is requested from the third party, and for providing to the third party the requested personal information if the access to the requested personal information is permissible in accordance with a result of the evaluation.

Preferably, in the system for granting permission of a user's personal information to a third party, the terminal means includes:
a) a data input device operable by the user for entering the personal information of the user and the permission information indicating at least one permissible use of the personal information by the third party;
b) a memory electrically connected to the data input device for storing the personal information and the permission information entered from the data input device; and
c) a receiving device for receiving from the third party an item in accordance with the permission information stored in the memory as a consequence of permitting said access to the personal information requested from the third party.

More preferably, in the system for granting permission of a user's personal information to a third party, the item is an advertisement and/or the latest information of a product and/or a service pertinent to the personal information of the user.

In the system for granting permission of a user's personal information to a third party, the terminal means further includes
d) an interactive device for interacting the user with the third party associated with the advertisement and/or the latest information,
wherein the interactive device is operable by the user for ordering the product and/or the service to the third party, preferably.

In the system for granting permission of a user's personal information to a third party, the terminal means further includes
e) a display device electrically connected to both the data input device and the receiving device for displaying the information entered from the data input device, the advertisement and/or the latest information received by the receiving device.

In the system for granting permission of a user's personal information to a third party, the receiving device is further capable of listening to a musical composition by receiving signals transmitted from a broadcasting station,
wherein the broadcasting station is configured to convert at least one musical composition and musical information associated with the musical composition to corresponding signals, respectively and for transmitting the signals.

In the system for granting permission of a user's personal information to a third party, the receiving device is further capable of selectively storing a musical information associated with the musical composition being transmitted from the broadcasting station into the memory by a predetermined operation.

Preferably, in the system for granting permission of a user's personal information to a third party, the receiving device is further capable of receiving a content selected by the user from a library of multimedia.

More preferably, in the system for granting permission of a user's personal information to a third party, the library of multimedia is any one of or a combination of two or more of:
a) a library of music;
b) a library of printed matters, the printed matter including books, magazines, newspapers, any types of journals;
c) a library of computer programming codes, the computer programming codes including open source codes and/or closed source codes to be used for producing a computer program;
d) a library of movies; and
e) a library of animations.

Further preferably, in the system for granting permission of a user's personal information to a third party, the interactive device is further capable of interacting the user with the third party associated with the content selected by the user from the library of multimedia.

In the system for granting permission of a user's personal information to a third party, the display device is further capable of displaying the content received by the receiving device.

The above-mentioned object of the present invention can be achieved by a system for granting permission of a user's personal information to a third party, the information management means includes:
a) a request receiving device for receiving from the third party a request of accessing to the personal information stored in the memory;
b) an evaluation device for evaluating whether or not the request of accessing to the personal information from the third party is permissible in accordance with the permission information stored in the memory;
c) an output device for providing to the third party the requested personal information in accordance with the result of the evaluation performed by the evaluation device; and
d) an update device for updating the permission information stored in the memory if it is desirable by the user.

Preferably, in the system for granting permission of a user's personal information to a third party, the update device is also capable of updating the personal information stored in the memory if it is desirable by the user. More preferably, in the system for granting permission of a user's personal information to a third party, the update device is configured to be only operable by the user.

The system for granting permission of a user's personal information to a third party further includes:
a sub-system for granting access to selected of the library of multimedia, including:
a) a memory for storing the library of multimedia and content permission information associated with each content in the library of multimedia;
b) a data input device for entering a set of attributes for the multimedia stored in the memory;
c) a data retriever for retrieving information about a particular medium of the library in accordance with the entered set of attributes;

d) an update device for updating the retrieved information about the particular medium of the library, if necessary; and e) an output device for providing the retrieved information or the updated information if it were updated in accordance with the content permission information.

Preferably, in the system for granting permission of a user's personal information to a third party, the update device in the sub-system is capable of updating the content permission information stored in the memory.

More preferably, in the system for granting permission of a user's personal information to a third party, the update device in the sub-system is configured to be only operable by at least one claimant of each of rights associated with a particular content of the library of multimedia.

Further preferably, in the system for granting permission of a user's personal information to a third party, the library is any one of or a combination of two or more of:

a) a library of music;

b) a library of printed matters, the printed matter including books, magazines, newspapers, any types of journals;

c) a library of computer programming codes, the computer programming codes including open source codes and/or closed source codes to be used for producing a computer program;

d) a library of movies; and e) a library of animations.

In the system for granting permission of a user's personal information to a third party, the personal information includes:

a) fixed personal information, the fixed personal information including a name, a date of birth, and a gender of the user; and b) variable personal information, the variable personal information including an age, an occupation, a status of marriage, a dependent (if applicable), an annual income, and a preference of the user.

In the system for granting permission of a user's personal information to a third party, the personal information further includes c) dynamically generated personal usage information including both granular and aggregated service usage activity data generated by the user through interaction with systems and services.

In the system for granting permission of a user's personal information to a third party, the permission information is a Privacy Information Use Permission (PIUP), wherein the PIUP includes:

a) permitted privacy information described with privacy information identification (ID);

b) permitted relations described with a user ID and a trader ID; and c) permitted conditions described with user permission codes.

In the system for granting permission of a user's personal information to a third party, the content permission information according to the present invention is Content Use Permission (CUP), wherein the CUP includes:

a) permitted content described with content identification (ID);

b) permitted relation described with right holder ID, trader ID and consumer ID; and c) permitted conditions described with content permission codes.

The permitted conditions according to the present invention include intellectual property rights associated with the permitted content.

In the system for granting permission of a user's personal information to a third party, the system is configure in any form of a mobile phone, a PDA, a notebook type computer, or a desktop type computer.

In the system for granting permission of a user's personal information to a third party, the terminal means is a mobile phone, and the information management means is a control processor installed in the mobile phone.

In the system for granting permission of a user's personal information to a third party, the terminal means is a mobile phone, the information management means is a control processor installed in the mobile phone, and the subsystem is a content management device.

The above mentioned features of the system according to the present invention could be also equally applicable to the method and the media according to the present invention as well.

BRIEF DESCRIPTION OF THE DRAWINGS

The above and other objects of the invention will be apparent upon consideration of the following detailed description, taken in conjunction with the accompanying drawings, in which the reference characters refer to like parts throughout and in which:

FIG. 12 is a diagram showing one example of the index database which composes one portion of the music database of the system for purchasing a personal recording media shown in FIG. 11;

FIG. 13 is a diagram showing another example of the index database which composes one portion of the music database of the system for purchasing a personal recording media shown in FIG. 11;

FIG. 16 is an illustrative diagram of another portion of the operation of the system for purchasing a personal recording media according to the present invention shown in FIG. 14;

FIG. 36 is a diagram showing a display menu on the display monitor of the system shown in FIG. 34;

FIG. 38 is a diagram showing one example of the content of the Permission File to be used for the system of the present system;

FIG. 39 is a diagram showing one example of the content of the Charging Rate & Fee File to be used for the system of the present system;

FIGS. 48A, 48B, 48C and 48D, each of Figures is a diagram illustrating the processes performed by the system shown in FIG. 62.

DESCRIPTION OF THE PREFERRED EMBODIMENTS

In the following, referring to the accompanying drawings, the preferred embodiments of the system for purchasing a personal recording media according to the present invention will be described in detail.

Figure 1:
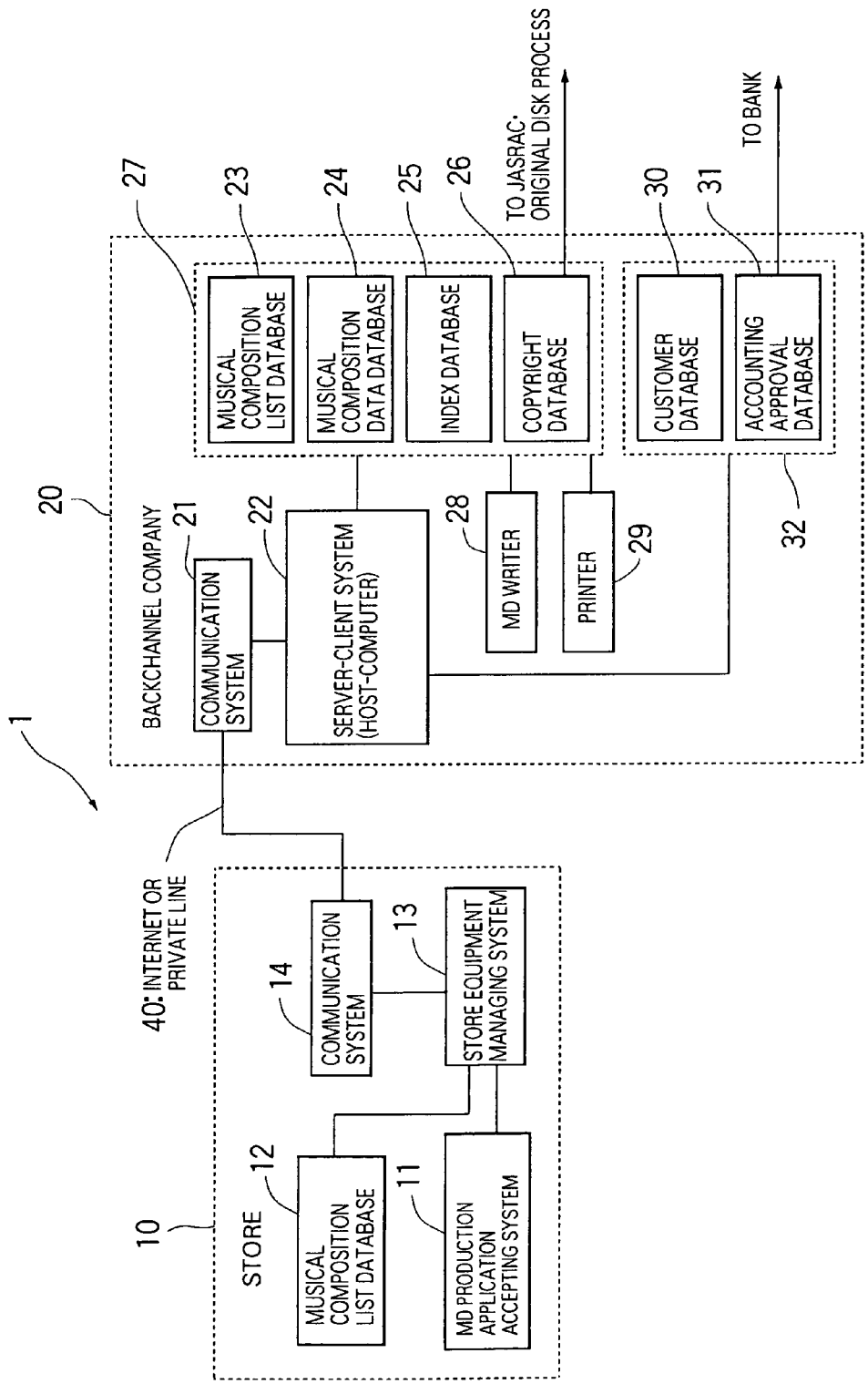
FIG. 1 is a schematic diagram showing a first embodiment of the system for purchasing a personal recording media according to the present invention.

FIG. 1 is a schematic diagram showing a first embodiment of the system for purchasing a personal recording media (hereinafter referred to as "a purchasing system") according to the present invention.

As shown in FIG. 1, the main parts of the purchasing system in this embodiment are composed of a store 10, that is a KIOSK such as a convenience store or a gasoline station and the like which will be easily accessed by a customer, and a backchannel company 20. Store 10 is connected with backchannel company 20 using an internet or a private line (leased line) 40. The store 10 includes a MD production application accepting system 11 (hereinafter referred to as the "AAS") which is composed of a monitor, a card reader, and a database retrieval/application terminal (not shown), a musical composition database 12 connected to the AAS 11, a store equipment managing system 13 connected to both the AAS 11 and the musical composition database 12, and a communication system 14 connected to the store equipment managing system 13.

The backchannel company 20 includes a communication system 21 connected to the communication system 14 of the store 10 via a telephone or an internet line 40 and the like; a server-client system (hereinafter referred to as the "host-computer") 22 connected to the communication system 21; a music database 27 connected to the host-computer 22 and including a musical composition list database 23, a musical composition data database 24, an index database 25 as well as a copyright database 26; a MD writer 28 connected to the music database 27; a printer 29 connected to the music database 27; and a company side database 32 connected to the host-computer 22 and including a customer database 30 as well as an accounting approval database 31.

In the following, by referring to FIGS. 2 to 9, an operation of the purchasing system shown in FIG. 1 will be described.

1-1. Membership Recognition Step

Figure 2:
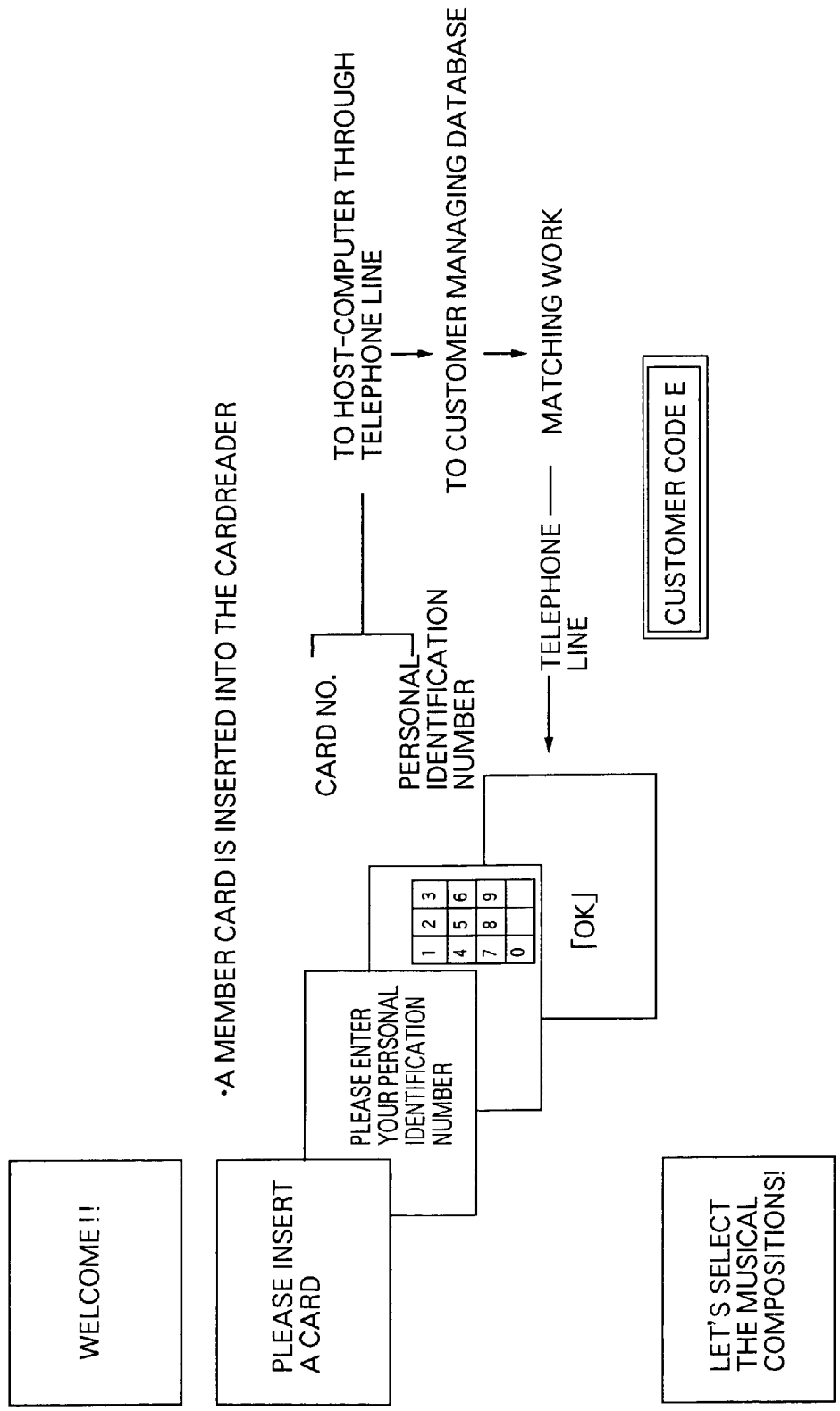
FIG. 2 is an illustrative diagram of one portion of the operation of the system for purchasing a personal recording media according to the present invention.
Figure 3:
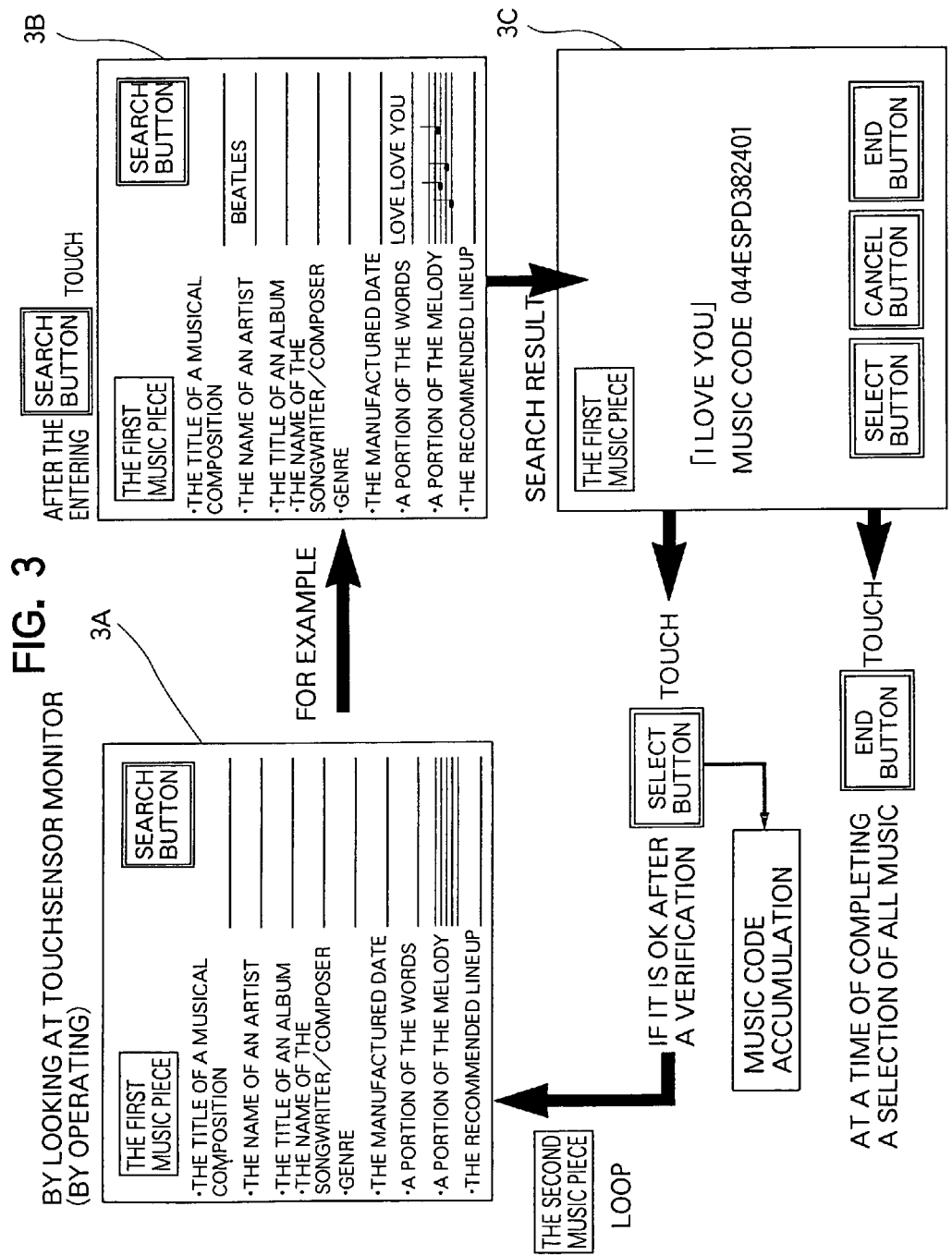
FIG. 3 is an illustrative diagram of another portion of the operation of the system for purchasing a personal recording media according to the present invention.

As shown in FIG. 2, at first, a switch of the purchasing system is turned on by touching a "START" entry display on a screen of a touch sensor type monitor (hereinafter referred to as the "monitor") in the AAS 11. A word "WELCOME"

is displayed on the monitor screen, and then words "PLEASE INSERT A CARD" are displayed on the screen.

When the customer is a registered member of the purchasing system, he/she should insert his/her member card into the card reader of the AAS 11. Further, when the customer is a non-registered member, he/she should apply for a membership registration at the store and purchase a new member card, and then insert the purchased member card into the card reader. Herein, the purchasing system can be constituted as having a new membership card manufacturing function such that a new member card can be automatically manufactured based on anything which can verify the customer's identification, such as the customer's driver's license or bank card.

After the card reader has read the member card, the words "PLEASE ENTER YOUR PERSONAL IDENTIFICATION NUMBER" are displayed on the monitor. According to the display thereof, the customer will enter a personal identification number (hereinafter referred to as the "PIN") unique for each member. The entry of the PIN can be implemented by touching the alphanumeric characters displayed on the monitor screen. The information of the entered PIN and the information of the member registration number of the member card, which has been read in advance by the card reader, are transmitted from the communication system 14 via the telephone line 40 to the host-computer 22 through the communication system 21 of the backchannel company 20.

In the backchannel company 20, the host-computer 22 searches the customer managing database 30 of the company side database 32 based on the information of the PIN and the member registration number transmitted from the store 10, and matches whether or not the customer is a valid member, and then transmits the information concerning the result of that match from the communication system 21 via the telephone line 40 to the AAS 11 through the communication system 14 of the store 10. Further, the host-computer 22 will produce a customer code E when the customer is a valid member.

The AAS 11 in the store 10 displays the words "OK" on the monitor screen's display when the customer is a valid member, based on the received information concerning the result of the match. On the other hand, when the customer is an invalid member, then the AAS 11 displays the words "INVALID" on the monitor screen's display. In case the wrong PIN was entered during the above mentioned operation, it could be constituted such that the PIN can be re-entered by displaying the words "INVALID" on the screen, and then displaying the words "PLEASE ENTER YOUR PERSONAL IDENTIFICATION NUMBER AGAIN WITH GREAT CARE" on the screen.

In this case, in view of security, it could be set such that a limit would be imposed on the number of times that a PIN can be re-entered. And if the match cannot be made within the defined number of times for the re-entry, the purchasing system is automatically turned off.

When the word "OK" is displayed on the monitor screen in the above mentioned step, the monitor displays the words "LET'S SELECT THE MUSICAL COMPOSITIONS" on the screen, and then the operation will proceed to the musical composition selection step.

1-2. Musical Composition Selection Step

As shown in FIG. 3A, the musical composition selection items for "the first music piece" are displayed on the monitor screen. In these musical composition selection items, the items of (a) the title of a musical composition, (b) the name of an artist, (c) the title of an album, (d) the names of the songwriter/composer, (e) the category, (f) the manufactured date, (g) a portion of the words, (h) a portion of the melody (tune), and (i) the recommended lineup are displayed, respectively.

The customer enters the necessary information by looking at the musical composition selection items displayed on the monitor screen, in order to select the first music piece. There are various methods of entering this information. For example, the necessary information can be entered by using the keyboard or can be directly written on the screen by using a touch pen.

The AAS 11 will obtain the necessary information by searching the musical composition list database 12 in the store 10 based on the information entered on the monitor screen.

As an example, FIG. 3B shows the monitor screen when the customer has entered (b) the name of an artist, (g) a portion of the words, and (h) a portion of the melody, respectively.

Herein, it could be constituted such that a voice recognition method can be adopted for the entry of (h) a portion of the melody, and making a recognition of the melody that the customer is singing using that recognition method, and it could be constituted such that the recognized melody is further converted to the score corresponding thereto, and then the converted score is displayed on the screen of the monitor.

After these entries have been completed, the search is implemented by pushing the "search button" which is displayed on the monitor screen, and then the search result as shown in FIG. 3C is displayed on the monitor screen. That is, as a result of the search, the title of the first music piece, "P.S. I LOVE YOU" in this example, as well as its music code "044ESPD382401", are displayed on the monitor screen, and the selection items "SELECTION BUTTON", "CANCEL BUTTON", "END BUTTON" are also displayed on the monitor screen at the same time.

The customer verifies the first music piece displayed on the monitor screen, and then touches the "SELECTION BUTTON" if the entered information is confirmed. When the "SELECTION BUTTON" is touched, the music code is accumulated into a hard disc of the AAS 11, as well as the musical composition selection items for the second music piece are displayed on the monitor screen. The musical composition selection for the second music piece is implemented according to the same procedure. The music codes for the desired musical compositions are accumulated sequentially by repeating the procedure until the desired number of music pieces is reached.

When all the music piece selections have been completed, the musical composition selection is completed by touching the "END BUTTON" selection item after the validation result of the last music piece has been displayed on the monitor screen.

1-3. Musical Composition Editing Step

Figure 4:
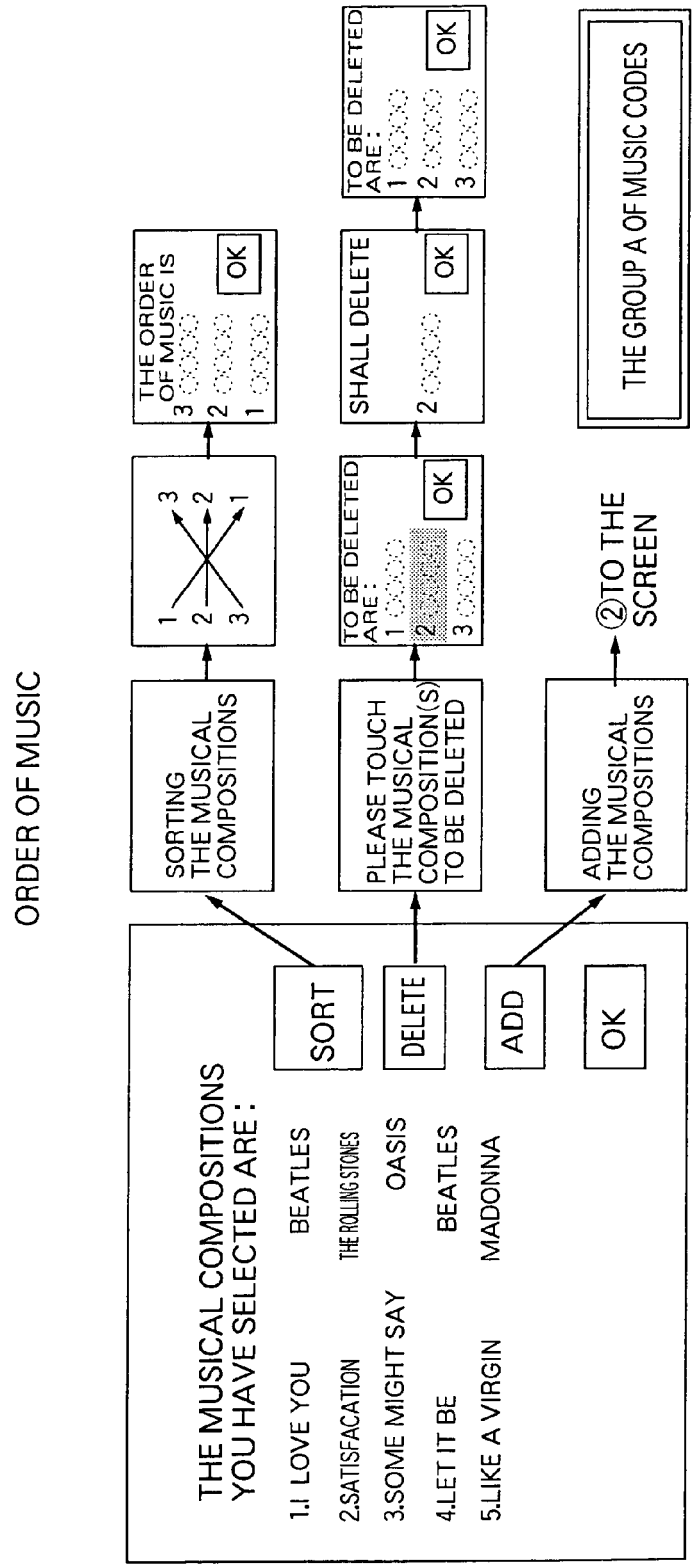
FIG. 4 is an illustrative diagram of another portion of the operation of the system for purchasing a personal recording media according to the present invention.

By touching "END BUTTON" in the above mentioned step, as shown in FIG. 4, after having displayed the words "THE MUSICAL COMPOSITIONS YOU HAVE SELECTED ARE:", the musical compositions selected in the above mentioned musical composition selection step are displayed on the screen.

In this example, the selected musical compositions are displayed on the monitor screen as:

| 1. | I LOVE YOU | BEATLES |
| 2. | SATISFACTION | THE ROLLING STONES |
| 3. | SOME MIGHT SAY | OASIS |
| 4. | LET IT BE | BEATLES |
| 5. | LIKE A VIRGIN | MADONNA | and the selection items "SORT", "DELETE", "ADD" and "OK" are displayed on the monitor screen at the same time.

1-3.1. Sorting of Musical Compositions

In the following, the sorting procedures of the orders for the selected musical compositions will be described.

By touching the item "SORT" on the monitor screen, as shown below, on the monitor screen, brackets are displayed on the right side of each of the musical compositions, respectively:

| 1. | I LOVE YOU | BEATLES | [ ] |
| 2. | SATISFACTION | THE ROLLING STONES | [ ] |
| 3. | SOME MIGHT SAY | OASIS | [ ] |
| 4. | LET IT BE | BEATLES | [ ] |
| 5. | LIKE A VIRGIN | MADONNA | [ ] |

In this example, because the first and the third musical compositions are to be sorted, the order of the musical compositions is changed to the order of 3. 2. 1. 4. 5. by entering the numbers 3, 2, 1, 4, 5 into the blank squares from the top to the bottom in order. Of course, it could be constituted such that the order of the musical compositions can be sorted by using other commonly known methods such as one utilizing a cursor.

On the monitor screen, the item "OK" is displayed at the same time, and, by touching "OK" when the desired sorting has been completed, the monitor screen returns to the display of "THE MUSICAL COMPOSITIONS YOU HAVE SELECTED ARE:", and the sort changed musical compositions, such as shown in below, are displayed:

| 3. | SOME MIGHT SAY | OASIS |
| 2. | SATISFACTION | THE ROLLING STONES |
| 1. | I LOVE YOU | BEATLES |
| 4. | LET IT BE | BEATLES |
| 5. | LIKE A VIRGIN | MADONNA |

Then, by touching the item "OK" on the screen, the display of "THE MUSICAL COMPOSITIONS YOU HAVE SELECTED ARE:" is so displayed as to be renumbered such as;

| 1. | SOME MIGHT SAY | OASIS |
| 2. | SATISFACTION | THE ROLLING STONES |
| 3. | I LOVE YOU | BEATLES |
| 4. | LET IT BE | BEATLES |
| 5. | LIKE A VIRGIN | MADONNA |

1-3.2. Deletion of Musical Compositions

Deletion of selected musical compositions can be implemented by touching the item "DELETE" on the monitor screen. By touching the item "DELETE", the character display "PLEASE TOUCH THE MUSICAL COMPOSITION(S) TO BE DELETED" is made, and further the list of the selected musical compositions:

| 1. | SOME MIGHT SAY | OASIS |
| 2. | SATISFACTION | THE ROLLING STONES |
| 3. | I LOVE YOU | BEATLES |
| 4. | LET IT BE | BEATLES |
| 5. | LIKE A VIRGIN | MADONNA | is displayed on the monitor screen, and the selection item "OK" is also displayed at the same time.

Herein, when deleting "2. SATISFACTION THE ROLLING STONES" in the musical composition list, the part of the musical composition "2. SATISFACTION THE ROLLING STONES" is removed from the list by touching the corresponding musical composition display portion on the monitor screen, and only that portion is displayed on the new page in the screen of the monitor with the selection item "OK" as:

| | WILL BE DELETED | |
| 2. | SATISFACTION | THE ROLLING STONES |

Herein, by touching the item "OK", the monitor screen displays again as shown below by renumbering the musical compositions except the deleted musical composition:

| 1. | SOME MIGHT SAY | OASIS |
| 2. | I LOVE YOU | BEATLES |
| 3. | LET IT BE | BEATLES |
| 4. | LIKE A VIRGIN | MADONNA |

1-3.3. Addition of Musical Compositions

When newly adding a musical composition, the monitor screen displays the words "THE MUSICAL COMPOSITION WILL BE ADDED" by touching the selection item "ADD", and returns to the screen of "The Musical Composition Selection Step" as described above. Then, as described above, a new musical composition can be added by operating a necessary procedure while watching the monitor screen.

"THE GROUP A OF THE MUSIC CODES" corresponding to the edited musical compositions are created by touching the item "END BUTTON" on the screen after having implemented the necessary operations in the above mentioned musical composition editing step. Also, as described below, the monitor screen will shift to the next step by touching the item "END BUTTON".

1.4. Design Step

In this step, the jacket design selection and the album title entry of the MD are implemented.

1.4.1. Jacket Design Selection

Figure 5:
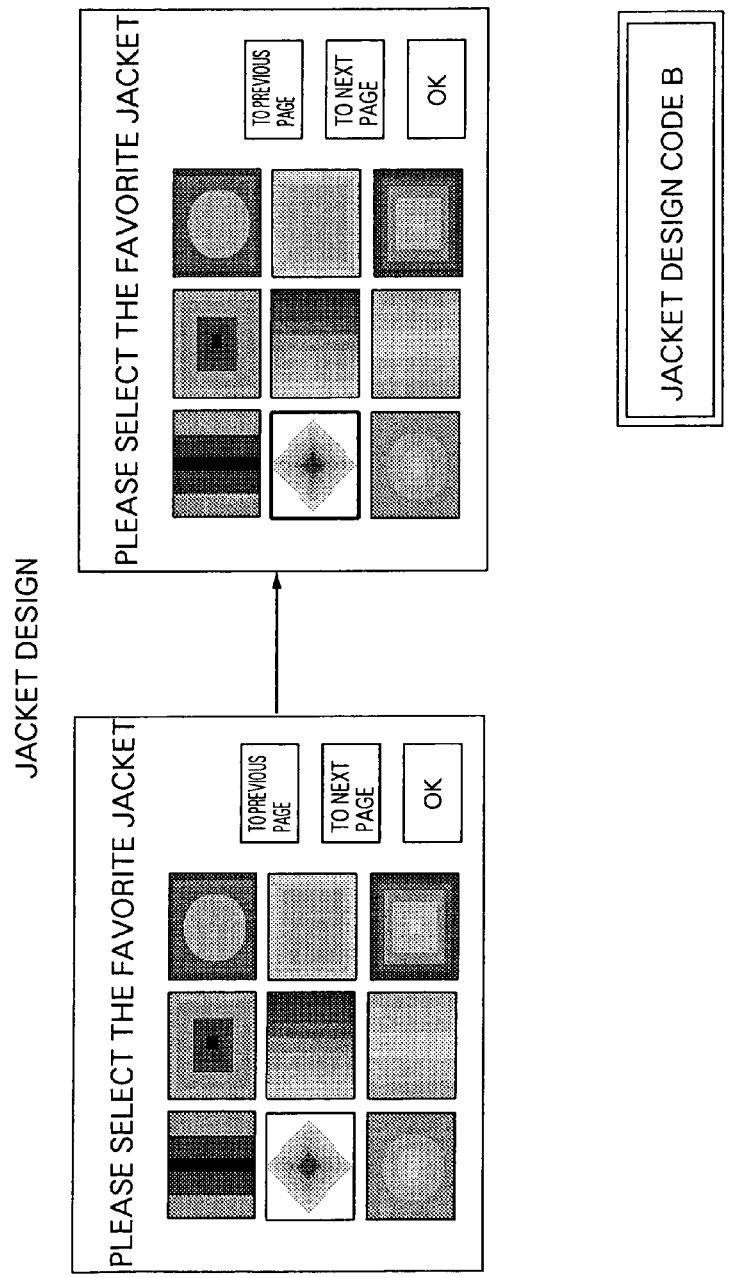
FIG. 5 is an illustrative diagram of another portion of the operation of the system for purchasing a personal recording media according to the present invention.

With a completion of the musical composition editing step as described in the above step 3, in this example, nine kinds of jacket design are displayed on one screen (i.e., one page) of the monitor, as shown in FIG. 5, along with the character display of "PLEASE SELECT THE FAVORITE JACKET". Jacket designs on other monitor screen pages can be displayed on the monitor screen in such a manner that the jacket designs displayed on the previous page and the next page can be displayed on the monitor screen by touching the entry displays of "PREVIOUS PAGE" and "NEXT PAGE" on the monitor screen, respectively. Of course, the number of kinds of the jacket designs incorporated in one screen (i.e., one page) may be set arbitrarily.

In this example, the design placed on the center of the left side column shown in FIG. 5 is selected by touching the monitor screen, and then the "JACKET DESIGN CODE B" corresponding to the selected jacket design is created by touching the entry display "OK".

1-4.2. Album Title Entry

Figure 6:
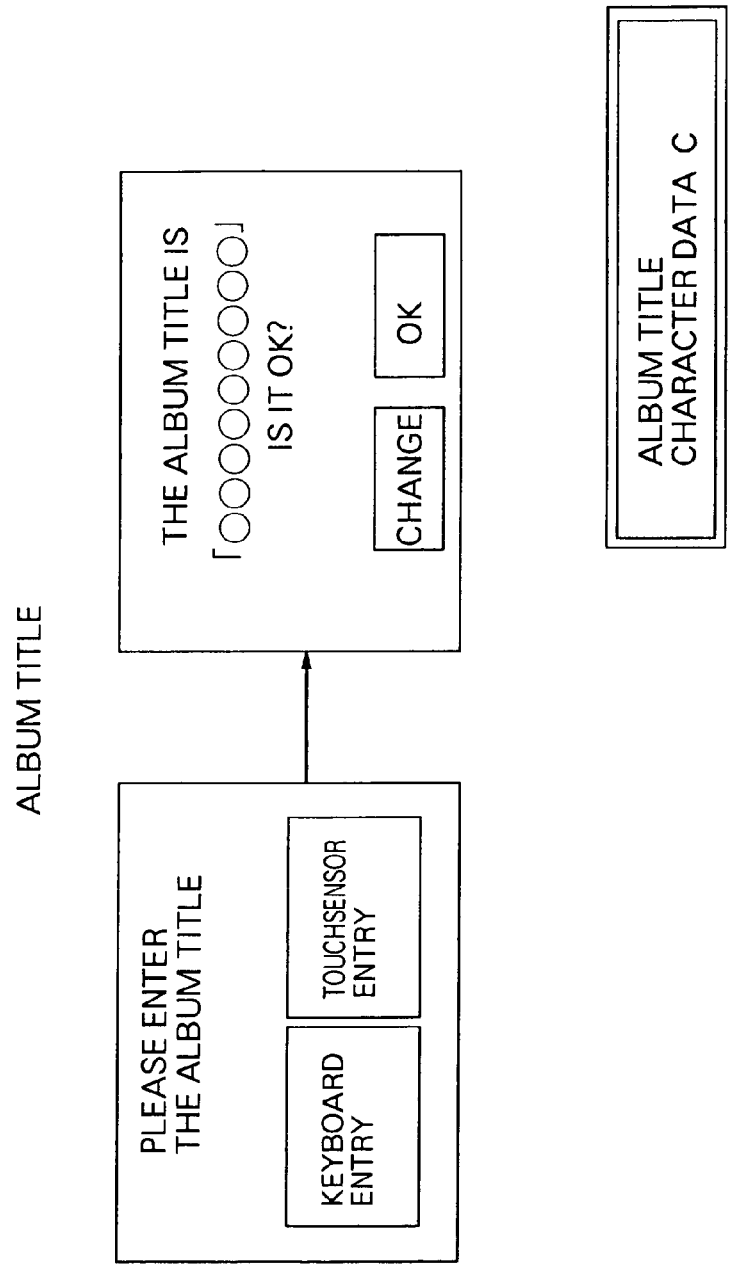
FIG. 6 is an illustrative diagram of another portion of the operation of the system for purchasing a personal recording media according to the present invention.

After the jacket design selection is completed, the character display of "PLEASE ENTER THE ALBUM TITLE" as well as the items "KEYBOARD ENTRY", "TOUCH-SENSOR ENTRY" are displayed on the monitor screen, as shown in FIG. 6. The customer enters the album title on which he/she has decided, through the keyboard or the touch sensor, after having touched either one of the items "KEYBOARD ENTRY" or "TOUCHSENSOR ENTRY". The monitor screen sequentially displays the characters of the title of the album to be entered such as "THE ALBUM TITLE IS "SHOUTA & MAYU". IS IT OK?". The items "CHANGE" and "OK" are displayed simultaneously when either one of the items "KEYBOARD ENTRY" or "TOUCHSENSOR ENTRY" is touched.

The customer implements an entry again with the procedures described above, by touching the item "CHANGE", if he/she desires to change the entered album title, while watching the monitor screen. Further, if the entered album title is all right as it is, then the "ALBUM TITLE CHARACTER DATA C" corresponding to the album title being displayed is created by touching the item "OK".

1-5. Final Verification Step

Figure 7:
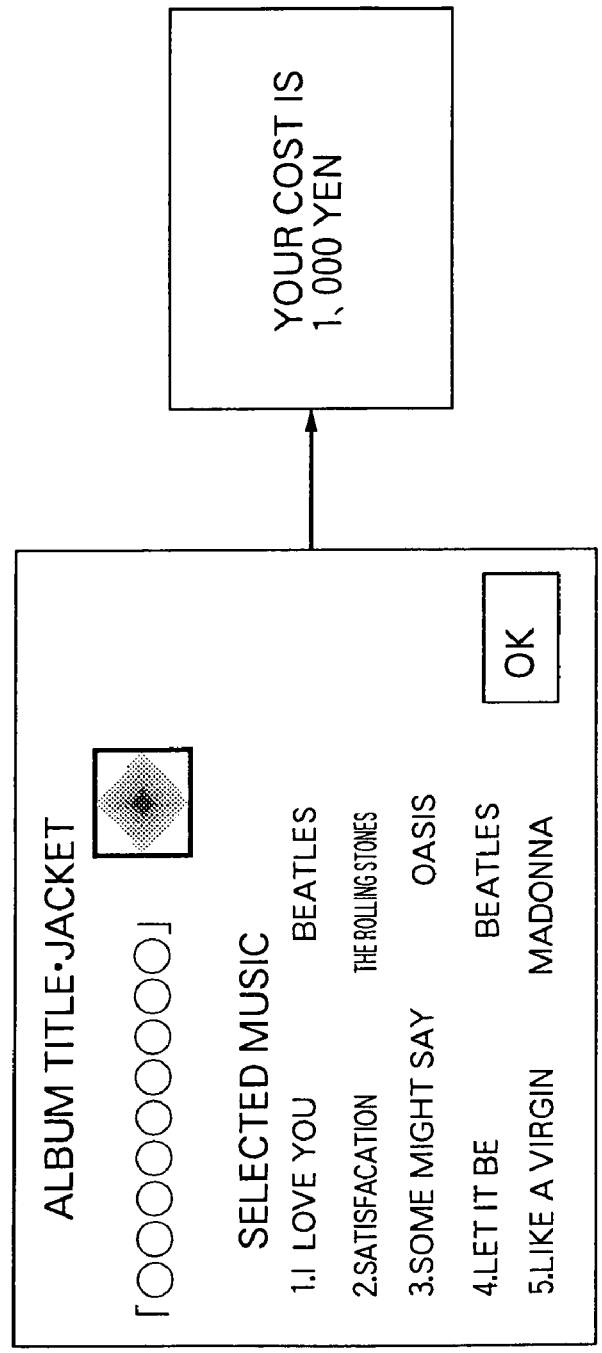
FIG. 7 is an illustrative diagram of another portion of the operation of the system for purchasing a personal recording media according to the present invention.

After the above mentioned design step is completed, the verification items are displayed on the monitor screen, respectively, as shown in FIG. 7. That is, the contents of the respective items "ALBUM TITLE", "JACKET" and "SELECTED MUSIC" are displayed again for final verification. By touching the item "OK" after having completed this final verification, an indication of the cost for the MD which is intended to be produced, for example, as "YOUR COST IS 1,000 YEN", is displayed on the monitor screen.

1-6. Payment Step

Figure 8:
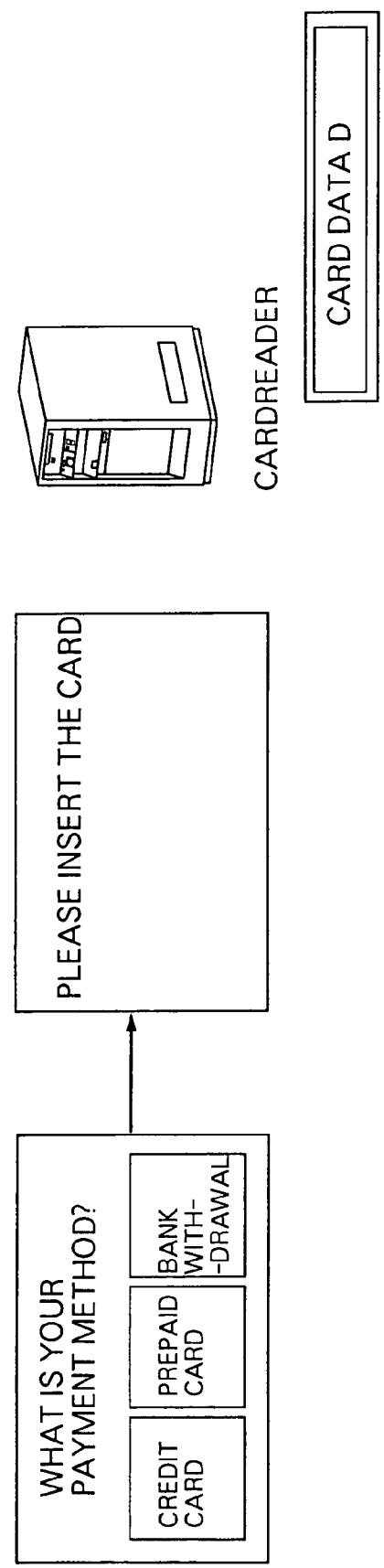
FIG. 8 is an illustrative diagram of another portion of the operation of the system for purchasing a personal recording media according to the present invention.

Following the above mentioned final verification step, as shown now in FIG. 8, the items "CREDIT CARD", "PRE-PAID CARD", and "BANK WITHDRAWAL" are displayed on the monitor screen, along with the character display of "WHAT IS YOUR PAYMENT METHOD?". When the customer has selected the payment method by touching any one of the items on the monitor screen, the character display "PLEASE INSERT THE CARD" is implemented, and then the customer will insert the card corresponding to the selected payment method into the card reader. When the card read by the card reader is confirmed, then the "CARD DATA D" will be produced.

1-7. Transmission Step

After the above mentioned payment step is completed, the "MUSIC CODE GROUP A", "JACKET DESIGN CODE B", "ALBUM TITLE CHARACTER DATA C", "CARD DATA D" and "CUSTOMER CODE E", which have been produced as described above, are transmitted to the host-computer 22 which is provided in the backchannel company 20, through the communication system 14, the telephone line 40 and the communication system 21, as shown in FIG. 1.

Figure 9:
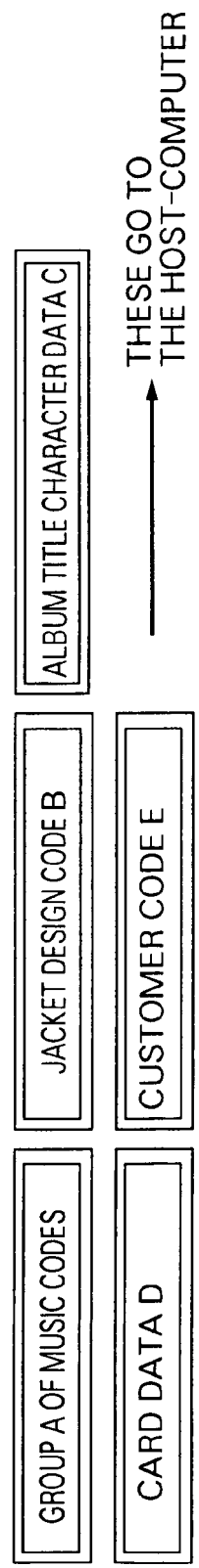
FIG. 9 is an illustrative diagram of another portion of the operation of the system for purchasing a personal recording media according to the present invention.
Figure 10:
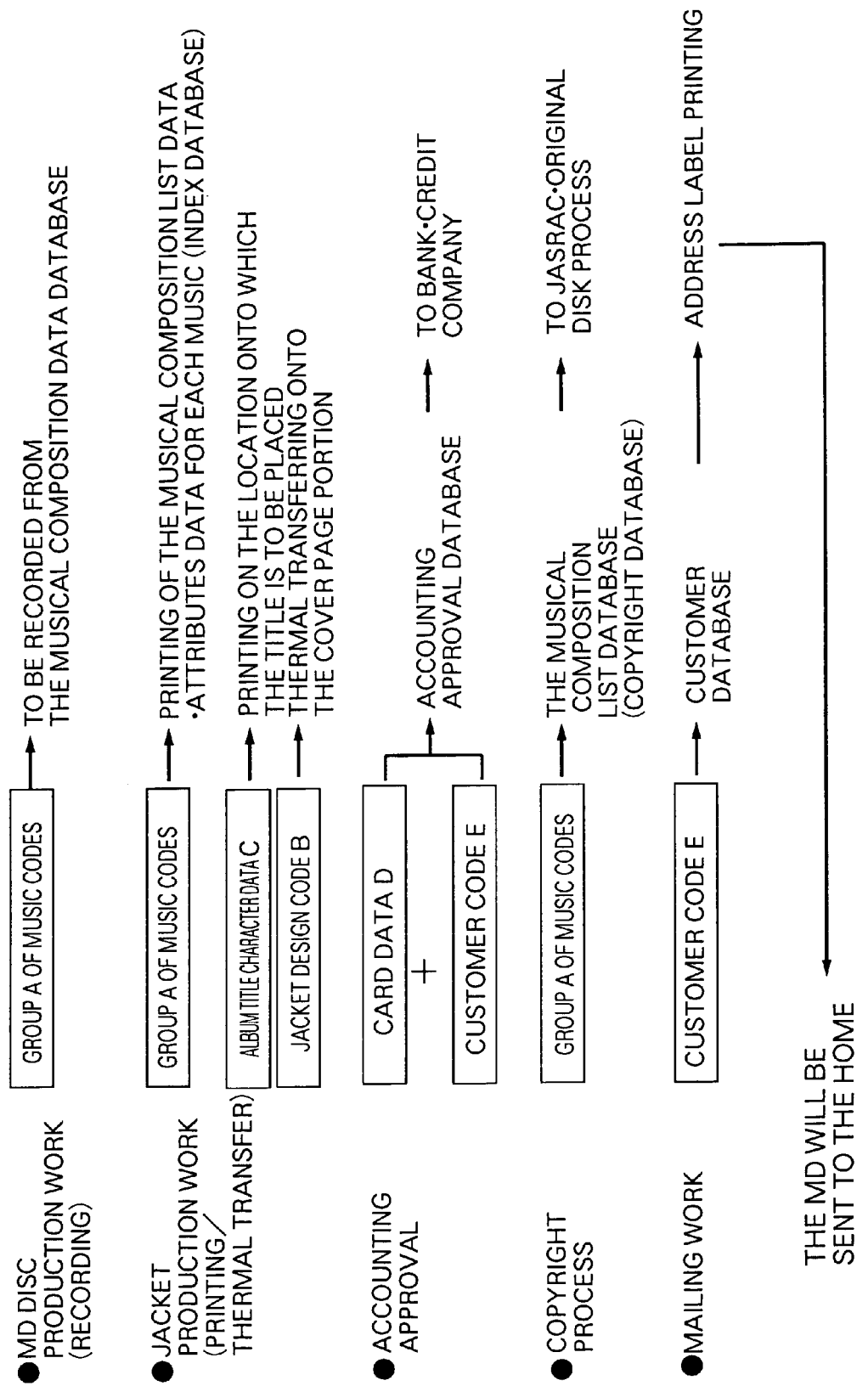
FIG. 10 is an illustrative diagram of another portion of the operation of the system for purchasing a personal recording media according to the present invention.

1-8. Backchannel Company's Work Step (FIGS. 9 and 10)

1-8.1. MD Disc Production Work

After all the above mentioned steps are completed, the production step of the MD is begun. In the present embodiment, the MD disc production work, i.e., the recording, is implemented in the backchannel company 20.

The input information required for the MD production is "MUSIC CODE GROUP A" as mentioned above. Based on MUSIC CODE GROUP A, the musical composition database 24 in the music database 27 is searched, the musical compositions corresponding to the information of the MUSIC CODE GROUP A are selected from the musical composition database 24, and then the selected musical compositions are high-speed recorded into the MD by the MD writer 28.

1-8.2. Jacket Production Work

Further, within the backchannel company 20, based on the "MUSIC CODE GROUP A", "JACKET DESIGN CODE B" and "ALBUM TITLE CHARACTER DATA C", the jacket production work (i.e., printing/thermal transfer) is implemented by the printer 29. Herein, at first, based on the "MUSIC CODE GROUP A", the musical composition list database 23 in the music database 27 is searched, and the attribute of each music is selected from the musical composition list database 23 and the index database 25, and then that information is printed on the predetermined locations of the jacket. Next, based on the "ALBUM TITLE CHARACTER DATA C", the title being input is printed on the title location of the jacket. Then, based on the "JACKET DESIGN CODE B", the selected jacket design is thermally transferred to the front cover of the jacket.

1-8.3. Accounting Approval

The host-computer 22 retrieves the accounting approval database 31 in the database 32 on the company side, based on the information of "CARD DATA D" and "CUSTOMER CODE E", and the necessary information is sent from the accounting approval database 31 to the predetermined financial institution such as a credit company and the like, and then the accounting approval of the customer is carried out.

1-8.4. Copyright Process

The host-computer 22 retrieves the musical composition list database 23 and the copyright database 26 in the music database 27, based on the information of "MUSIC CODE GROUP A". The copyright process is carried out by sending the necessary information from the copyright database 26 of the music database 27 to the JASRAC, and the original disc process is carried out by sending the necessary information from the copyright database 26 of the music database 27 to the recording company and the like.

1-8.5. Mailing Work

The host-computer 22 retrieves the customer database 30 in the database 32 of the company side based on the information of "CUSTOMER CODE E", prints the address label of the customer from the information of the customer's address and the like, and mails the MD to the customer after having completed the predetermined packaging. As a result, the customer could receive the ordered MD.

1-9. Musical Composition Database Update Step

It is very important for the customer to obtain information of new musical compositions (the musical composition list, the musical composition data, the index data, and the like). This information is always updated in the backchannel company 20, and new versions of the musical composition list, musical composition data and index information are stored in the musical composition list database 23, the musical composition data database 24 and the index database 25 of the music database 27, respectively. However, in this embodiment, among this information, only the musical composition list is sent to the communication system 14 in the store 10 through the host-computer 22 and the communication system 21, and then is stored in the musical composition database 12 in the store 10 through the store equipment managing system 13.

In the following, the music database used for the personal musical composition recording media purchasing system according to the present invention, as described above, will be illustrated in detail.

A specification of the music database according to the present invention, which will be described below, is revealed for the first time in the art. The specification includes an accumulatable database specification in which music is unified, and the music database is constituted in such a manner that the sound source, the MIDI data, the music score data, and the right attribution data are digitized and then unified. Then, the music database is designed in such a manner that the music is unification-coded and is also enabled to cope with the future market of the music.

Figure 11:
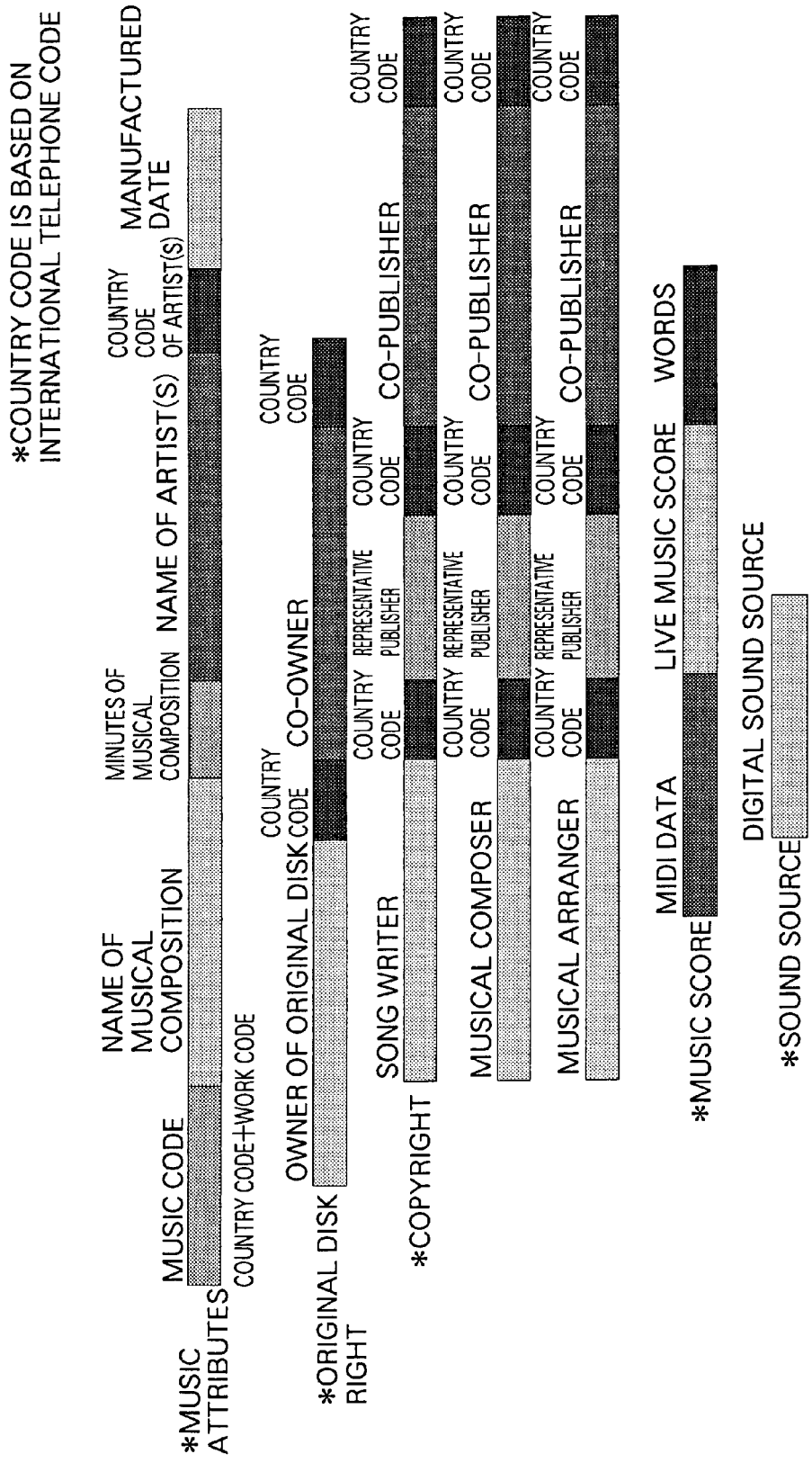
FIG. 11 is a diagram showing one example of the specification of the music database which is one of the main components of the system for purchasing a personal recording media according to the present invention.

FIG. 11 shows one embodiment of the music database which is constituted as described above. This music database includes five categories of (1) the music attribution, (2) the original disc right, (3) the copyright, (4) the music score, and (5) the sound source. Then, each category further includes the information regarding the items described below:

(1) Music Attribution
    (1)-1 music code (country code +work code)
    (1)-2 name of musical composition
    (1)-3 minutes for musical composition
    (1)-4 name of artist(s)
    (1)-5 country code of artist(s)
    (1)-6 manufactured date (2) Original Disc Right
    (2)-1 owner of original disc
    (2)-2 country code
    (2)-3 co-owner
    (2)-4 country code (3) Copyright
    (3)-1-1 songwriter
    (3)-1-2 country code
    (3)-1-3 representative publisher
    (3)-1-4 country code
    (3)-1-5 co-publisher
    (3)-1-6 country code
    (3)-2-1 musical composer
    (3)-2-2 country code
    (3)-2-3 representative publisher
    (3)-2-4 country code
    (3)-2-5 co-publisher
    (3)-2-6 country code
    (3)-3-1 musical arranger
    (3)-3-2 country code
    (3)-3-3 representative publisher
    (3)-3-4 country code
    (3)-3-5 co-publisher
    (3)-3-6 country code (4) Music Score
    (4)-1 MIDI data
    (4)-2 live music score
    (4)-3 words (5) Sound Source
    (5)-1 digital sound source FIGS. 12 and 13 respectively show examples of the index information stored in the index database constituting the music database used for the personal musical composition recording media purchasing system according to the present invention. As can be seen from these examples, the index information is the information indicating a part of the information in the music database described above per musical composition, and the index database is the database in which this index information are stored.

The information of the index A shown in FIG. 12 includes each of the information listed below:

| | |
|---|---|
| (1) Genre | Japanese Music |
| (2) Title of Musical Composition | AKAI SWEETPEE |
| (3) Minutes of Musical Composition | 5 minutes 21 seconds |
| (4) Artist | SEIKO MATSUDA |
| (5) Songwriter | Karuho Kureta |
| (6) Musical Composer | Karuho Kureta |
| (7) Manufacture Date | 1982. 7. 1 |
| (8) Representative Country of Original Disc | Japan |
| (9) Representative Company of Original Disc | Sony Music (Japan) |
| (10) Option I | (words card) |
| (11) Option II | (Music Score) |

The information of the index B shown in FIG. 13 includes each of the information listed below:

| | |
|---|---|
| (1) Genre | Western Music |
| (2) Title of Musical Composition | YESTERDAY |
| (3) Minutes of Musical Composition | 4 minutes 50 seconds |
| (4) Artist | Beatles |
| (5) Songwriter | John Lennon |
| (6) Musical Composer | Paul McCartney |
| (7) Manufacture Date | 1968. 7. 1 |
| (8) Representative Country of Original Disc | England |
| (9) Representative Company of Original Disc | APPLE RECORDS |
| (10) Option I | (words card) |
| (11) Option II | (Music Score) |

The music database which will be described in the following embodiments also has a similar structure as described above, and the purchasing system of the present invention, by adopting this music database, for the customers, a selection of the musical compositions could be made in a global manner, as well as for the copyrighters, the management of the copyrights associated with the musical compositions could be carried out easily.

Figure 14:
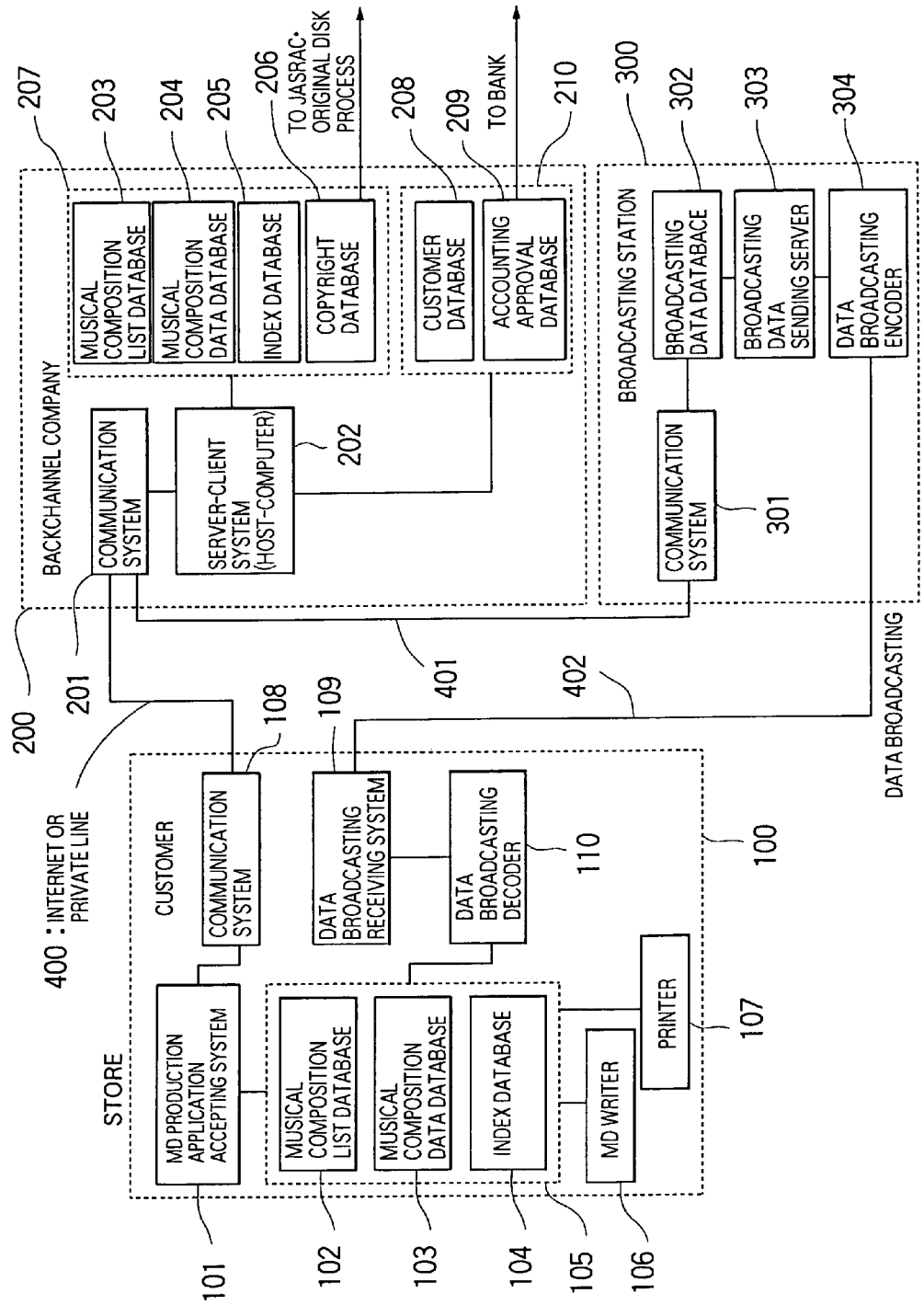
FIG. 14 is a schematic diagram showing a second embodiment of the system for purchasing a personal recording media according to the present invention.

FIG. 14 is a schematic diagram showing the second embodiment of the system for purchasing a personal recording media (as before, it is referred to as "a purchasing system") according to the present invention.

As shown in FIG. 14, the main parts of the purchasing system in this embodiment are composed of a store 100, a backchannel company 200, and a broadcasting station 300. The store 100 is connected with the backchannel company 200 using a private line (instead, an internet or a telephone line could be used) 400. Further, the store 100 and the broadcasting station 300, as well as the backchannel company 200 and the broadcasting station 300 are respectively communicated with each other through the satellite waves (instead, ground waves or cable could be used) 401, 402, respectively.

Similar to the first embodiment, the store 100 is the KIOSK and includes a MD production application accepting system 101 (as before, referred to as the "AAS") which is composed of a monitor, a card reader, and a database retrieval/application terminal (not shown), a store side database 105 connected to the AAS 101 and composed of a musical composition list database 102, a musical composition data database 103 and an index database 104, a MD writer 106 connected to the store side database 105, a printer 107 connected to the store side database 105, a communication system 108 connected to the AAS 101, a data broadcasting receiving system 109, and a data broadcasting decoder 110 connected to the store side database 105.

The backchannel company 200 includes a communication system 201 connected to the communication system 108 of the store 100 via a telephone line 400; a server-client system (hereinafter referred to as the "host-computer") 202 connected to the communication system 201; a music database 207 connected to the host-computer 202 and composed of a musical composition list database 203, a musical composition data database 204, an index database 205 a copyright database 206; and a company side database 210 connected to the host-computer 202 and composed of a customer database 206 an accounting approval database 207.

The broadcasting station 300 includes a communication system 301 connected to the communication system 201 in the backchannel company 200 through the satellite wave 401, a broadcasting data database 302 connected to the communication system 301, a broadcasting data sending server 303 connected to the broadcasting data database 302, and a data broadcasting encoder 304 connected to the data broadcasting receiving system 109 in the store 100 through the broadcasting data sending server 303 and the satellite wave 402.

The purchasing system shown in FIG. 14 is so configured that a customer could select a preferred artist or musician and a preferred musical composition thereof, individually, in a store located nearby such as a convenience store or a gas station, the customer could produce a MD onto which the selected musical compositions are digitally copied in the store.

In the following, an operation of the purchasing system shown in FIG. 14 will be described in detail.

2-1. Membership Recognition Step

This step as performed for the AAS 101 in this embodiment is identical to the membership recognition step described previously regarding the first embodiment and FIG. 2. However, with respect to this embodiment, reference should be made to the communication system 108, the telephone line 400, the host-computer 202, the communication system 201 of the backchannel company 200, the customer managing database 208 of the company side database 210, the store 100, the communication system 201, the communication system 107 of the store 100, and the host-computer 202.

2-2. Musical Composition Selection Step

This step as performed for the AAS 101 in this embodiment is identical to the musical composition selection step described previously regarding the first embodiment and FIGS. 3A and 3B. However, with respect to this embodiment, reference should be made to the musical composition list database 102 and the index database 104 which are included in the store side database 105.

2-3. Musical Composition Editing Step

This step as performed for the AAS 101 in this embodiment is identical to the musical composition editing step, including the steps of sorting, deletion and adding of musical compositions, described previously regarding the first embodiment and FIG. 4.

2-4. Design Step

This step as performed for the AAS 101 in this embodiment is identical to the design step, including the steps of jacket design selection and album title entry, described previously regarding the first embodiment and FIGS. 5 and 6.

2-5. Final Verification Step

This step as performed for the AAS 101 in this embodiment is identical to the final verification step described previously regarding the first embodiment and FIG. 7.

2-6. Payment Step

This step as performed for the AAS 101 in this embodiment is identical to the payment step described previously regarding the first embodiment and FIG. 8.

Next, referring to FIG. 16, the work steps in the store 100 and the backchannel company 200 will be described.

2-7. MD Production Step 2-7.1. MD Disc Production Work

After the above mentioned steps 1 to 6 are completed, the production step of the MD is begun. In the present embodiment, the MD disc production work, i.e., the recording, is implemented in the KIOSK, that is, in the store 100 such as the convenience store or the gas station and the like.

The input information required for the MD production is "MUSIC CODE GROUP A" as mentioned above. Based on MUSIC CODE GROUP A, the musical composition data database 103 in the store side database 105 is searched, and the musical compositions corresponding to the information of the MUSIC CODE GROUP A are selected from the musical composition data database 103, and then the selected musical compositions are high-speed recorded into the MD by the MD writer 106.

2-7.2. Jacket Production Work

This step as performed for the AAS 101 in this embodiment is identical to the musical composition selection step described previously regarding the first embodiment and FIG. 10, except that it is performed within the store 100. In addition, with respect to this embodiment, reference should be made to the printer 107, the musical composition list database 102 in the store side database 105 and the index database 104.

2-8. Transmission Step

Figure 15:
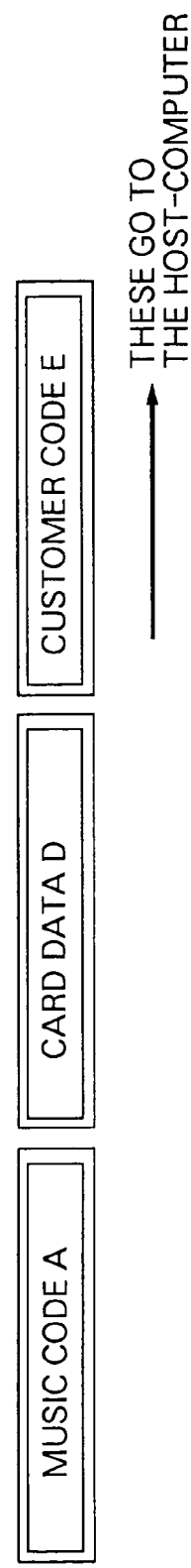
FIG. 15 is an illustrative diagram of another portion of the operation of the system for purchasing a personal recording media according to the present invention shown in FIG. 14.

After the above mentioned payment step is completed, the "MUSIC CODE GROUP A", "CARD DATA D" and "CUSTOMER CODE E", which have been produced as described above, are transmitted to the host-computer 202 which is provided in the backchannel company 200 through the communication system 108, the telephone line 400 and the communication system 201, as shown in FIGS. 14 and 15.

2-9. Backchannel Company's Work Step

The backchannel company work steps relating to the accounting approval and the copyright process as performed for the AAS 101 in this embodiment are identical to the same steps described previously regarding the first embodiment and FIG. 10. However, with respect to this embodiment, reference should be made to the host-computer 202, the accounting approval database 209, the company side database 210, the musical composition list database 203 and the copyright database 206 in the music database 207.

2-10. Musical Composition Database Update Step

It is very important for the customer to obtain information of new musical compositions (the musical composition list, the musical composition data, the index data, and the like).

This information is transmitted from the broadcasting station 300 to the store 100 by satellite wave and the like 402.

The backchannel company reads the new versions of the musical composition list, the musical composition data and the index information from the musical composition list database 203, the musical composition data database 204 and the index database 205 of the music database 207, respectively using the host-computer 202, and then transmits this information from the communication system 201 to the communication system 301 in the broadcasting station 300 by satellite wave (instead, it is possible to use the telephone line or the private line).

In the broadcasting station 300, the new versions of the musical composition list, the musical composition data, the index information are stored in the broadcasting data database 302. The broadcasting data sending server 303 sends the new versions of the musical composition list, the musical composition data, the index information stored in the broadcasting data database 302 to the data broadcasting encoder 304. The data broadcasting encoder 304 converts this information to transmission signals by encoding them, and then transmits the transmission signals to the data broadcasting receiving system 109 in the store 100 by satellite wave and the like 402.

The data broadcasting receiving system 109 in the store 100, which has received the encoded signals, sends these signals to the data broadcasting decoder 110. Then, the data broadcasting decoder 110 decodes the received signals, reads the new versions of the musical composition list, the musical composition data and the index information, and stores these new versions of the musical composition list, the musical composition data and the index information in the musical composition list database 102, the musical composition data database 103 and the index database 104 in the store side database 105, respectively.

Accordingly, the purchasing system according to the present embodiment is so configured that the newest music information is always stored in the store 100, and thus it could respond to the needs for the customers.

Figure 17:
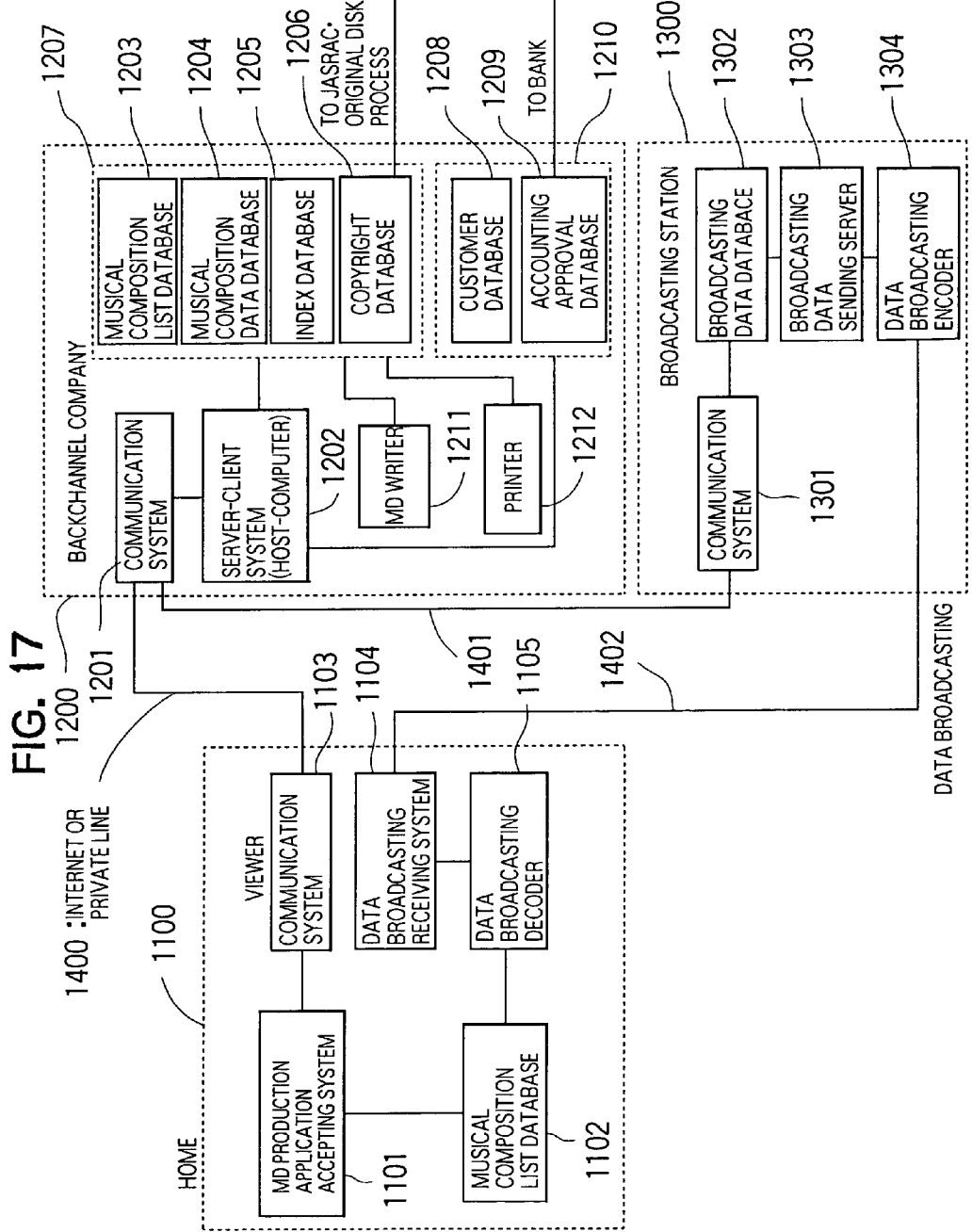
FIG. 17 is a schematic diagram showing a third embodiment of the system for purchasing a personal recording media according to the present invention.

FIG. 17 is a schematic diagram showing the third embodiment of the system for purchasing a personal recording media (as before, it is referred to as "a purchasing system") according to the present invention.

Before describing the structure of FIG. 17, the features of the third embodiment will be described below. The substantial differences in the third embodiment from the first and the second embodiments are such that it is adapted to implement the MD application at the customer's home, and the new music is applied through the data broadcasting.

The third embodiment is a service directed to specific members only:

1) Only the new musical composition list (music codes) will be sent from the broadcasting station 1300 using the data broadcasting;
2) The desired new music will be clicked while watching TV programs, such as "MTV", "Countdown TV" and the like;
3) Accessing host-computer 1202 when several numbers of the desired music are accumulated;
4) The compilation MD will be delivered to the home 1100; and
5) The copyright approval process will be implemented.

In the following, the prerequisites in the third embodiment will be described:

A. The member (customer) should already have a PC/TV at home by purchasing it, or the dedicated board should have been attached to the PC which has been already at home by purchasing it, and the PC TV is connected to the telephone line in the home;
B. When new music is released, the recording company will submit a notification of the necessary attributes to the music database, and then the music code will be allocated, accordingly;
C. Implementing the music broadcasting by embedding the music code (+alpha) into the broadcasting band which is not used for general broadcasting (e.g., a TV program such as "MTV" and the like);
D. Accumulating the music codes (+alpha) sent from the broadcasting station 1300 into the PC/TV hard disc by operating a remote controller, a keyboard, or a mouse, and then transmitting them; (This PC/TV is preferably linked to the music database homepage, and the musical composition list database within the hard disc thereof is always updated thereby.)
E. The broadcasting band which is not used for general broadcasting refers to each band of the data broadcasting, the teletext broadcasting, sub-sound broadcasting;
F. It can be utilized as a system which is adapted to simplify the application work by encoding ticket information and general product information;
G. It can be utilized as a system for a radio broadcasting; and
H. It is also possible to use an IC card.

As shown in FIG. 17, the main parts of the purchasing system in this embodiment are composed of a home 1100, a backchannel company 1200, and a broadcasting station 1300. The home 1100 is connected with the backchannel company 1200 using a telephone line (instead, an internet or a private line could be used) 1400. Further, the home 1100 and the broadcasting station 1300, as well as the backchannel company 1200 and the broadcasting station 1300 are respectively communicated with each other through the satellite waves (instead, ground waves or cable could be used) 1401, 1402, respectively.

The home 1100 is a residence and the like of the customer, and includes a MD production application accepting system 1101 (the "AAS"), a musical composition list database 1102 connected to the AAS 1101, a communication system 1103 connected to the AAS 1101, a data broadcasting decoder 1105 connected to the musical composition list data 1102, and a data broadcasting receiving system 1104 connected to the data broadcasting decoder 1105.

The backchannel company 1200 includes a communication system 1201 connected to the communication system 1103 of the home 1100 via a telephone line 1400; a server-client system (the "host-computer") 1202 connected to the communication system 1201; a music database 1207 connected to the host-computer 1202 and composed of a musical composition list database 1203, a musical composition data database 1204, an index database 1205 and a copyright database 1206; and a company side database 1210 connected to the host-computer 1202 and composed of a customer database 1206 and an accounting approval database 1207. Further, the MD writer 1211 and the printer 1212 are connected to the music database 1207, respectively.

The broadcasting station 1300 includes a communication system 1301 connected to the communication system 1201 in the backchannel company 1200 through the satellite wave 1401, a broadcasting data database 1302 connected to the communication system 1301, a broadcasting data sending server 1303 connected to the broadcasting data database 1302, and a data broadcasting encoder 1304 connected to the data broadcasting receiving system 1104 in the home 1100 through the broadcasting data sending server 1303 and the satellite wave 1402.

This third embodiment differs from the first and the second embodiments described above in that it is configured such that the musical composition list (=music codes) is data-broadcast from the broadcasting station, and the MD can be applied at the home. The applied MD will be delivered from backchannel company 1200 to the home 1100.

In the following, an operation of the purchasing system of the third embodiment will be described in detail.

Assuming that a recording company M has produced, for example, a new music recording "LOVE YOU" of SEIKO MATSUDA, the recording company M will immediately register that new music to the music database. By registering, a music code for that new music, for example 081AMDM029988, is provided. Then, the recording company M puts the new music "LOVE YOU" of SEIKO MATSUDA on air in the TV program "Countdown TV" by bringing the promotional video tape of the new music "LOVE YOU" on which the music code 081AMDM029988 is provided into the TV program "Countdown TV" of the commercial broadcasting station TBS, and transmits the music code 081AMDM029988 with the data broadcasting band at the same time.

It is assumed that, on a monitor screen of the PC TV which is connected to the telephone line, the TV program "Countdown TV" is turned on, and just the new music "LOVE YOU" of SEIKO MATSUDA is on air.

Figure 18:
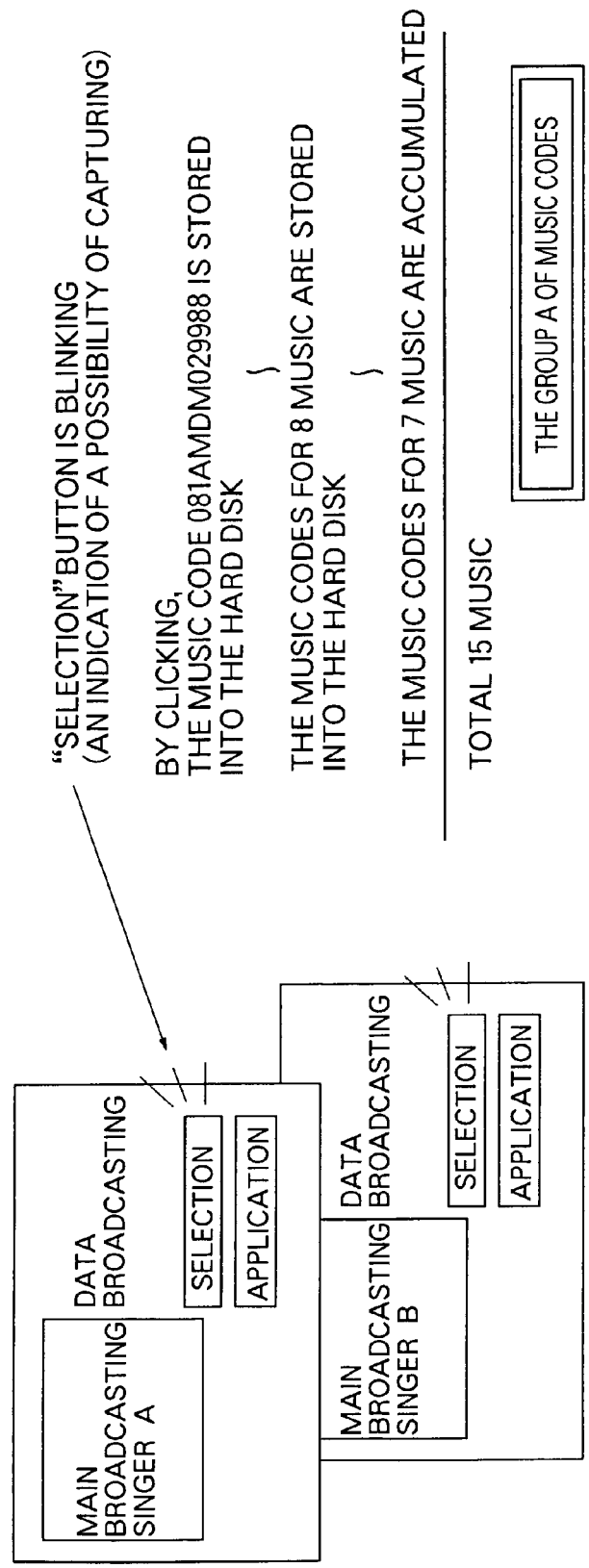
FIG. 18 is an illustrative diagram of one portion of the operation of the system for purchasing a personal recording media according to the present invention shown in FIG. 17.

FIG. 18 shows a monitor screen of the PC/TV at the home 1100. Herein, it is assumed that in the main broadcasting (in the above case, it is the TV program "Countdown TV" of TBS) a scene of the new music "LOVE YOU" of a singer A (in the above case, it is SEIKO MATSUDA) is running on the air, and then a scene of the new music "HOW TO BE A GIRL" of a singer B (in this case, NAMIE AMURO) is running on the air.

3-1. Selection

The entry displays "SELECTION" and "APPLICATION" are shown on the monitor screen of the PC/TV. Herein, assuming that the entry display "SELECTION" is blinking in order to indicate a possibility of capturing, then by clicking or touching this blinking entry display "SELECTION", the music code 081AMDM029988 corresponding to the new music "LOVE YOU" is stored into the hard disc of the PC/TV.

Similarly, the customer (the member) selects the new music "HOW TO BE A GIRL" of NAMIE AMURO during the same main broadcasting (the broadcasting of the TV program "Countdown TV" of TBS), and then the music code corresponding to this music is stored into the hard disc of the PC/TV.

By doing so, it is assumed that, by selecting eight music selections during the same main broadcasting, the music codes for eight music selections are stored into the hard disc of the PC/TV when the TV program "Countdown TV" has been completed. Further, it is assumed that the customer (the member) has selected seven music selections during the broadcasting of other TV program, the music codes for seven music selections are stored into the hard disc of the PC/TV when that TV program has been completed.

In the above case, the music codes for the total of fifteen music selections are stored into the hard disc of the PC/TV.

3-2. Application

Figure 19:
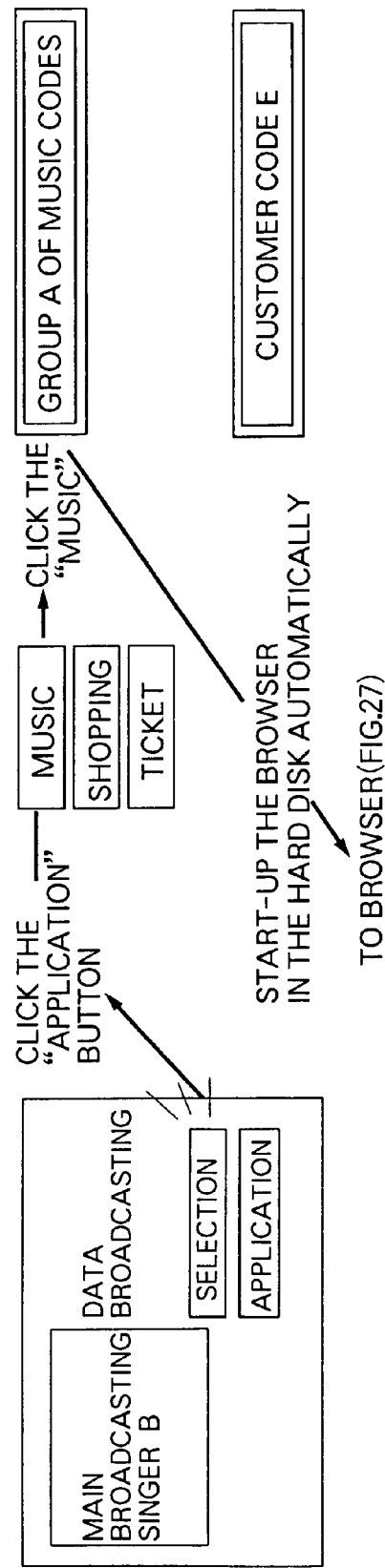
FIG. 19 is an illustrative diagram of another portion of the operation of the system for purchasing a personal recording media according to the present invention shown in FIG. 17.

The process moves to the application operation, as shown in FIG. 19, when the selection step of the above has been completed.

By clicking (or touching) the entry display "APPLICATION" on the monitor screen of the PC/TV, the entry displays "MUSIC", "SHOPPING", "TICKET" are displayed on the monitor screen. The item "MUSIC" is clicked in this embodiment.

Figure 20:
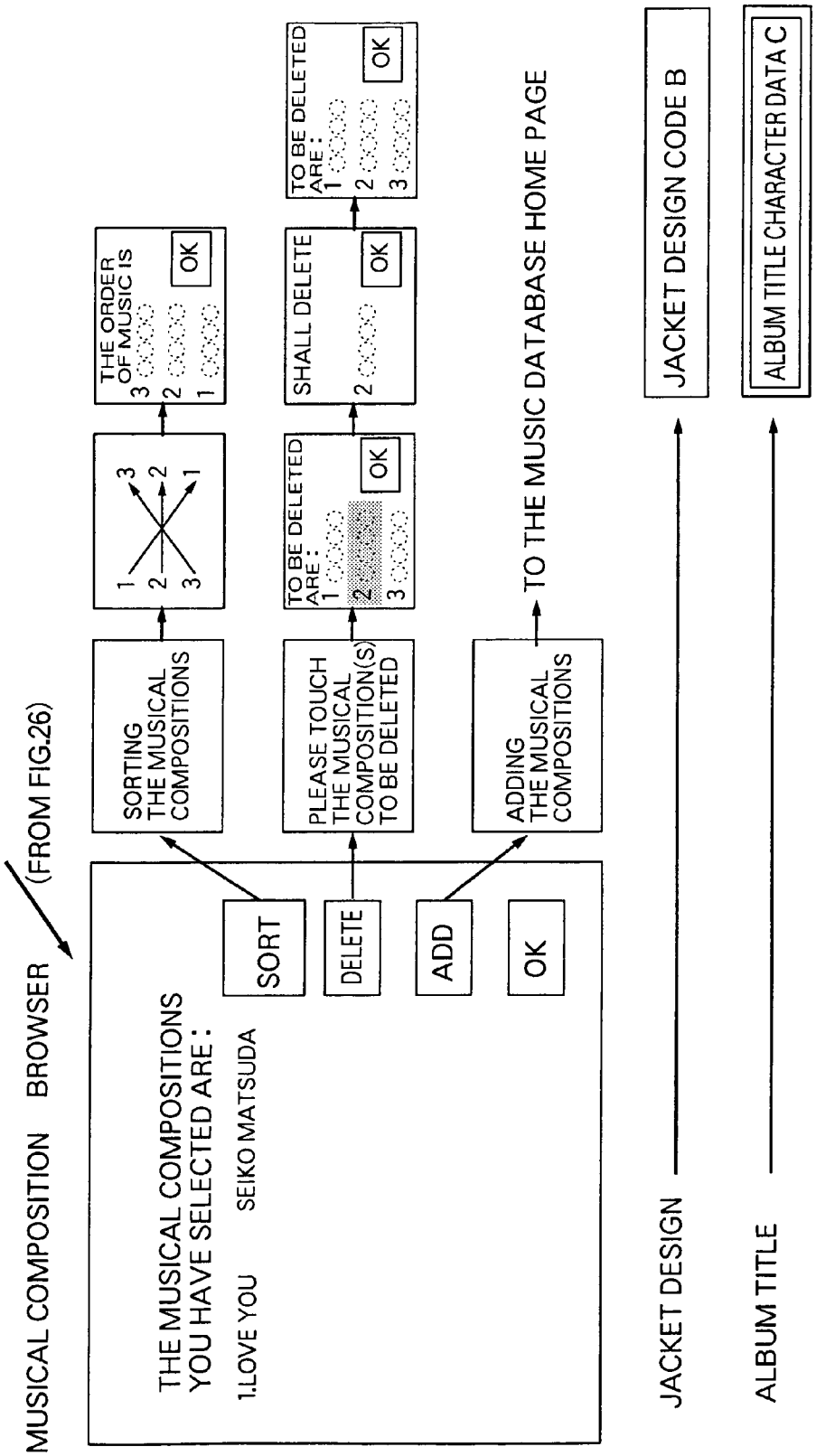
FIG. 20 is an illustrative diagram of another portion of the operation of the system for purchasing a personal recording media according to the present invention shown in FIG. 17.

By clicking the item "MUSIC", in this embodiment, the "THE GROUP A OF MUSIC CODES" composed of the music codes of the music selections, as well as the "CUSTOMER CODE E" are produced. Furthermore, at the same time, a browser within the hard disc of the PC/TV is started-up automatically, and as shown in FIG. 20, after the words "THE MUSICAL COMPOSITIONS YOU HAVE SELECTED ARE:" are displayed, the musical compositions selected in the above mentioned manner are displayed on the screen.

The musical composition editing process, including the steps of sorting, deleting and adding musical compositions, as performed for the AAS 1101 in this embodiment, is identical to the musical composition editing process, including the steps of sorting, deleting and adding musical compositions, described previously regarding the first embodiment and FIGS. 4, 7 and 8.

3-3. Design Step

This step as performed for the AAS 1101 in this embodiment is identical to the design step, including the steps of jacket design selection and album title entry, described previously regarding the first embodiment and FIGS. 5 and 6.

3-4. Final Verification Step

This step as performed for the AAS 1101 in this embodiment is identical to the final verification step described previously regarding the first embodiment and FIG. 7.

3-5. Payment Step

This step as performed for the AAS 1101 in this embodiment is identical to the payment step described previously regarding the first embodiment and FIG. 8.

3-6. Transmission Step

This step as performed for the AAS 1101 in this embodiment is identical to the transmission step described previously regarding the second embodiment and FIGS. 9 and 15, except that reference should be made to the host-computer 1202 which is provided in the backchannel company 1200 through the communication system 1103, the telephone line 1400 and the communication system 1201, as shown in FIG. 17.

3-7. Backchannel Company Work Steps

The work steps of the backchannel company 1200 relating to the MD disc production work, the jacket production work, the accounting approval, the copyright process and the mailing work as performed for the AAS 1101 in this embodiment are identical to the same steps described previously regarding the first embodiment and FIG. 10. However, with respect to this embodiment, reference should be made to the host-computer 1202, the musical composition list database 1204 in the music database 1207, the MD writer 1211, the accounting approval database 1209, the company side database 1210, the printer 1212, the musical composition list database 1203, the index database 1205, the music database 1207, the customer database 1208, the accounting approval database 1209 and the copyright database 1206.

Figure 21:
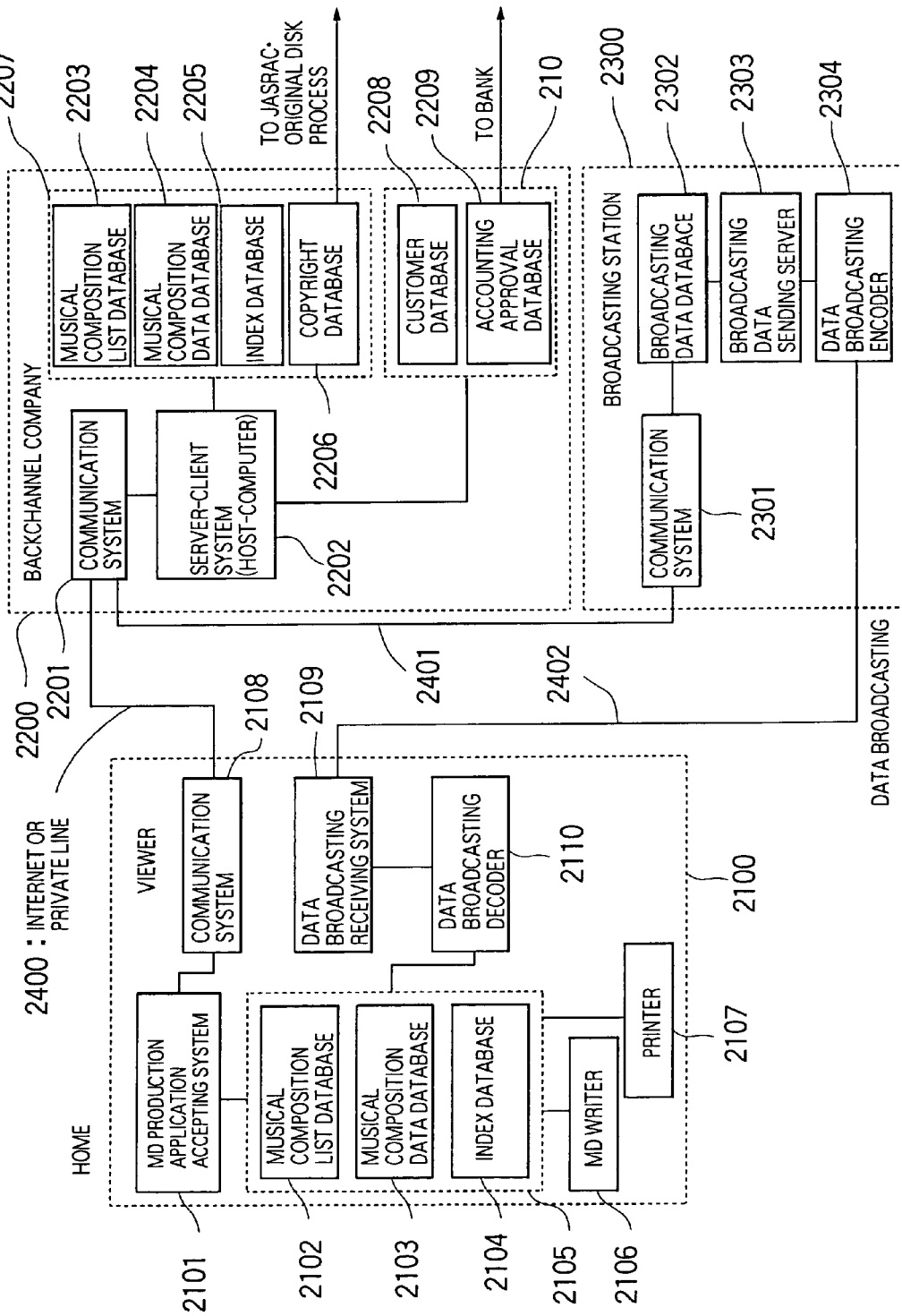
FIG. 21 is a schematic diagram showing a fourth embodiment of the system for purchasing a personal recording media according to the present invention.

FIG. 21 is a schematic diagram showing the fourth embodiment of the system for purchasing a personal recording media (as before, it is referred to as "a purchasing system") according to the present invention.

As shown in FIG. 21, the main parts of the purchasing system in this embodiment are composed of a home 2100, a backchannel company 2200, and a broadcasting station 2300. The home 2100 is connected with the backchannel company 2200 using a telephone line (instead, an internet or a private line could be used) 2400. Further, the home 2100 and the broadcasting station 2300, as well as the backchannel company 2200 and the broadcasting station 2300 are respectively communicated with each other through the satellite waves (instead, ground waves or cable could be used) 2401, 2402, respectively.

The home 2100 includes a MD production application accepting system 2101 (the "AAS") including the PC/TV; a home side database 2105 connected to the AAS 2101 and composed of a musical composition list database 2102, a musical composition data database 2103 and an index database 2104; a MD writer 2106 connected to the home side database 2105; a printer 2107 connected to the home side database 2105; a communication system 2108 connected to the AAS 2101; a data broadcasting receiving system 2109; and a data broadcasting decoder 2110 connected to the home side database 2105.

The backchannel company 2200 includes a communication system 2201 connected to the communication system 2108 of the home 2100 via a telephone line and the like 2400; a server-client system (the "host-computer") 2202 connected to the communication system 2201; a music database 2207 connected to the host-computer 2202 and composed of a musical composition list database 2203, a musical composition data database 2204, an index database 2205 and a copyright database 2206, and a company side database 2210 connected to the host-computer 2202 and composed of a customer database 2206 and an accounting approval database 2207.

The broadcasting station 2300 includes a communication system 2301 connected to the communication system 2201 in the backchannel company 2200 through the satellite wave 2401, a broadcasting data database 2302 connected to the communication system 2301, a broadcasting data sending server 2303 connected to the broadcasting data database 2302, and a data broadcasting encoder 2304 connected to the data broadcasting receiving system 2109 in the home 100, through the broadcasting data sending server 2303 and the satellite wave 2402.

Before describing the structure of FIG. 21, the features of the fourth embodiment will be described below.

Although this fourth embodiment resembles the third embodiment described above, the substantial difference is that it is configured to produce a MD at home, and the new music can be the MD produced with the data broadcasting. Further, the purchasing system of the fourth embodiment is a service directed to the specific member:

1) The musical composition list (music codes) and the musical composition data will be sent from the broadcasting station 2300 using the data broadcasting;
2) The utilization status is suck up with the telephone line;
3) The copyright approval process is implemented.

In the following, the prerequisites in the fourth embodiment are described:

A. The musical composition list database is stored in the hard disc within the PC/TV (maintenance is updated by a telephone line at midnight).

B. A musical composition list (music codes) and a musical composition data (digital sound source) of a new musical composition is coming down through the data broadcasting. A dedicated decoder is used.

C. A person who wants to purchase a new musical composition will click a button during the main broadcasting. At that moment, the musical composition list (music codes) is accumulated and will be sent to the host-computer together with a member code. An approval code will be sent back from the host-computer. Further, the musical composition data (the music sound source) is stored into the hard disc once, but a watermark will be input only by matching with the above mentioned approval code, and the decipherment will be implemented. Then, only once, it is high-speed recorded from the hard disc to the MD.

In the following, referring to FIGS. 22 to 24, an operation of the purchasing system of the fourth embodiment will be described in detail.

It is assumed that a recording company M has produced, for example, a new music recording "LOVE YOU" by SEIKO MATSUDA. The recording company M will immediately register that new music to the music database, and also a music sound source (digital) is deposited on the same date. Then, a music code for that new music, for example 081AMDM029988, is provided. Then, the recording company M puts the new music "LOVE YOU" of SEIKO MATSUDA on air in the special channel for the music delivering program "NEW MUSIC" of the J SKY B by bringing the promotional video tape of the new music "LOVE YOU" on which the music code 081AMDM029988 and the music sound source (digital) are provided into the special channel for the music delivering "NEW MUSIC", and transmits the music code 081AMDM029988 and the music sound source (digital) with the data broadcasting band at the same time.

It is assumed that, on a monitor screen of the PC/TV which is connected to the telephone line, the channel "NEW MUSIC" is turned on, and just the new music "LOVE YOU" of SEIKO MATSUDA is on air.

Figure 22:
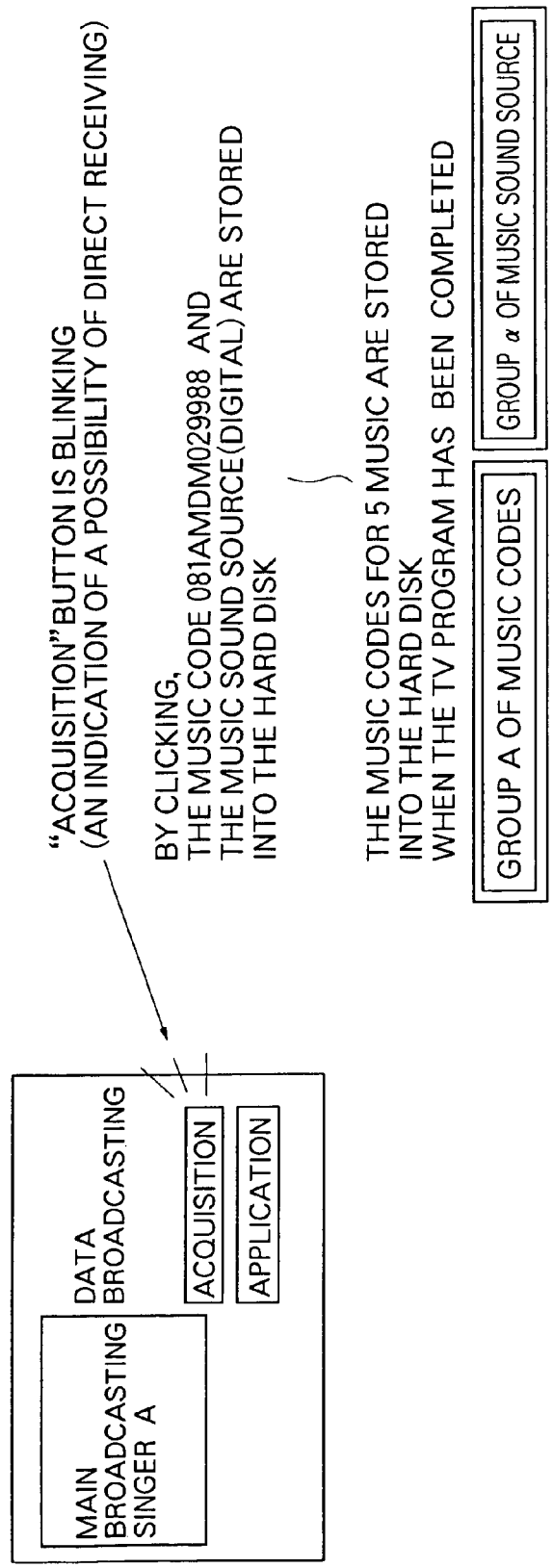
FIG. 22 is an illustrative diagram of one portion of the operation of the system for purchasing a personal recording media according to the present invention shown in FIG. 21.

FIG. 22 shows a monitor screen of the PC/TV at the home 2100. Herein, it is assumed that in the main broadcasting (in the above case, it is the channel "NEW MUSIC" of J SKY B) a scene of the new music "LOVE YOU" of a singer A (in the above case, it is SEIKO MATSUDA) is running on the air.

4-1. Acquisition

The entry displays "ACQUISITION" and "APPLICATION" are shown on the monitor screen of the PC/TV. Herein, it is assumed that the entry display "ACQUISITION" is blinking in order to indicate a possibility of a direct receiving. Then, by clicking or touching this blinking entry display "ACQUISITION", the music code 081AMDM029988 and the music sound source (digital) corresponding to the music "LOVE YOU" are stored on the hard disc of the PC/TV.

Similarly, the customer (the member) selects the new music "HOW TO BE A GIRL" of NAMIE AMURO during the same main broadcasting (the channel "NEW MUSIC" of J SKY B), and then the music code and the music sound source (digital) corresponding to this music is stored into the hard disc of the PC/TV. By doing so, it is assumed that, by selecting a few music selections during the same main broadcasting, the music codes for five music selections are stored on the hard disc of the PC/TV when the channel "NEW MUSIC" has been completed. Accordingly, in this example, "THE GROUP A OF MUSIC CODES" and "THE MUSIC SOUND SOURCE ALPHA" composed of five music selections are produced.

4-2. Application

Figure 23:
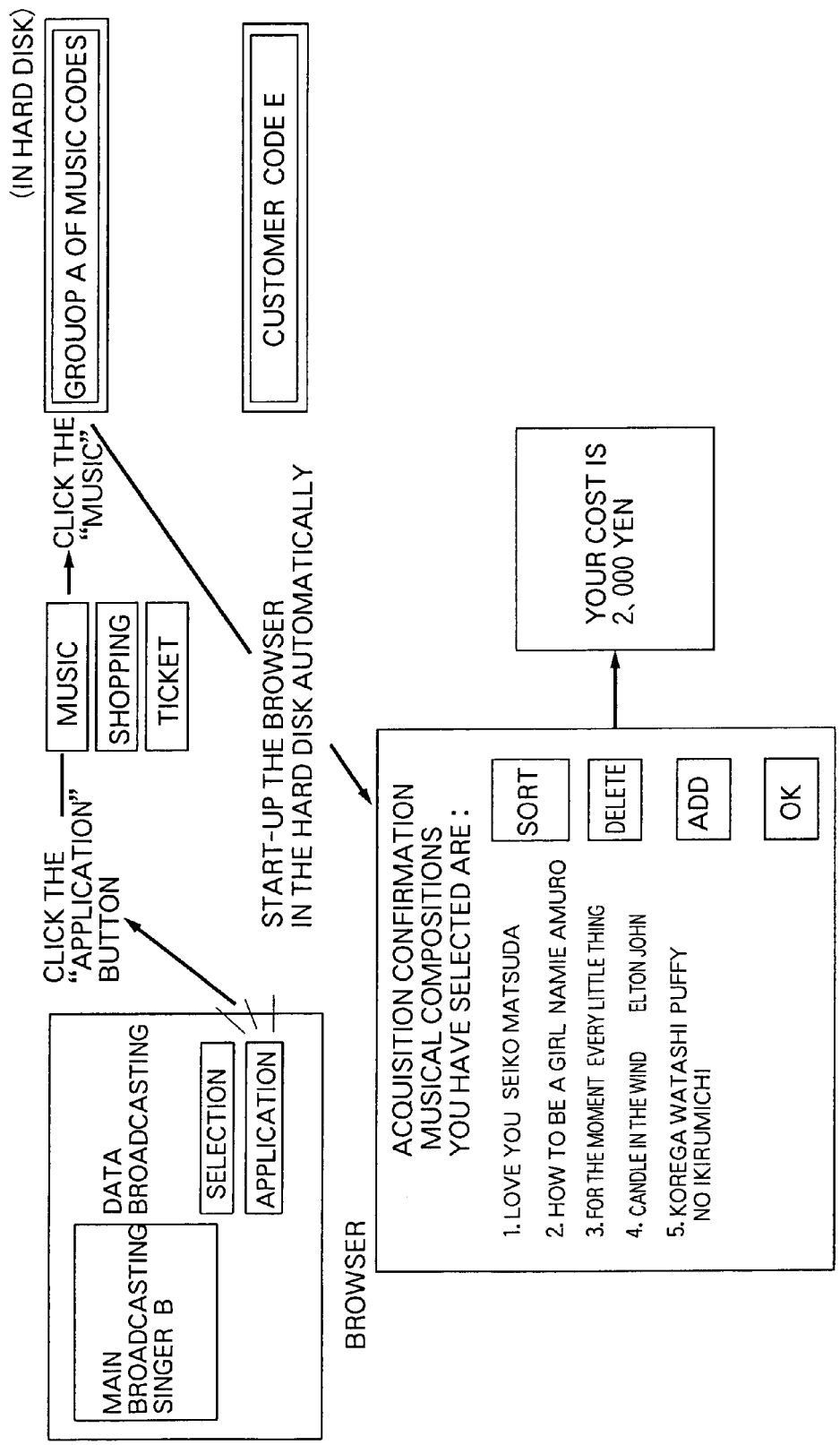
FIG. 23 is an illustrative diagram of another portion of the operation of the system for purchasing a personal recording media according to the present invention shown in FIG. 21.

The process moves to the application operation, as shown in FIG. 23, when the acquisition step of the above has been completed.

By clicking (or touching) the entry display "APPLICATION" on the monitor screen of the PC/TV, the entry displays "MUSIC", "SHOPPING", "TICKET" are displayed on the monitor screen. Item "MUSIC" is clicked in this embodiment.

By clicking the item "MUSIC", in this embodiment, the "THE GROUP A OF MUSIC CODES" composed of the music codes of several music selections (e.g., five) as well as the "CUSTOMER CODE E" are produced as well. Further, at the same time, a browser within the hard disc of the PC/TV is started-up automatically, and then, after having displayed the words "ACQUISITION CONFIRMATION/ THE MUSICAL COMPOSITIONS YOU HAVE SELECTED ARE:", the musical compositions selected in the above mentioned manner are displayed on the screen.

The musical composition editing process, including the steps of sorting, deleting and adding musical compositions, as performed for the AAS 2101 in this embodiment, is identical to the musical composition editing process, including the steps of sorting, deleting and adding musical compositions, described previously regarding the first embodiment and FIGS. 4, 7 and 8.

4-3. Design Step

This step as performed for the AAS 2101 in this embodiment is identical to the design step, including the steps of jacket design selection and album title entry, described previously regarding the first embodiment and FIGS. 5 and 6.

4-4. Final Verification Step

This step as performed for the AAS 2101 in this embodiment is identical to the final verification step described previously regarding the first embodiment and FIG. 7 (except for the cost being 2,000 YEN).

4-5. Payment Step

This step as performed for the AAS 2101 in this embodiment is identical to the payment step described previously regarding the first embodiment and FIG. 8.

4-6. Transmission Step

Figure 24:
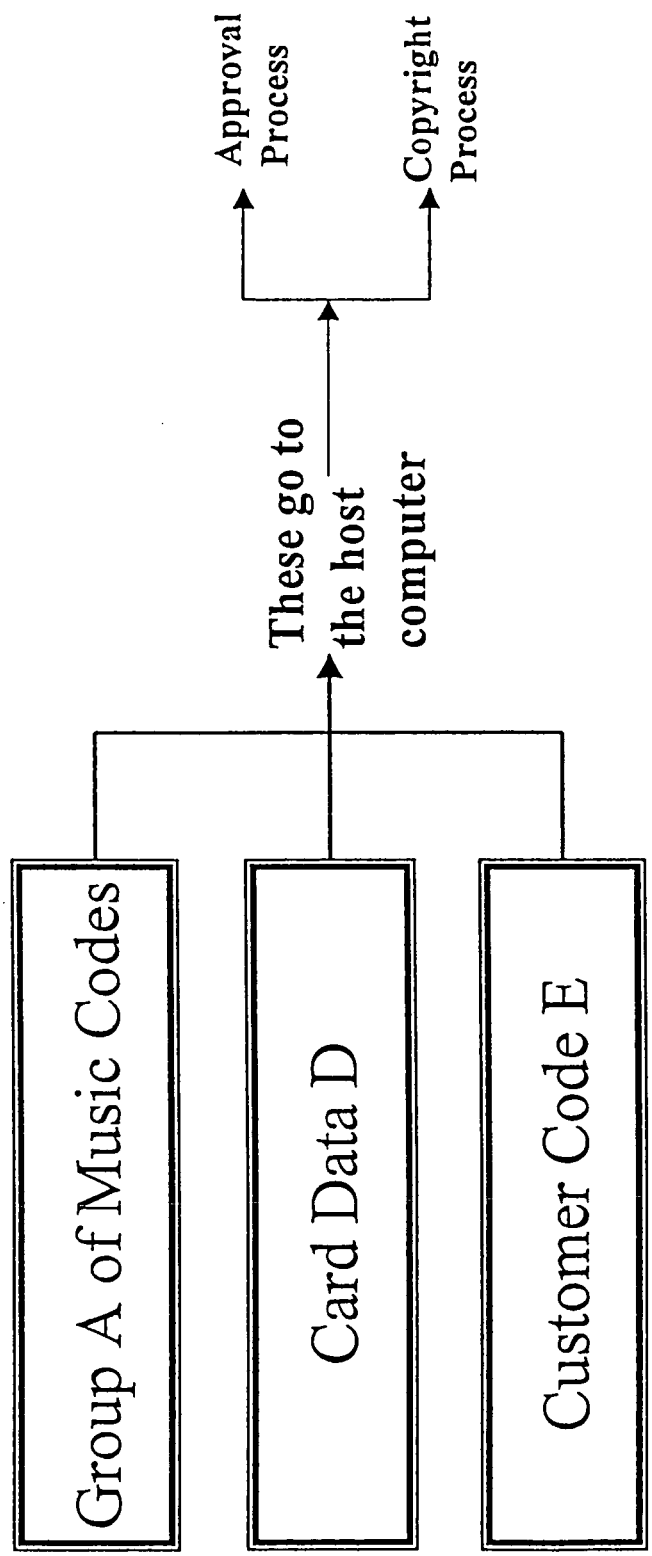
FIG. 24 is an illustrative diagram of another portion of the operation of the system for purchasing a personal recording media according to the present invention shown in FIG. 21.

This step as performed for the AAS 2101 in this embodiment, as shown in FIG. 24, is essentially identical to the transmission step described previously regarding the second embodiment, except that reference should be made to the host-computer 2202 which is provided in the backchannel company 2200 through the communication system 2108, the telephone line 2400 and the communication system 2201, as shown in FIG. 21.

4-6.1. Accounting Approval

The accounting approval as performed for the AAS 2101 in this embodiment is identical to the same step described previously regarding the first embodiment and FIG. 10. However, with respect to this embodiment, reference should be made to the host-computer 2202, the customer database 2208 and the accounting approval database 2209 in the company side database 2210.

4-6.2. Copyright Process

The copyright process as performed for the AAS 2101 in this embodiment is identical to the same step described previously regarding the first embodiment and FIG. 10. However, with respect to this embodiment, reference should be made to the host-computer 2202 the musical composition list database 2203 and the copyright database 2206 in the music database 2207.

4-7. Cipher Approval

After having confirmed the receipt of "MUSIC CODE GROUP A", "CARD DATA D" and "CUSTOMER CODE E" in the host-computer 2202 of the backchannel company 2220, "APPROVAL CODE B" is transmitted to the PC/TV of the home 2100, attached to "CUSTOMER CODE E".

4-8. Defrost

If "MUSIC CODE GROUP A" being stored within the hard disc of the PC/TV in the home 2100 and "APPROVAL CODES B" being sent from the host-computer 2202 in the backchannel company 2200 match, then it is possible to record the desired musical compositions into the MD (only once, because the watermark will then be entered).

4-9. MD Disc Production Work

After the above mentioned steps are completed, the production step of the MD is begun. In this embodiment, the MD disc production work, i.e., the recording, is implemented in the home 2100. Group A of the music sound sources which has been defrosted in the above step are high-speed recorded into the MD by the MD writer 2106.

4-10. Jacket Production Work

This step as performed for the AAS 2101 in this embodiment is identical to the musical composition selection step described previously regarding the first embodiment and FIG. 10, except that it is performed in the home 2100. In addition, with respect to this embodiment, reference should be made to the printer 2107 and the musical composition list database 2103 in the home side database 2105.

All of the above embodiments are described when the system for purchasing a personal recording media, the method of purchasing a personal recording media, and the media recorded with a personal recording media purchasing program are applied to musical compositions.

However, the present invention is not limited to musical compositions, but it could be applied to, for example, digital compositions in which video and/or sound are used as the information source, such as movies and TV advertisements. In these cases, as the personal recording media, the MD for the musical compositions could be replaced with a video cassette tape, a DVD (Digital Versatile Disc) or the like. Further, the present invention could also be applied to a software game in which images of the graphics and/or sound are used as the information source. In these cases, as the personal recording media, the MD for the musical compositions could be replaced with floppy disks and the like.

According to the present invention, the customer could produce and purchase a personal recording media in which the customer's desired information are recorded only, by using the system, the method, as well as the media of the present invention.

Figure 25:
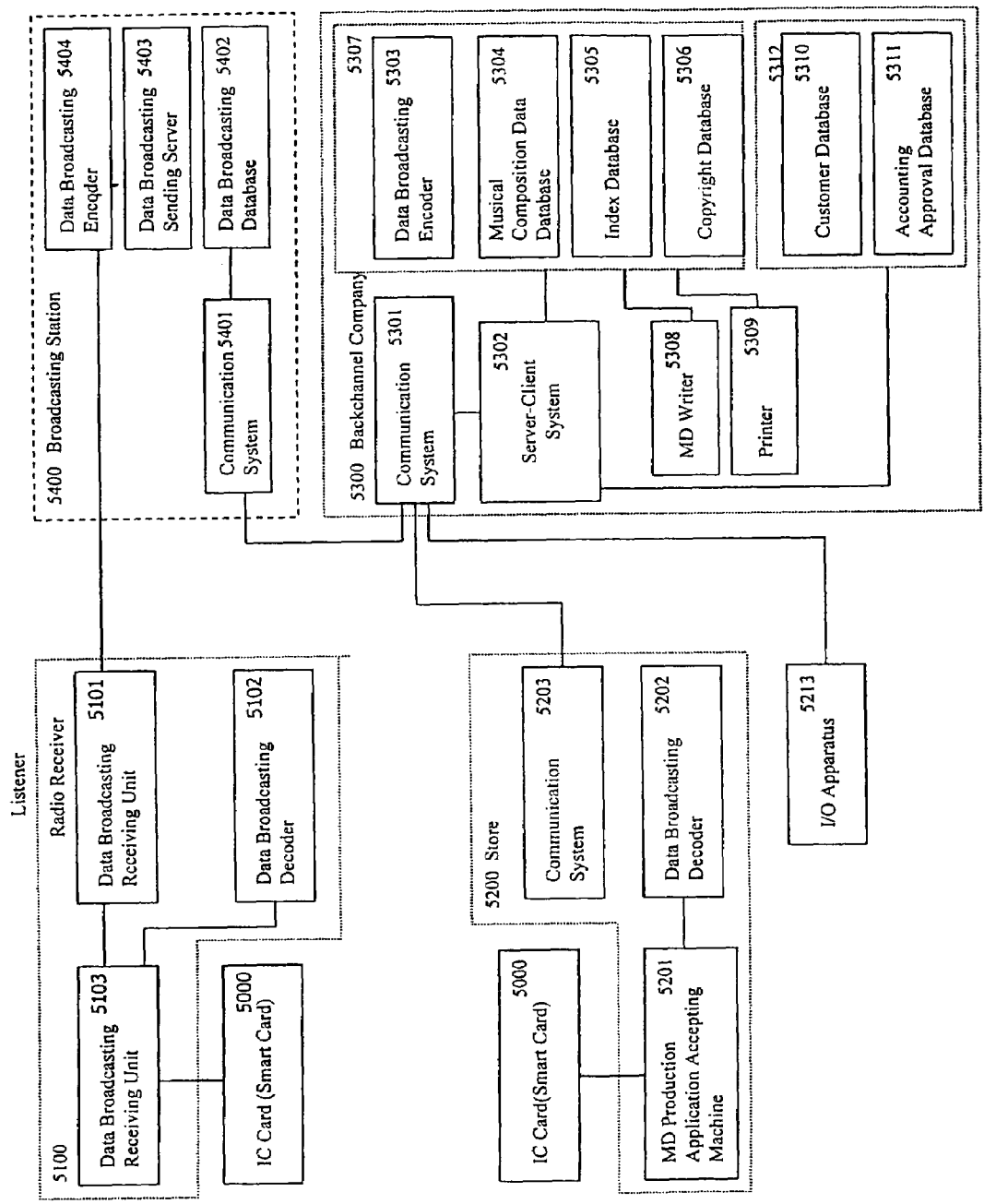
FIG. 25 is a schematic diagram showing the fifth embodiment of the system for purchasing a personal recording media according to the present invention.

FIG. 25 is a schematic diagram showing the fifth embodiment of the system for purchasing a personal recording media (as before, it is referred to as "a purchasing system") according to the present invention.

Before describing the structure of FIG. 25, the features of the fifth embodiment will be described below. The substantial differences in the fifth embodiment from any one of the aforementioned embodiments are such that it utilizes an Integrated Circuit (IC) card or so called Smart Card constituted of a central processing unit (CPU) and a memory or memories (e.g., EPROM and the like) and a click radio into which the IC card is inserted in order to store musical information (music codes) corresponding to musical compositions in a music program or music programs being broadcast from the broadcasting station into the memory (or the memories) of the IC card by pressing an acquisition button installed in the click radio while the customer is listening to the music program on air, and it is adapted such that the customer can apply and purchase a MD constituted of the customer's favorite music (including the music of which the customer was listening on the music program (or programs)) by carrying the IC card of which the musical information (music codes) has been stored into the memory (or memories) thereof to the KIOSK such as a convenience store and the like.

The fifth embodiment is as follows:
1) A service directed to only the specific members who possess or utilize the click radio and the IC card;
2) Only the musical composition list (music codes) will be sent from the broadcasting station using the data broadcasting;
3) The desired music will be clicked when a favorite music is on air while listening to the music programs with the radio, such as "The J-WAVE SELECTION", and the like;
4) Accessing to the host-computer from the convenience store using the IC card when the information corresponding to several numbers of the desired music are accumulated into the IC card;
5) The compilation MD is delivered to the home;
6) The copyright/accounting approval processes are implemented; and
7) In order to utilize the system of the present embodiment, the member (customer) should meet the following prerequisite;
   a) The member (customer) should possess an IC card which is issued by registering a membership;
   b) The member (customer) should possess a click radio which is adapted to insert/remove the IC card and has an Input/Output (I/O) function such that it can store the musical information (the music codes) corresponding to the musical compositions in a music program (or the music programs) broadcast from the broadcasting station(s) into the memory (or the memories) of the IC card by pressing the acquisition button installed in the click radio while the customer is listening to the music program on air.

As shown in FIG. 25, the main parts of the purchasing system in this embodiment are constituted of the IC card 5000, the click radio 5100, the store 5200, the backchannel company 5300, and the broadcasting station 5400.

The IC card 5000 is constituted of a central processing unit (CPU) and a memory (e.g., EPROM) (not shown), and wherein the information regarding the membership registration number (accessing number) by the membership registration (or it may be a unique password for each member, preferably) is stored in the memory of the IC card 5000.

The click radio 5100 is constituted of a data broadcasting receiver 5101, a data broadcasting decoder 5102 connected to the data broadcasting receiver 5101, and a controller 5103 connected to both of the data broadcasting receiver 5101 and the data broadcasting decoder 5102.

The data broadcasting receiver 5101 is constituted of a tuner for enabling to select a variety of the broadcasting stations (not shown), and an antenna for receiving the FM/AM broadcasting and the data broadcasting which are being broadcast from the broadcasting stations selected by the tuner. Herein, it is assumed that both the FM/AM broadcasting and the data broadcasting are transmitted by using the digital signals, but they might be analog signals.

The data broadcasting decoder 5102 is connected to the data broadcasting receiver 5101, and reproduces the analog music signals (hereinafter, it is referred to as "the music composition signals" or just "the music signals") by decoding the digital signal of the music broadcasting program received by the data broadcasting receiver 5101 and by digital-to-analog converting the decoded digital signals of the music broadcasting program(s) so that the members are enable to listen to the music through an earphone or a speaker (not shown).

The controller 5103 is connected to both of the data broadcasting receiver 5101 and the data broadcasting decoder 5102, and controls the both of the data broadcasting receiver 5101 and the data broadcasting decoder 5102 so as to store the digital codes corresponding to the music signals included in the signals of the data broadcasting received by the data broadcasting receiver 5101 in the memory of the IC card 5000.

The store 5200 is, for example a KIOSK, and includes a MD production application accepting system 5201 (as before, it is referred to as the "AAS" hereinafter) which is composed of a monitor, an IC card-reader, and a database retrieval/application terminal (not shown), a controller 5202 connected to the AAS 5201 for controlling the information of the music codes read from the IC card 5000 by the IC card-reader, and a communication system 5203 connected to the controller 5202.

The backchannel company 5300 includes a communication system 5301 which is connected to the communication system 5203 of the store 5200 via a telephone line or the Internet, a server-client system (hereinafter, it is referred to as the "host-computer") 5302 which is connected to the communication system 5301, a music database 5307 which is connected to the host-computer 5302 and composed of a musical composition list database 5303, a musical composition data database 5304, an index database 5305 as well as a copyright database 5306, a MD writer 5308 connected to the music database 5307, a printer 5309 connected to the music database 5307, and a company side database 5312 connected to the host-computer 5302 and composed of a customer database 5310 as well as an accounting approval database 5311.

The broadcasting station 5400 includes a communication system 5401 connected to the communication system 5301 in the backchannel company 5300 through the satellite wave and the like, a broadcasting data database 5402 connected to the communication system 5401, a broadcasting data sending server 5403 connected to the broadcasting data database 5402, and a data broadcasting encoder 5404 connected to the data broadcasting receive 5102 of the click radio 5100 through the broadcasting data sending server 5403 and the satellite wave.

The system shown in FIG. 25 is provided with the copyright database 5306 which stores the information regarding the copyright that are substantially related to the music of each country all over the world. Although the information regarding the relations of right for the copyright relating to the music is specifically stored in this copyright database 5306, it may be adapted to store the information of copyright relating to the movies, etc (mainly the information regarding the relations of right).

The host computer 5302 includes a requested musical composition evaluation unit 5314 provided with a function for registering the information of musical composition into the musical composition list database 5303 and the musical composition data database 5304, and is connected to the Input/Output (I/O) device 5313 through the communication system 5301. By entering the information of musical composition from the I/O device 5313, the songwriters, the composers, and the arrangers, all of which are having the respective copyrights of the musical composition, can easily register their works (the information of musical compositions) into the musical composition list database 5303 and the musical composition data database 5304 through the communication system 5301 and the requested musical composition evaluation unit 5314.

Further, the host computer 5302 includes the applicable copyright related information determining unit 5318 provided with a function for retrieving and discriminating the copyright relating to the musical compositions registered into the musical composition list database 5303 and the musical composition data database 5304, based on the musical composition to be used.

Moreover, the host computer 5302 comprises the musical composition used time counting unit 5316 having a function for counting the number of times the musical composition being used.

The host computer 5302 includes the accounting and royalty determining unit 5319 provided with a function for determining the royalty distribution ratios based on the relations of right of the applicable copyright determined by the applicable copyright related information determining unit 5318, and the information stored in the accounting approval database 5311.

The host computer 5302 is provided with a function for collecting a predetermined accounting approval from a user of the musical composition and for returning the respective predetermined royalties to the agents such as the music publisher(s) and the recording companies as well as each of the copyright holders relating to the musical composition(s) to be used, based on the counting results from the musical composition used time counting unit 5316 and the royalty distribution rates determined by the royalty determining unit 5319. This function can be easily implemented by utilizing the IC card.

Further, the accounting approval and royalty determining unit 5319 of the host computer 5302 is also provided with a function for changing the accounting approval information based on the information regarding the to the usage purpose of the registered musical composition(s).

The musical composition purpose of use evaluation unit 5315 is provided with a function for deciding the usage purpose of the musical composition and for storing the evaluated result(s) during a predetermined period of time (until it becomes unnecessary).

The customer recognition unit 5317 of the host computer 5302 has a function for recognizing the customer information inputted from the store 5200, the broadcasting station 5400, or the I/O device 5313 with reference to the customer database 5310, and for storing the new customer information into the customer database 5310 as required.

The I/O device 5313 can be installed in the store 5200, the broadcasting station 5400, and the like, respectively. By configuring as described above, the user such as the broadcasting station can easily access the musical compositions desirable to use, and also the songwriters, composers, and arrangers can easily register their songs, music scores and the like.

In the following, with reference to FIGS. 26 to 30, an operation of the fifth embodiment will be described in details.

5-1. Acquisition Step by Using IC Card

Figure 26:
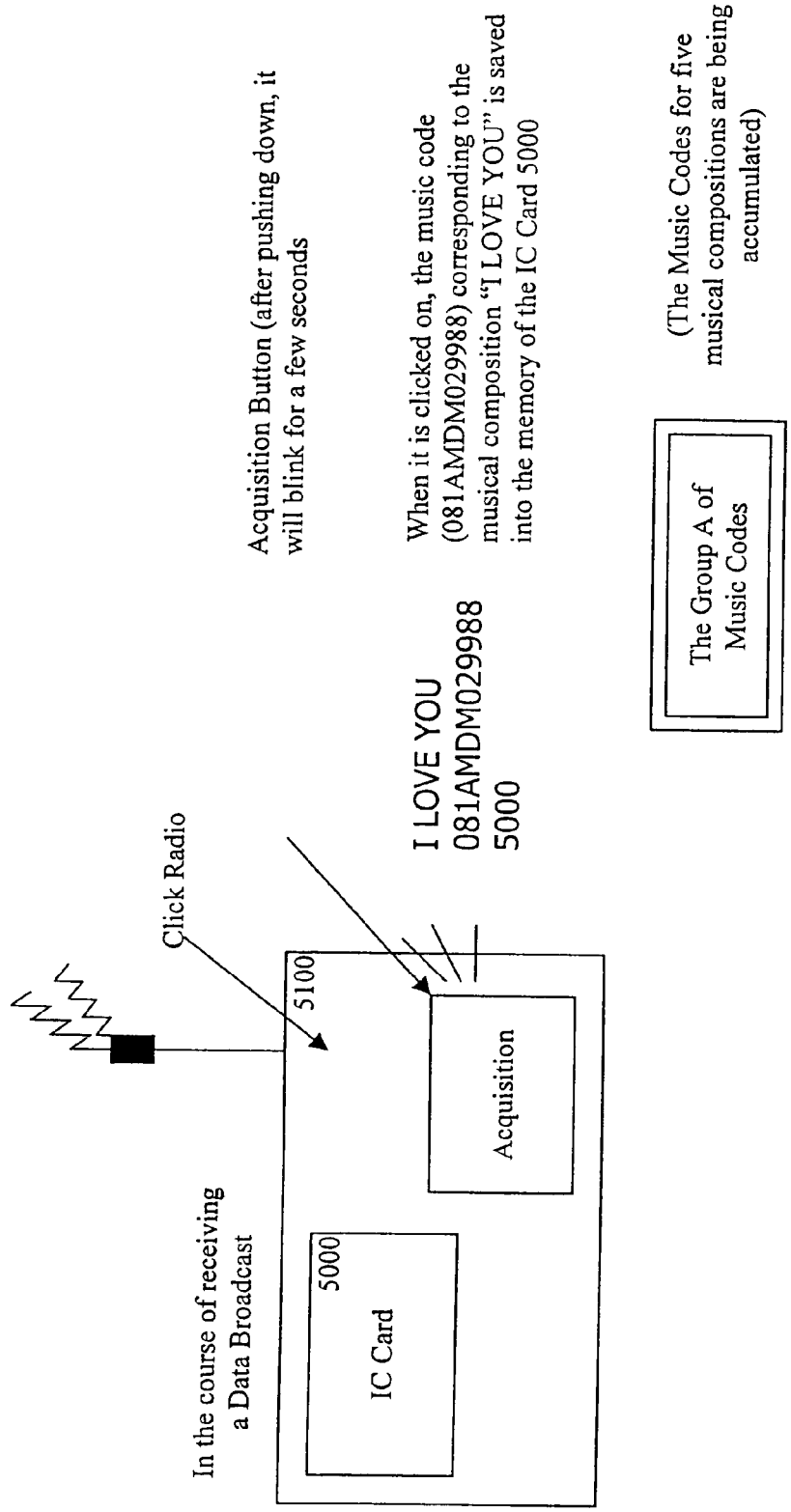
FIGS. 26 to 32 are illustrative diagrams showing an operation of the fifth embodiment shown in FIG. 25.

As shown in FIG. 26, it is assumed that the customer is listening to a music program of FM broadcasting, e.g., "J-WAVE SELECTION", which is broadcast from the broadcasting station 5400. The broadcasting station 5400 broadcasts a musical composition, for example the "Love You" of Seiko Matsuda, and also simultaneously broadcasts the music code 081AMDM029988 corresponding to that musical composition in a data broadcasting band. Then, the customer inserts the IC card 5000 into the click radio 5100 and clicks the acquisition button (not shown) because the customer's favorite music "Love You" of Seiko Matsuda is just on air while listening to the music broadcasting program "J-WAVE SELECTION". By clicking the acquisition button, the music code 081AMDM029988 corresponding to the musical composition "Love You" of Seiko Matsuda is stored into the memory of the IC card 5000.

Similarly, the above described procedures are repeated for acquiring the different musical compositions. The member selects the musical composition such as "Can You Celebrate" by Namie Amuro, from the same music broadcasting program and/or the different music broadcasting program(s) being broadcast from any stations, and then stores the music code corresponding to this musical composition into the memory of the IC card 5000.

Figure 27:
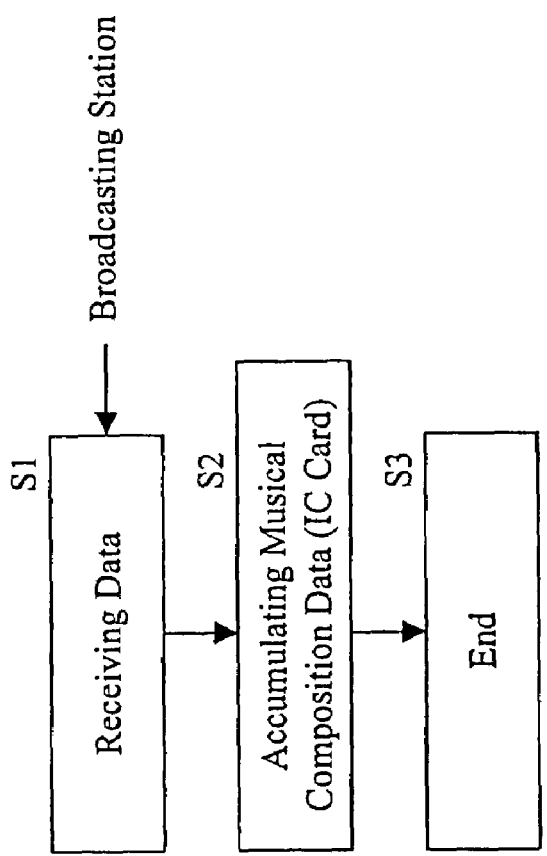

As shown in the flow diagram of FIG. 27, a member acquires several musical compositions from a variety of the music programs (step S1), stores appropriate numbers of music codes, for example the music codes of 5 different musical compositions, into the memory of the IC card (step S2), and completes an accumulation of the musical composition data to the IC card 5000 (a download of the music codes) (step S3).

When the above steps are completed, the customer brings the IC card 5000 to the store 5200 and then applies for the compilation MD production.

5-2. Membership Recognition Step

Figure 28:
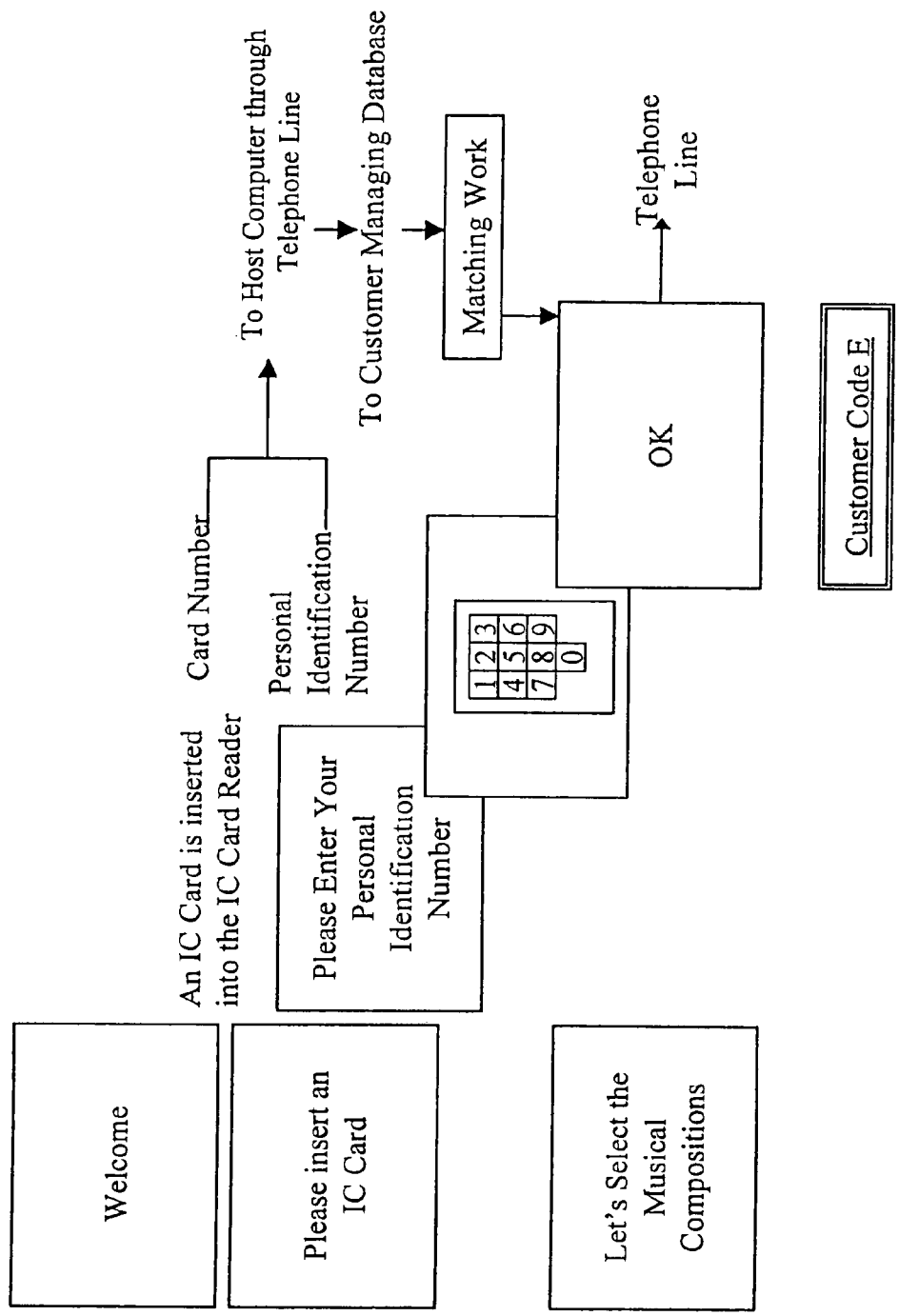

As shown in FIG. 28, at the store 5200, a switch of the purchasing system is turned on by touching an item "START" on a screen of a touch sensor type monitor (hereinafter, it is referred to as the "monitor") in the AAS 5201. A word "WELCOME" is displayed on the monitor screen, and then words "PLEASE INSERT A IC CARD" is displayed on the screen. Herein, as shown in a flowchart of FIG. 29, at the store 5200, at first, the membership recognition process is implemented (step S11). That is, as shown in FIG. 28, if the customer is a registered member of the purchasing system, the customer inserts the IC card into the IC card reader (not shown) of the AAS 5201. After the IC card reader has read the IC card, the words "PLEASE ENTER YOUR PERSONAL IDENTIFICATION NUMBER" is displayed on the monitor. Based on the display thereof, the member enters a personal identification number (hereinafter, it is referred to as the "PIN") which is a unique for each member. The entry of the PIN can be implemented by touching the numbers and/or the alphabet characters displayed on the monitor screen. The information of the entered PIN and the information of the member registration number of the IC card, which has been read in advance by the IC card reader, are transmitted from the communication system 5203 to the host-computer 5302 via a telephone line, a leased line or the Internet through the communication system 5301 of the backchannel company 5300.

Figure 30:
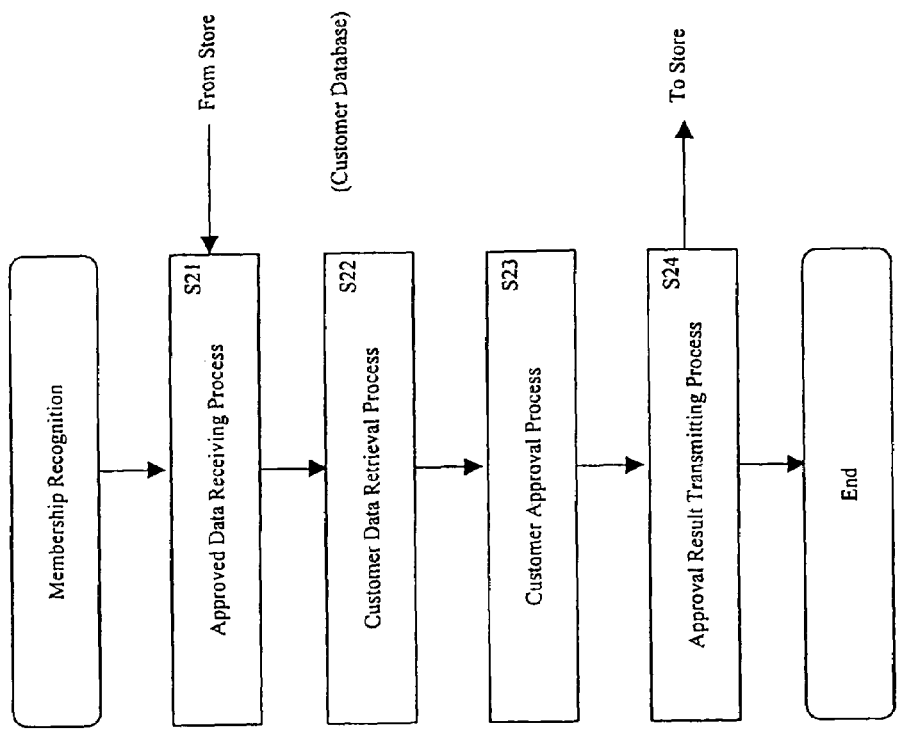

In the backchannel company 5300, as shown in the flowchart of FIG. 30, the host-computer 5302 receives the signals including the information of the PIN and the member registration number (step S21), the host-computer 5302 searches the customer managing database 5310 of the company side database 5312 based on the received information of the PIN and the member registration number (step S22), and makes a matching whether or not the customer is a valid member (step S23), and then transmits the information concerning the result of that matching from the communication system 5301 via the telephone line to the AAS 5201 through the communication system 5203, the controller 5202 of the store 5200 (step S24). Further, the host-computer 5302 produces a customer code E when the customer is a valid member.

Figure 29:
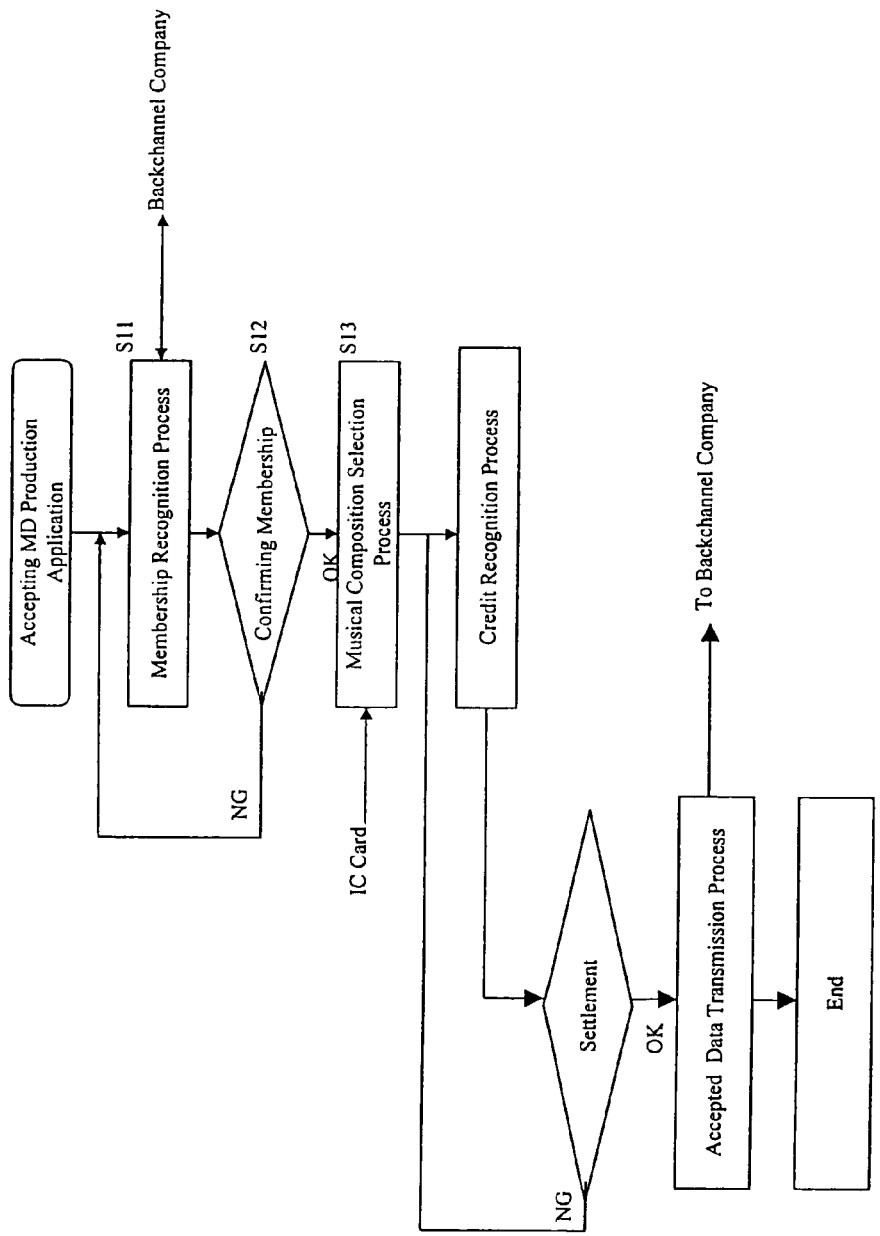

The AAS 5201 in the store 5200 displays the words "OK" on the monitor screen's display when the customer is a valid member based on the signal including the received information concerning the result of the matching, and on the other hand, when the customer is an invalid member, then the AAS 5201 displays the words "INVALID" on the monitor screen's display (step S12 in FIG. 29).

In case that the wrong PIN is entered during the above mentioned operation, it could be constituted such that the PIN can be re-entered by displaying the words "INVALID" on the screen, followed by displaying the words "PLEASE ENTER YOUR PERSONAL IDENTIFICATION NUMBER AGAIN WITH GREAT CARE" on the screen. In this case, as similar to the first embodiment, from a view point of a security, it could be constituted such that the limitation would be imposed on the number of times of which the PIN can be re-entered. Then, if the matching could not be made within the predefined number of times for the re-entry, the purchasing system is automatically turned off.

5-3. Acquisition Musical Composition Display Step

When the words "OK" is displayed on the monitor screen, the monitor displays a list of the musical compositions based on the music data (music codes) being stored in the memory of the IC card 5000 (step S13 in FIG. 29).

That is, "the group A of music codes" constituted of a plurality of music codes for the musical compositions (five musical compositions in this embodiment) as well as "the customer's code E" are generated at the same time when the words "OK" is displayed on the monitor screen. Then, the monitor displays on the screen the words "ACQUISITION CONFIRMATION—THE MUSICAL COMPOSITIONS YOU HAVE SELECTED ARE:", followed by the musical compositions which are acquired in a manner as described above.

5-4. Musical Composition Editing Step 5-4.1. Sorting of Musical Compositions

This step as performed in this embodiment is identical to the musical composition sorting step described previously regarding the first embodiment and FIG. 4.

5-4.2. Musical Composition Test—Confirmation Step

Prior to producing the MD based on the musical compositions being listed along with the display of "THE MUSICAL COMPOSITIONS YOU HAVE SELECTED ARE:", for confirming whether or not these musical compositions are indeed the desired ones by the customer, it is necessary to test a piece of each of the chosen musical compositions.

When the customer turns on the musical composition test device installed in the AAS 5201 in the store 5200 and then puts on a headphone, the customer can listen to lyrics and/or melody for each of the musical compositions listed on the display through the headphone, and the customer also can confirm it visually by looking at an indicator on the display screen, which indicates the portion of the musical composition being played through the headphone with an emphasized tone. This operation can be easily implemented by synchronizing the signal of the musical composition with the signal displaying the list of the musical compositions being displayed on the monitor.

Then, based on the result of this confirmation step of the musical composition test, the following steps "DELETE" and/or "ADD" can be implemented if so desired.

5-4.3. Deletion of Musical Compositions

This step as performed for the AAS 5201 in this embodiment is identical to the musical composition deleting step described previously regarding the first embodiment and FIG. 4.

5-4.4. Addition of Musical Compositions

This step as performed for the AAS 5201 in this embodiment is identical to the musical composition adding step described previously regarding the first embodiment and FIG. 4.

5-5. Design Step

This step as performed for the AAS 5201 in this embodiment is identical to the design step, including the steps of jacket design selection and album title entry, described previously regarding the first embodiment and FIGS. 5 and 6.

5-6. Final Verification Step

This step as performed for the AAS 5201 in this embodiment is identical to the final verification step described previously regarding the first embodiment and FIG. 7.

5-7. Payment Step

Figure 31:
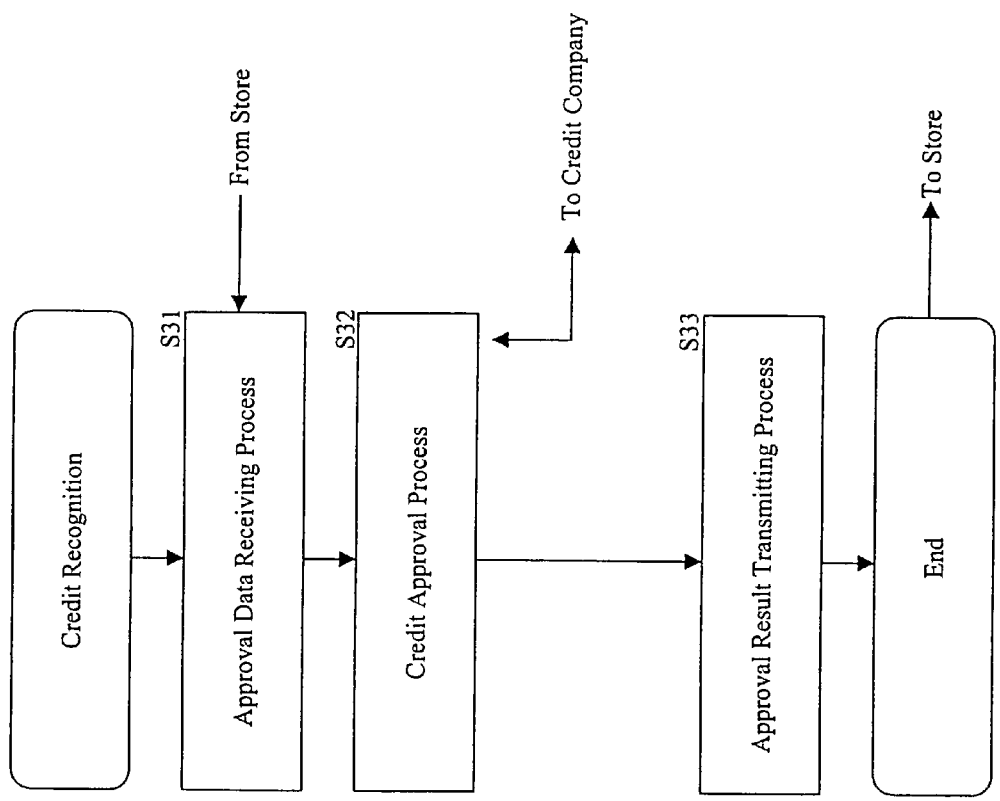

In this embodiment, it is adapted to implement a bank withdrawal automatically with an IC card type-electronic money. As shown in FIG. 31, from the memory of the IC card 5000, the credit information is read by the IC card-reader, and the signal including the credit information is transmitted to the host-computer 5302 in the backchannel company 5300 and the confirmation data receiving process is implemented (step S31), then the credit confirmation process is implemented by retrieving the customer database 5310, the accounting approval database 5311 based on the confirmation data just received (step S32), and the confirmation result transmission process is implemented by transmitting the result thereof to the store 5200 (step S33). Then the "CARD DATA D" is produced by implementing these processes (steps S31–S33).

5-8. Transmission Step

This step as performed for the AAS 5201 in this embodiment is identical to the transmission step described previously regarding the first embodiment and FIG. 9. However, with respect to this embodiment, reference should be made to the host-computer 5302, the backchannel company 5300, the communication system 5203, and the telephone line and the communication system 5301, as shown in FIG. 25.

5-8.1. Accounting Approval

Figure 32:
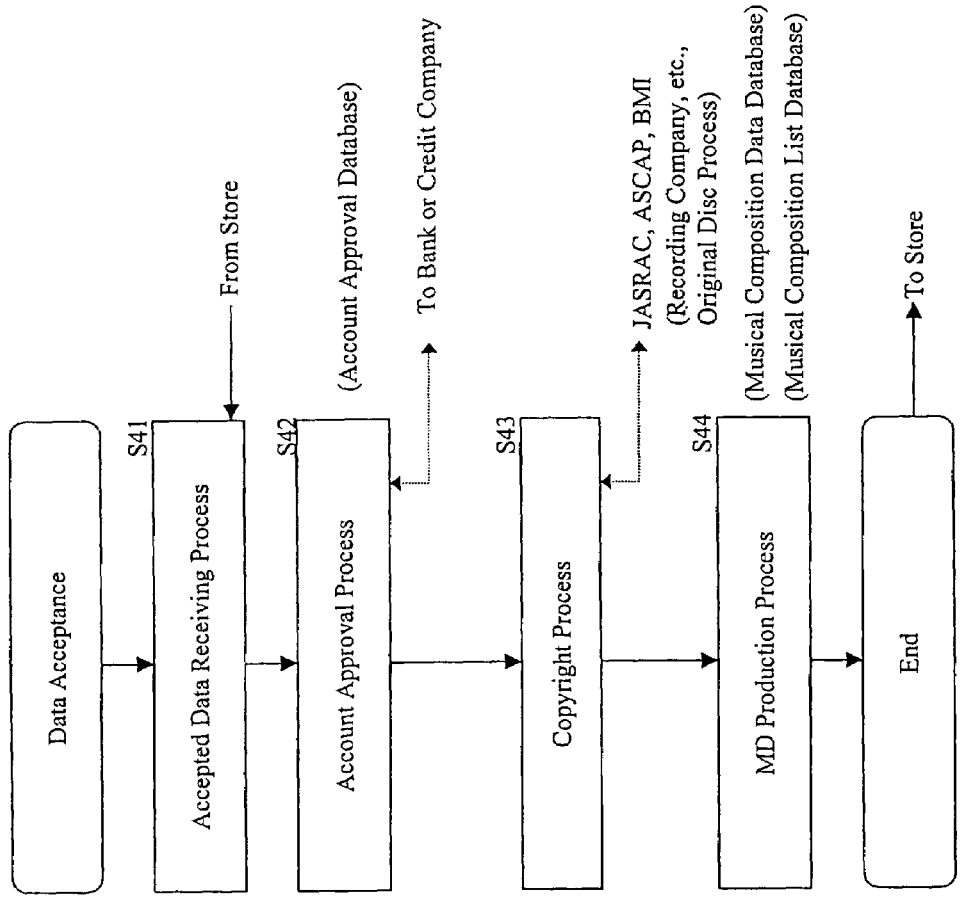

The host-computer 5302 retrieves the customer database 5310 and the accounting approval database 5311 in the company side database 5312, based on the information of "CARD DATA D" and "CUSTOMER CODE E", and the necessary information is sent from these databases to a predetermined financial institution such as a credit company and the like, and then the accounting approval of the customer is carried out (steps S41–S42 in FIG. 32).

5-8.2. Copyright Process

The host-computer 5302 retrieves the musical composition list database 5303 and the copyright database 5306 in the music database 5307, based on the information of "MUSIC CODE GROUP A", and the copyright process and the original disc process are carried out by sending the necessary information from the copyright database 5306 in the music database 5307 to JASRAC, The Harry Fox Agency, as well as to the recording company and the like (step S43 in FIG. 32).

5-9. MD Disc Production Work

This step as performed for the AAS 5201 in this embodiment is identical to the MD disc production work step described previously regarding the first embodiment and FIG. 10, as shown at step S44 in FIG. 32. However, with respect to this embodiment, reference should be made to the backchannel company 5300, the musical composition data database 5304 in the music database 5307 and the MD writer 5308.

5-10. Jacket Production Work

This step as performed for the AAS 5201 in this embodiment is identical to the MD jacket production work step described previously regarding the first embodiment and FIG. 10. However, with respect to this embodiment, reference should be made to the backchannel company 5300, the printer 5309, the musical composition list database 5303 in the music database 5307 and the index database 5305.

5-11. Mailing Work

This step as performed for the AAS 5201 in this embodiment is identical to the MD mailing step described previously regarding the first embodiment and FIG. 10. However, with respect to this embodiment, reference should be made to the host-computer 5302 and the customer database 5310 in the company side database 5312.

By using the system according to the present invention, the various kinds of rights relating to the copyright in the music described as above can be efficiently processed as follows.

FIG. 32 shows the configurations of the main parts of the server-client system which is a part of the backchannel company which will be used for all embodiments described above. In the communication system 5301, the I/O device is connected thereto, as similar to the one shown in FIG. 25.

In the following, the configuration of the host-computer 5302 of the backchannel company 5300 will be described.

The host computer 5302 comprises (a) a requested musical composition discriminating unit 5314 for discriminating whether or not the musical composition requested by the member has already been registered in the system, by retrieving the musical composition list database 5303 and the musical data database 5304, based on the information regarding the musical compositions included in the signal transmitted from the store, (b) a musical composition usage purpose determining unit 5315, connected to the requested musical composition discriminating unit 5314, for determining a usage purpose of the requested musical composition if it were evaluated that the requested musical composition has already been registered in the system, and (c) an applicable copyright related information decision unit 5318, connected to the musical composition database (the musical composition list database 5303 and the musical composition data database 5304), the musical composition usage purpose determining unit 5315, and the database associated with the copyright (the index database 5305 and the copyright database 5306), respectively, for deciding the information associated with the copyright which is applicable to the requested musical composition by retrieving the database associated with the copyright based on the usage purpose of the musical composition determined by the musical usage purpose determining unit 5315 and the information regarding the requested musical composition stored in the musical composition database.

The host-computer 5302 further comprises (d) a musical composition number of use counting unit 5316, connected to the communication system 5301, for counting the number of use of the requested musical composition, (e) an accounting and royalty decision unit 5319, connected to the musical number of use counting unit 5316, the applicable copyright related information decision unit 5318, and the accounting approval database 5311, for deciding the accounting and royalty regarding the requested musical composition, based on the number of use of the musical composition, the applied information associated with the copyright, and the accounting approval information.

The host-computer 5302 still further comprises (f) a customer certification unit 5317, connected to the communication system 5301 and the customer database 5310, for recognizing a membership whether or not the one who has requested the musical composition is a member, based on the information included in the signal transmitted from the store and the customer information (mainly including the information regarding the member, the information of the songwriter (author), the information of the musical composer, the information of the musical arranger, and the information of the agents such as the recording company, the publisher, the entertainment production, and the like) stored in the customer database 5310, and for sending the required membership information to the communication system 5301 by reading it out of the customer database 5310.

The I/O device 5313 is adapted to input/output the signal which includes the information that is different from the one input from the store 5200.

In the present embodiment, it is assumed that the I/O device 5313 is adapted to insert/remove the IC card (the Smart Card), but the I/O device is not limited to this type.

1. Registering of the lyric by the songwriter;
2. Registering of the musical composition by the musical composer;
3. Registering of the musical arrangement by the musical arranger;
4. Registering of the requested musical composition, the usage purpose thereof by the applicant who wishes to use the musical composition (other than the applicant who desires to purchase the MD);
5. Registering of the number of use of the requested musical composition by the user of musical composition (other than the applicant who desires to purchase the MD);
6. Outputting the accounting information to the applicant using the musical composition, who has used the musical composition;
7. Outputting the payment information of the royalty to the songwriter;
8. Outputting the payment information of the royalty to the musical composer;
9. Outputting the payment information of the royalty to the musical arranger;
10. Outputting the payment information to the respective agents; and 11. Registering the updated information to the copyright associated information database 5305, 5306 regarding the copyright associated information, can be easily performed by using the IC card, from the I/O device 5313. It might be arranged to secure the security by utilizing the encryption technique when performing the above mentioned processes of registering.

Furthermore, by providing the musical composition reproducing device which is utilized at a time of using the musical composition, with the card-reader having a function of reading/writing the IC card, and by arranging that the musical composition reproducing device is to be functioned only when the specific IC card (the one registered with membership) has been inserted into the card-reader, the usage time of the musical composition which was used for a broadcasting station and/or a Karaoke-bar is automatically written into the IC card by the card-reader, thereby the information of the usage time of the musical composition can be stored into the IC card. Then by inserting the IC card in which the information of the usage time of the musical composition is stored into another card-reader for use in the IC card installed in the I/O device and by reading the information of the usage time of the musical composition stored therein, an illegal usage of the musical composition can be prevented, as well as the proper accounting approval and the returning of the royalty can be performed for the musical composition that has been used.

In that case, it is only required to arrange that the data broadcasting signal to be transmitted to the broadcasting station and/or the Karaoke-bar possesses at least a portion including the information regarding the musical composition itself, another portion including the information of the music code corresponding to the musical composition, and still another portion including the information regarding the usage time of the musical composition. Among these, for the portion including the information of the music code corresponding to the musical composition and the portion including the information regarding the usage time, the illegal act (cheating) by the user of the musical composition can be prevented from happening by incorporating the "water mark" into the data broadcasting signal by utilizing the related technology.

Herein, the respective copyrights of the music in Japan and in the United States of America will be illustrated briefly, as well as it will be described that the complex copyrights can be efficiently processed by utilizing the system of the present invention shown in FIGS. 25 and 33.

In Japan, there are three kinds of copyright owners for the music at large:

1. Songwriter, Musical composer, Musical arranger, and Publisher (all are the copyright owners)
2. Artist (the neighboring rights owner)
3. Record producer (the neighboring rights owner)

In order to illustrate the copyrights that might be possessed by the above mentioned copyrights owners, the musical composition "Akai Sweet-pea" of Seiko Matsuda will be used as an example (the description for the musical arranger thereof will be omitted for simplification).

1) Genre (Type): Modern Japanese Music
2) Title of the Musical Composition: Akai Sweet-pea
3) Artist: Seiko Matsuda
4) Songwriter: Takashi Matsumoto
5) Musical Composer: Karuho Kureta
6) Produced Date: Jul. 1, 1982
7) Original disc produced place: Japan
8) Original disc producer: Sun Music Publisher
9) Record producer: Sun Music Entertainment
10) Representative Publishing Country: Japan
11) Representative Publisher: Sun Music Publisher
12) Copyright Administrative Organization(s):
   a. Mechanical Rights (option)
   b. Performing Rights (option)

In this example, the composition has two copyright owners, one for the songwriting (lyric) and another for the musical composition, and they are the songwriter Takashi Matsumoto and the music composer Karuho Kureta (known as Yumi Matsutoya, in general). The artist Seiko Matsuda is the neighboring rights owner (will be described later).

The songwriter Takashi Matsumoto and the music composer Karuho Kureta have:

A. As the Writer (Author) Personal Rights:
(a1) Publication Rights;
(a2) Name Display Rights;
   The rights for requesting to display the names of the songwriter/musical composer when the musical composition is to be broadcast on TV.
(a3) The Sameness Maintenance Rights
   The rights for requesting to not broadcast the parody of the musical composition when it is broadcast on the TV/radio.
B. As the Copy (Property) Rights:
(b1) Reproduction (Reprint) Rights;
   Exclusive rights for reproducing the musical composition onto a record, tape, videotape, etc.
(b2) Performing Rights;
   Exclusive rights for performing the musical composition at a concert/Karaoke, etc.
(b3) Public Transmission Rights;
   Exclusive rights for broadcasting, transmitting the musical composition on TV, radio, the cable broadcast, the internet, etc.
(b4) Lending Rights;
   Exclusive rights for lending the reproduction of the musical composition to the public.
(b5) Adaptation Rights;
   Exclusive rights for translating, arranging, filming the musical composition.
(b6) Utility Rights of Secondary Writing
   Exclusive rights for utilizing the adapted musical composition.
(b7) Personal Recording/Filming Compensation Payment Demanding Rights;
   Rights for demanding the compensation payment regarding the personal reproduction by the digital device.

The artist Seiko Matsuda (and the group of Accompanists of the musical composition) has the following neighboring rights:
(c1) Recording/Filming Rights;
   Exclusive rights for recording/filming the performance of the artist(s).
(c2) Broadcasting/Cable Broadcasting Rights;
   Exclusive rights for broadcasting/cable broadcasting the performance of the artist(s).
(c3) Lending Rights;
   Exclusive rights for lending to the public commercial record on which the performance is recorded (for one year after the release according to the regulation).
(c4) Transmission Enabling Rights;
   Exclusive rights for uploading the performance of the artist(s) to the server.
(c5) Rights to Demand the Secondary Usage Payment of the Commercial Record;

Rights for demanding the secondary usage payment, when the commercial record on which the performance is recorded is to be used for the broadcast or for the cable broadcast.
(c6) Lending Remuneration Demanding Rights;
Rights for demanding the remuneration, when the commercial record on which the performance is recorded is used by the lending after having past one year since it had been released.
(c7) Personal Recording/Filming Compensation Payment Demanding Rights;
Rights for demanding the compensation payment regarding the personal reproduction by the digital device.

The record producer, i.e., the producer of a master tape (hereinafter, it is referred to as the original disc) has the following neighboring rights the same as the artist(s) does:
(d1) Reproduction Rights;
Exclusive Rights for producing a record, video tape, by reproducing the original disc.
(d2) Lending Rights;
Exclusive rights for lending to the public the commercial record on which the original disc is reproduced (for one year after the release according to the regulation).
(d3) Transmission Enabling Rights;
Exclusive rights for uploading the performance (the reproduction of the original disc) of the artist(s) to the server.
(d4) Rights to Demand the Secondary Usage Payment of the Commercial Record;
Rights for demanding the secondary usage payment, when the commercial record on which the original disc is reproduced is to be used for the broadcast or for the cable broadcast.
(d5) Lending Remuneration Demanding Rights;
Rights for demanding remuneration when the commercial record on which the original disc is reproduced is used by the lending after having past one year since it had been released.
(d6) Personal Recording/Filming Compensation Payment Demanding Rights; Rights for demanding the compensation payment regarding the personal reproduction by the digital device.

Now, returning to FIGS. 25 and 33, the operation of the system of the present invention, in particular, the information flow associated with the copyright will be described.

Consider that when the customer is listening to a music program on the click radio 5100, the musical composition the "Akai Sweet-pea" of Seiko Matsuda is on air, so the customer inserts the IC card 5000 into the click radio 5100 and stores the music code 081AMDM029998 of the musical composition "Akai Sweet-pea" into the memory of the IC card 5000 by clicking the acquisition button (for the simplicity, it is assumed that only one musical composition is stored).

Then, the customer brings the IC card 5000 to the store 5200 and then applies for the compilation MD production by inserting the IC card 5000 into the IC card-reader of the "AAS" 5201. The control unit 5202 sends the signal including the information of the music code 081AMDM029998 read by the IC card-reader to the host-computer 5302 of the backchannel company 5300 through the communication systems 5203, 5301.

In the host-computer 5302 that received the signal, at first the requested musical composition discriminating unit 5314 retrieves the musical composition databases 5303, 5304 based on the information of the music code 081AMDM029998, and then evaluates whether or not the requested musical composition has already been registered in the system. Here, it is assumed to be evaluated as "having already been registered". Next, the musical composition usage purpose determining unit 5315 determines the usage purpose of the requested musical composition based on the information of the musical composition usage purpose included in the signal. Herein, since the information of "a personal recording to the MD" has been added when the signal was being sent from the store 5200, it is determined that the musical composition usage purpose is "a personal recording to the MD". Then, the applicable copyright related information decision unit 5318, obtains the following information,
(3) Artist: Seiko Matsuda
(4) Songwriter: Takashi Matsumoto
(5) Musical Composer: Karuho Kureta
(6) Produced Date: Jul. 1, 1982
(7) Original disc produced place: Japan
(8) Original disc producer: Sun Music Publisher
(9) Record producer: Sun Music Entertainment
among the above information by retrieving the musical composition databases 5303, 5304 based on the information of the musical composition usage purpose "a personal recording to the MD", and evaluates the information of:
1. The rights associated with the copyright which the songwriter Takashi Matsumoto and the music composer Karuho Kureta have, i.e.,
   (a1) Publication Rights;
   (a2) Name Display Rights;
   (a3) The Sameness Maintenance Rights;
   (b1) Reproduction (Reprint) Rights;
   (b2) Performing Rights;
   (b3) Public Transmission Rights;
   (b4) Lending Rights;
   (b5) Adaptation Rights;
   (b6) Utility Rights of Secondary Writing;
   (b7) Personal Recording/Filming Compensation Payment Demanding Rights;
2. The rights associated with the neighboring rights which the artist Seiko Matsuda has, i.e.,
   (c1) Recording/Filming Rights;
   (c2) Broadcasting/Cable Broadcasting Rights;
   (c3) Lending Rights;
   (c4) Transmission Enabling Rights;
   (c5) Rights to Demand the Secondary Usage Payment of the Commercial Record;
   (c6) Lending Remuneration Demanding Rights;
   (c7) Personal Recording/Filming Compensation Payment Demanding Rights;
3. The rights associated with the neighboring rights which the SONY music entertainment, i.e., the record producer, has;
   (d1) Reproduction Rights;
   (d2) Lending Rights;
   (d3) Transmission Enabling Rights;
   (d4) Rights to Demand the Secondary Usage Payment of the Commercial Record;
   (d5) Lending Remuneration Demanding Rights;
   (d6) Personal Recording/Filming Compensation Payment Demanding Rights;

by retrieving the copyright associated databases 5305, 5036.

Herein, it is assumed that the usage registration by the broadcasting business has already been made through the I/O device 5313 prior to broadcasting the music program on the radio.

Among the copyright associated information described above, the appropriate rights are evaluated by the applicable copyright related information decision unit 5318, based on the information of the "a personal recording to the MD".

Next, the musical composition usage time counting unit 5316 counts the number of times for which the musical composition is used. The accounting and royalty decision unit 5319 retrieves the accounting approval database 5311 based on the information resulted from the counting by the musical composition usage time counting unit 5316 and the information of the rights associated with the copyright evaluated by the applicable copyright related information decision unit 5318, calculates the accounting and royalty, and sends the calculated result to the store 5200 through the communication system 5301, as well as outputs the information regarding the royalty to the respective copyright owners, and the respective agents through the I/O device 5313.

In the above example, the copyrights listed are effective only within Japan; thus it is only necessary to consider the following information relating to Japanese Copyright Law with respect to the copyright law. In general, the copyright of music in Japan is managed by JASRAC (the Japanese Society for Rights of Authors, Composers and Publishers). JASRAC, as entrusted by the music copyright owners, permits a utilization of the music to a user thereof, collects and distributes the usage fee of the writings. Accordingly, if all of the copyright owners were the registered members of JASRAC, the respective right items described above (a1) to (d6) can be simplified as "JASRAC registered members", thus the operations/functions of the applicable copyright related information decision unit 5318 and the accounting and royalty decision unit 5319 can be simplified.

In the following, a copyright in the United States of America (hereinafter, it is referred to as a U.S. copyright) will be briefly described. Five different rights as listed below can categorize the U.S. copyright:
1. The right to reproduce;
2. The right to distribute;
3. The right to prepare derivative works;
4. The right to perform; and
5. The right to display.

In a U.S. copyright, the rights corresponding to the Writer (Author) Personal Rights (not defined in the text of the Law) and the Neighboring rights of the Japanese Copyright Law are not included.

Herein, a U.S. copyright of music will be described by comparing it with a Japanese copyright.

In Japan, the subject of the copyright, i.e., the writing, is the musical composition (the lyric and the melody); thus, the songwriter and the musical composer have the copyright, as well as the recording producer and the artist have the neighboring rights. On the other hand, in the U.S., the subject of the copyright, i.e., the production, is a record, and the copyright is considered practically as described below.

Publisher (representing the songwriter/musical composer) has, for the records,
(f1) Performance Rights (performing rights);
(f2) Mechanical Rights (a kind of reproducing rights);
  The rights for recording.
(f3) Synchronization Rights (a kind of the adaptation rights);
  The rights for combining with the images in the CM, motion pictures and videos.
(f4) Publication Rights (a kind of the publishing rights);
  The rights for publishing the music score, etc.
Recording Company has, for the records,
(g1) The Rights regarding the sound recording;
(g2) Performance Rights (limited to the digital items).

Now, consider the music composition "LIVIN' ON A PRAYER" by Bon Jovi, as an example.
1) Genre (Type): Western Music
2) Title of the Musical Composition: LIVIN' ON A PRAYER
3) Sub-Title: none
4) Japanese Title: . . .
5) Artist: Bon Jovi
6) Songwriter: Bon Jovi (ASCAP)
  Sambora Richard (ASCAP)
  Child Desmond (ASCAP)
7) Musical Composer: Bon Jovi (ASCAP)
  Sambora Richard (ASCAP)
  Child Desmond (ASCAP)
8) Produced Date: 1986
9) Original disc produced place: United States of America
10) First issued place: United States of America
11) Original disc right owner: Polygram Records, Inc.
12) Licensee: Polygram Music Japan, Inc.
13) Original Publisher: Bon Jovi Publishing
  Aggressive Music
  Desmobile Inc.
14) First Sub-Publisher: Polygram International Publishing Inc.
  EMI April Music Inc.
15) Sub-Publisher: Polygram Music Japan, Inc.
  Shinko Music Publishing Co., Ltd.

Bon Jovi as the songwriter/musical composer enters into a contract with the publisher (for example, with the Original Publisher such as he Bon Jovi Publishing, etc and with the First sub-publisher such as the Polygram International Publishing Inc., etc. The publisher has, as described above, for the musical composition of the Bon Jovi,
(f1) Performance Rights;
(f2) Mechanical Rights;
(f3) Synchronization Rights; and
(f4) Publication Rights.

On the other hand, Bon Jovi as the artist, enters into a contact with the recording company (for example, the Polygram, Inc.). The recording company has,
(g1) The Rights regarding the sound recording; and
(g2) Performance Rights (limited to the digital items).

In the U.S., generally, the performance rights are administered by the organization such as the ASCAP, BMI, SESAC and the like, and the administrative organization collects the royalty (royalties) from the TV station, the radio station, the nightclub, and the like. The synchronization rights are administered by the publisher, and the mechanical rights are administered either by the publisher themselves or by the Harry Fox Agency (hereinafter, it is referred to as Harry Fox) and the like.

Harry Fox is a part of the NMPA (National Music Publishers Association) and conducts the copyright administration, and represents more than 13,000 publishers. For the mechanical rights, a predetermined amount of fee is collected for each record according to Section 115 of the U.S. Copyright Law. Accordingly, for mechanical rights, Harry Fox collects the predetermined amount of fee from the recording company, and handles it to the publisher, and then the publisher pays to the songwriter/music composer in accordance with the contract.

On the other hand, the synchronization rights are evaluated by the negotiation basis. Further, the artist receives the artist royalty on the negotiation basis for one record each from the recording company.

As described above, the contents of the copyright for the music differ from each country. Accordingly, the royalties should be returned to a songwriter, a musical composer, a musical arranger, and an artist are, in principle, dependent on the contents of rights which the respective right owners have as defined by the copyright of the respective countries.

However, in practice, large numbers of the songwriters, the musical composers, the musical arrangers, and the artists who are not associated with the specific agents such as the publishers, the recording companies, the entertainment productions, and it is arranged so that these agents act as the representative for these people and pay the royalties to the respective songwriters, musical composers, musical arrangers, artists who are the applicable right owners.

For services conducted by the agents such as the recording companies, the publishers and the like, specific rights occur as described above, and royalties are paid to the respective agents depending on their services.

In case of the songwriters, the musical composers, the musical arrangers, and the artists who are not associated with these agents such as described above, they will independently negotiate with the users for the royalties, based on the rights they have respectively.

Figure 33:
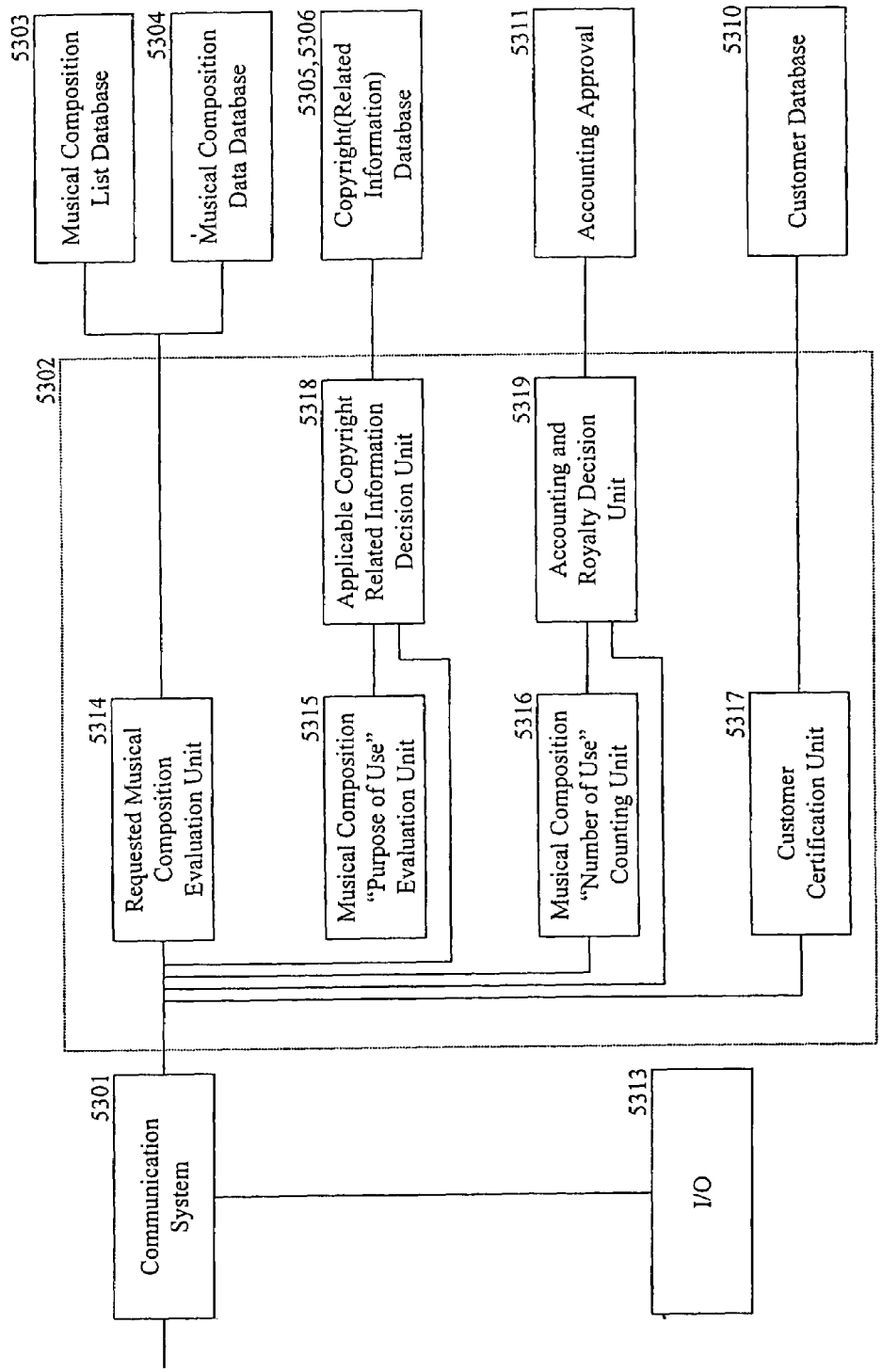
FIG. 33 is a diagram showing one example of the configurations of the main parts of the server-client system shown in FIG. 25.

Herein, it will describe about the case of "recording to the MD" the musical composition of Bon Jovi, again, by using the system of the present invention shown in FIGS. 25 and 33.

Consider that when the customer is listening to a music program on the click radio 5100, the musical composition "LIVIN' ON A PRAYER" of Bon Jovi is on air, so that the customer inserts the IC card 5000 into the click radio 5100 and stores the music code of the musical composition "LIVIN' ON A PRAYER" into the memory of the IC card 5000 by clicking the acquisition button installed in the click radio 5100 (for simplicity, it is assumed that only one musical composition is stored, similar to the previous example).

Then, the customer brings the IC card 5000 to the store 5200 and applies for the compilation MD production by inserting the IC card 5000 into the IC card-reader of the "AAS" 5201. The control unit 5202 sends the signal including the information of the music code read by the IC card-reader to the host-computer 5302 of the backchannel company 5300 through the communication systems 5203, 5301.

In the host-computer 5302 that received the signal, at first the requested musical composition discriminating unit 5314 retrieves the musical composition databases 5303, 5304 based on the information of the music code, and then evaluates whether or not the requested musical composition has already been registered in the system. Here, it is assumed to be evaluated as "having already been registered". Next, the musical composition usage purpose determining unit 5315 determines the usage purpose of the requested musical composition based on the information of the musical composition usage purpose included in the signal. Herein, since the information of "a personal recording to the MD" has been added when the signal was being sent from the store 5200, it is determined that the musical composition usage purpose is "a personal recording to the MD". Then, the applicable copyright related information decision unit 5318, obtains the following information, 5) Artist: Bon Jovi
6) Songwriter: Bon Jovi (ASCAP)
   Sambora Richard (ASCAP)
   Child Desmond (ASCAP)
7) Musical Composer: Bon Jovi (ASCAP)
   Sambora Richard (ASCAP)
   Child Desmond (ASCAP)
8) Produced Date: 1986
9) Original disc produced place: United States of America
10) First issued place: United States of America
11) Original disc right owner: Polygram Records, Inc.
12) Licensee: Polygram Music Japan, Inc.
13) Original Publisher: Bon Jovi Publishing
    Aggressive Music
    Desmobile Inc.
14) First Sub-Publisher: Polygram International Publishing Inc.
    EMI April Music Inc.
15) Sub-Publisher: Polygram Music Japan, Inc.
    Shinko Music Publishing Co., Ltd.

among the above information by retrieving the musical composition databases 5303, 5304 based on the information of the musical composition usage purpose "a personal recording to the MD", and evaluates the information of 1. the rights associated with the copyright of which the publisher has, i.e.,
   (f1) Performance Rights (performing rights);
   (f2) Mechanical Rights (a kind of reproducing rights);
   (f3) Synchronization Rights (a kind of the adaptation rights);
   (f4) Publication Rights (a kind of the publishing rights); and
2. the rights associated with the copyright of which the recording company has, i.e.,
   (g1) Rights regarding the sound recording;
   (g2) Performance Rights (limited to the digital items), by retrieving the copyright associated databases 5305, 5306. Herein, it is assumed that the usage registration by the broadcasting business has already been made through the I/O device 5313 prior to broadcasting the music program on the radio.

Among the copyright associated information described above, the appropriate rights are evaluated by the applicable copyright related information decision unit 5318, based on the information of the "a personal recording to the MD".

Next, the musical composition usage time counting unit 5316 counts the number of times for which the musical composition is used. The accounting and royalty decision unit 5319 retrieves the accounting approval database 5311 based on the information resulted from the counting by the musical composition usage time counting unit 5316 and the information of the rights associated with the copyright evaluated by the applicable copyright related information decision unit 5318, calculates the accounting and royalty, and sends the calculated result to the store 5200 through the communication system 5301, as well as outputs the information regarding the royalty to the respective copyright owners, and the respective agents, herein they are the publishers and the recording companies of the Unites States of America since it is related to the U. S. Copyright, through the I/O device 5313, by utilizing the Internet and the like.

In case of the musical composition of Bon Jovi, since the recording company and the publisher which administer the musical composition of Bon Jovi reside in Japan, it is only necessary to send the calculated results of the royalties to these agents in Japan.

On the other hand, in case of no agent and recording company residing in Japan for the musical composition that is desirable to obtain a usage permit, the usage permit of the musical composition can be easily implemented and the payment procedure of the royalties to the copyright owners for the use of the musical composition can be properly made, by using the system of the present invention, under the condition that the musical composition has already been registered in advance. Furthermore, in case of the musical composition having not been registered yet, the usage permit of the musical composition can be obtained by requesting the copyright owner(s) to register the musical composition from the I/O device according to the present invention.

Figure 34:
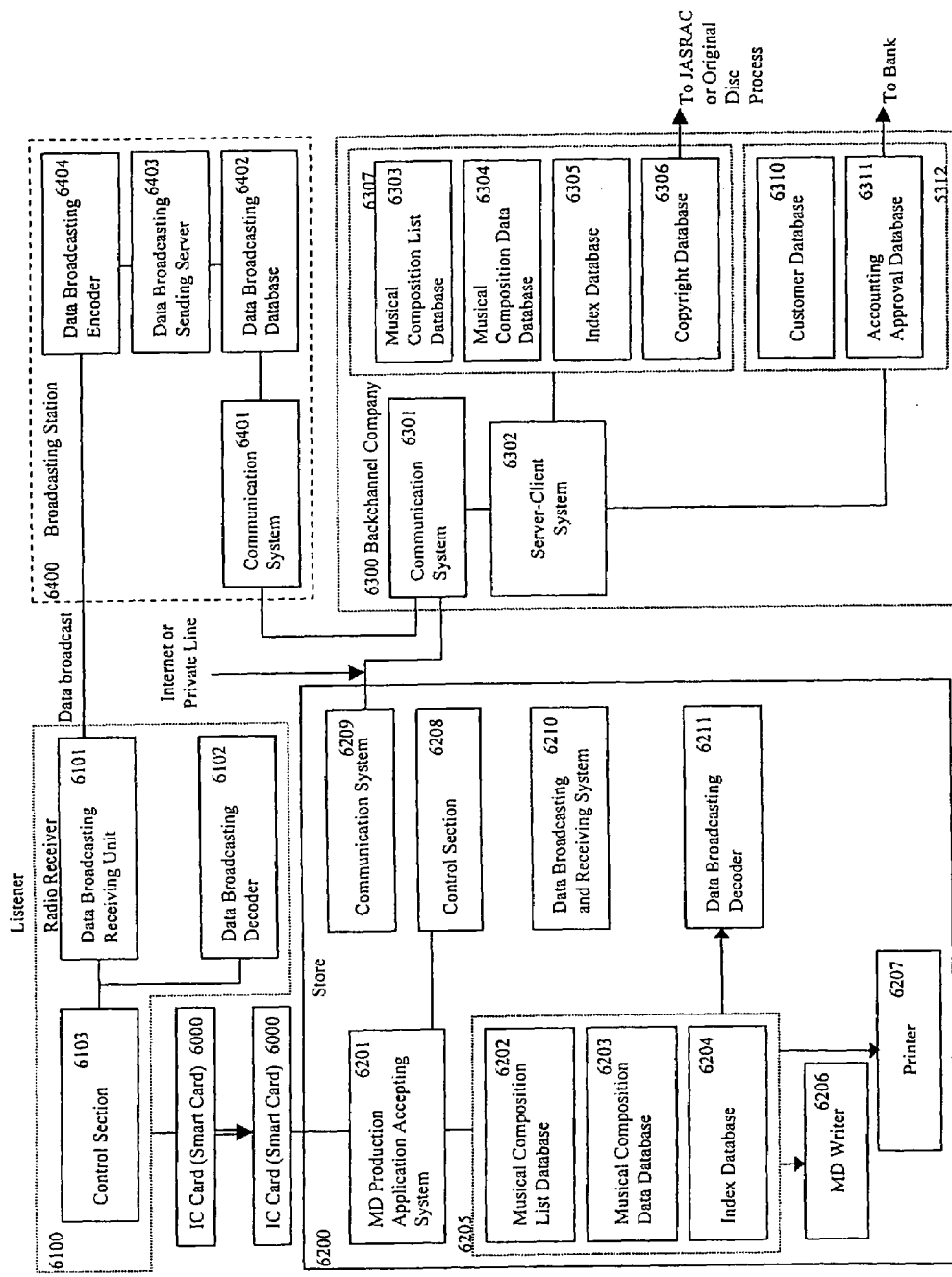
FIG. 34 is a schematic diagram showing a sixth embodiment of the purchasing system according to the present invention.

FIG. 34 is a schematic diagram showing a sixth embodiment of the purchasing system according to the present invention. The sixth embodiment is similar to the fifth embodiment except that the MD is produced in the KIOSK rather than in the backchannel company. Accordingly, the prerequisites of the sixth embodiment are identical to the ones of the fifth embodiment, and thus we do not describe them here.

As shown in FIG. 34, the main parts of the purchasing system in this embodiment are composed of an IC card 6000, a click radio 6100, a store 6200, a backchannel company 6300, and a broadcasting station 6400.

The IC (Integrated Circuit) card 6000 is constituted of a central processing unit (CPU) and a memory (e.g., EPROM) (not shown), and the information regarding the membership registration number by registering the membership (or the identification number) is to be stored into the memory of the IC card 6000.

The click radio 6100 is constituted of a data broadcasting receiver 6101, a data broadcasting decoder 6102 connected to the data broadcasting receiver 6101, and a controller 6103 connected to both of the data broadcasting receiver 6101 and the data broadcasting decoder 6102. The data broadcasting receiver 6101 includes a FM/AM broadcasting receiving function for receiving a plurality of music broadcasting programs being broadcast from the various broadcasting stations. The data broadcasting decoder 6102 reproduces analog music signals by digital-to-analog converting digital signals of the music broadcasting program(s) as well as reproduces the music codes by decoding the data broadcasting signals corresponding to the digital signals of the music broadcasting program(s) both of which are received by the data broadcasting receiver 6101. The controller controls both of the data broadcasting receiver 6101 and the data broadcasting decoder 6102 in order to store the reproduced music codes corresponding to the musical compositions in the music program(s) being broadcast from the broadcasting station 6400 into the memory of the IC card 6000 by pressing the acquisition button installed in the click radio 6100 while the customer is listening to the reproduced music program(s) on air.

As shown in FIG. 34, the store 6200 is the KIOSK, and includes a MD production application accepting system 6201 (as before, it is referred to as the "AAS" hereinafter) which is composed of a monitor, an IC card-reader, and a database retrieval/application terminal (not shown), a store side database 6205 connected to the AAS 6201 and composed of a musical composition list database 6202, a musical composition data database 6203 and an index database 6204, a MD writer 6206 connected to the store side database 6205, a printer 6207 connected to the store side database 6205, a controller 6208 connected to the AAS 6201, a communication system 6209 connected to the controller 6208, a data broadcasting receiving system 6210, and a data broadcasting decoder 110 connected to both the data broadcasting receiving system 6210 and the store side database 6205.

The backchannel company 6300 includes a communication system 6301 connected to the communication system 6209 of the store 6200 via a telephone line, a server-client system (hereinafter, it is referred to as the "host-computer") 6302 connected to the communication system 6301, a music database 6307 connected to the host-computer 6302 and composed of a musical composition list database 6303, a musical composition data database 6304, an index database 6305 as well as a copy right database 6306, and a company side database 6310 connected to the host-computer 6302 and composed of a customer database 6308 as well as an accounting approval database 6309.

The broadcasting station 6400 includes a communication system 6401 connected to the communication system 6301 in the backchannel company 6300 through the satellite wave and the like, a broadcasting data database 6402 connected to the communication system 6401, a broadcasting data sending server 6403 connected to the broadcasting data database 6402, and a data broadcasting encoder 6404 connected to the data broadcasting receive 6102 of the click radio 6100 through the broadcasting data sending server 6403 and the satellite wave.

In the following, referring to FIGS. 9, 10, 31, 32 and 33, an operation of the purchasing system shown in FIG. 34 will be described in detail.

However, among the following steps, the detailed descriptions of the ones which are the same as the steps described in the fifth are omitted;

6-1. IC Card Acquisition Step 6-2. Membership Recognition Step 6-3. Acquisition Musical Composition Display Step 6-4. Musical Composition Editing Step 6-4.1. Sorting of Musical Compositions 6-4.2. Musical Composition Testing Confirmation Step 6-4.3. Deletion of Musical Compositions 6-4.4 Addition of Musical Compositions 6-4.5. Jacket Design Selection 6-4.6. Album Title Entry 6-5. Final Verification Step 6-6. Payment Step 6-7. MD Production Step 6-7.1. MD Disc Production Work This step as performed in this embodiment is identical to the MD disc production step described previously regarding the second embodiment and FIG. 16, wherein the recording is implemented in a KIOSK, that is, in a store 6200 such as a convenience store or a gas station and the like. However, with respect to this embodiment, reference should be made to the musical composition data database 6202 in the store side database 6205 is searched and the MD writer 6206.

6-7.2. Jacket Production Work

This step as performed in the store 6200 in this embodiment is identical to the MD jacket production work step described previously regarding the first embodiment and FIG. 10. However, with respect to this embodiment, reference should be made to the printer 6207, the musical composition list database 6202 in the store side database 6205 and the index database 6204.

When the above mentioned MD disc production work and the above mentioned jacket production work are completed, the customer could obtain the desired MD at the store 6200 such as a KIOSK and the like.

6-8. Transmission Step

After having completed the above mentioned payment step, the "MUSIC CODE GROUP A", "CARD DATA D" and "CUSTOMER CODE E", which have been produced as described above, are transmitted to the host-computer 6302 which is provided in the backchannel company 6300 through the communication system 6209, the telephone line and the communication system 6301, as shown in FIG. 34.

The following steps are also omitted since they are similar to the ones in the fifth embodiment;

6-9. Backchannel Company's Work Step 6-9.1. Accounting Approval 6-9.2. Copyright Process 6-10. Musical Composition Database Update Step This step as performed in this embodiment is identical to the musical composition database update step described previously regarding the second embodiment. However, with respect to this embodiment, reference should be made to the broadcasting station 6400, the store 6200, the backchannel company 6300, the musical composition list database 6303, the musical composition data database 6304 and the index database 6305 of the music database 6307, the host-computer 6302, the communication system 6301, the communication system 6401, the broadcasting data database 6402, broadcasting data sending server 6403, the data broadcasting encoder 6404, the data broadcasting receiving system 6210 in the store 6200, the data broadcasting decoder 6211, the musical composition list database 6202, and the musical composition data database 6203 and the index database 6204 in the store side database 6205.

Accordingly, the purchasing system according to the present embodiment is so configured that the newest music information is always stored in the store 6200, and thus it could respond to the needs for the customers.

As described above, the usage permit of the musical compositions of domestic as well as of all over the world can be easily implemented, as well as the payment procedure of the royalties to the copyright owners for the usage of the musical compositions can be easily and accurately made in the global scale by using the system of the present invention.

In the above embodiments, the IC card is applied for the portable type click radio, but the type of the radio is not limited to the portable type click radio. The type of radio could be an automobile (car) radio of the IC card applicable type or a stationary radio at home or at office of the IC card applicable type and the like. The system according to the present invention can be adapted for a use with a TV set of the IC card applicable type and/or a personal computer (desktop, notebook-size, etc.) of the IC card applicable type as well.

The system of the present invention can be adapted for a musical program that is to be broadcast through air (i.e., wireless radio waves) or through the cables from the TV and/or radio broadcasting stations.

Figure 35:
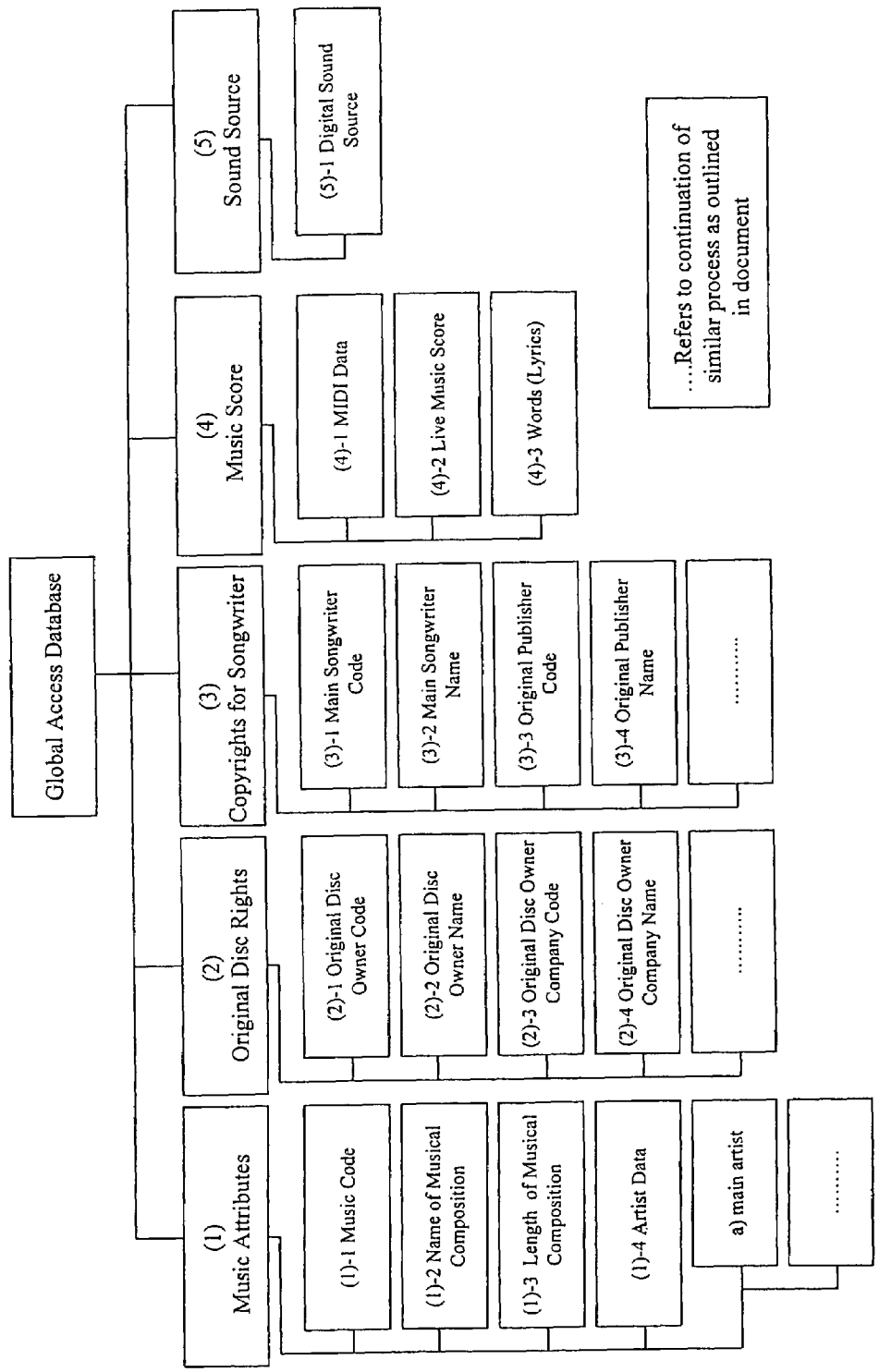
FIG. 35 is a diagram showing another embodiment of the music database according to the present invention.

FIG. 35 shows another embodiment of the music database according to the present invention, configured as similar to the one shown in FIG. 11, with some additional features which will be described in detail below. Since the basic components are similar to the ones shown in FIG. 11, the substantial parts shown in FIG. 35 are almost the same, but the contents thereof are different as can be seen in the following descriptions.

The music database of the present embodiment includes five categories of (1) the music attribution, (2) the original disc right, (3) the copyright, (4) the music score, and (5) the sound source, as shown in FIG. 35. In the following, each of the categories will be described in detail, but these details are not shown in FIG. 35 because of the volume of the database is quite large. Thus the only the substantial parts of the contents are shown in FIG. 35, but each substantial part includes the layers described below, with the same numerals shown in FIG. 35. In other words, the music database in this embodiment should be configured with the following layers.

(1) Music Attribution (1)-1 music code: only code allocated for a specific musical composition. For example, to the musical composition of a new version, a new and entirely different code is allocated for the same musical composition with a new version. Furthermore, the musical composition remixed-down with the same musical material is considered to be a different musical composition and thus a new code is allocated therefor.

(1)-2 name of musical composition; domestic name/international name (1)-3 minutes for musical composition (1)-4 artist data a) main artist a-1) main artist code; code representative of the main artist(s) who sings/plays the musical composition.

a-2) main artist name; name of the main artist(s) who sings/plays the musical composition.

a-3) code representative of the company to which the main artist(s) belong; a company code when the artist(s) is not independently active but belongs to some company(s).

a-4) name representative of the company to which the main artist(s) belong; a company name when the artist(s) is not independently active but belongs to some company(s).

a-5) code representative of the organization to which the main artist(s) belongs or to which the company associated with the artist(s) belongs; code of the organization to which the artist(s) belongs as an individual artist, or to which the company belongs when the artist(s) is associated with the company but not as an individual artist.

a-6) name representative of the organization to which the main artist(s) belongs or to which the company associated with the artist(s) belongs; name of the organization to which the artist(s) belongs as an individual.

b) secondary artist b-1) secondary artist code; code representative of the secondary artist(s) who sings/plays the musical composition.

b-2) secondary artist name; name of the secondary artist(s) who sings/plays the musical composition.

b-3) code representative of the company to which the secondary artist(s) belong; a company code when the artist(s) is not independently active but belongs to some company(s).

b-4) name representative of the company to which the secondary artist(s) belong; a company name when the artist(s) is not independently active but belongs to some company(s).

b-5) code representative of the organization to which the secondary artist(s) belongs or to which the company associated with the artist(s) belongs; code of the organization to which the artist(s) belongs as an individual artist, or to which the company belongs when the artist(s) is associated with the company but not as an individual artist.

b-6) name representative of the organization to which the secondary artist(s) belongs or to which the company associated with the artist(s) belongs; name of the organization to which the artist(s) belongs as an individual.

c) engineer staff c-1) engineer staff code; code representative of the mixer engineer staff who produces the present musical composition.

c-2) engineer staff name; name of the engineer staff who produces the musical composition.

c-3) code representative of the company to which the engineer staff belong; a company code when the engineer staff is not independently active but belongs to some company(s).

c-4) name representative of the company to which the engineer staff belongs; a company name when the engineer staff is not independently active but belongs to some company(s).

c-5) code representative of the organization to which the engineer staff belongs or to which the company associated with the engineer staff belongs; code of the organization to which the engineer staff belongs as an individual staff, or to which the company belongs when the engineer staff is associated with the company but not as an individual engineer staff.

c-6) name representative of the organization to which the engineer staff belongs or to which the company associated with the engineer staff belongs; name of the organization to which the engineer staff belongs as an individual.

(2) Information Concerning Original Disc Right (2)-1 representative original disc owner code: code of an owner of the musical composition.

(2)-2 representative original disc owner name: name of an owner of the musical composition (2)-3 representative original disc owner-company code: code of the company which owns the musical composition, or the company which enters into a contract with the owner.

(2)-4 representative original disc owner company name: name of the company which owns the musical composition, or the company which enters into a contract with the owner.

(2)-5 code representative of the organization to which the representative original disc owner belongs or to which the company associated with the representative original disc owner belongs; code of the organization to which the representative original disc owner belongs as an individual, or to which the company belongs when the representative original disc owner is associated with the company but not as an individual.

(2)-6 name representative of the organization to which the representative original disc owner belongs or to which the company associated with the representative original disc owner belongs; name of the organization to which the representative original disc owner belongs as an individual, or to which the company belongs when the representative original disc owner is associated with the company but not as an individual.

(2)-7 licensee code; code representative of the company of which the representative original disc owner enters into a contact as a company which carries on a business for the original disc in a territory other than the ones in which the representative original disc owner has a right to exercise the original disc right.

(2)-8 licensee name; name representative of the company of which the representative original disc owner enters into a contact as a company which carries on a business for the original disc in a territory other than the ones in which the representative original disc owner has a right to exercise the original disc right.

(2)-9 co-owner code of the original disc: code representative of an co-owner who co-owns the musical composition with the representative original disc owner or with the representative publisher.

(2)-10 co-owner name of the original disc: name representative of a co-owner who co-owns the musical composition with the representative original disc owner or with the representative publisher.

(2)-11 co-owner company code of the original disc: code representative of the company which co-owns the musical composition, or the company which enters into a contract with the co-owner.

(2)-12 co-owner company name of the original disc: name representative of the company which co-owns the musical composition, or the company which enters into a contract with the co-owner.

(2)-13 organization code to which the original disc co-owner belongs or to which the company associated with the original disc co-owner belongs: code representative of the organization to which the original disc co-owner belongs as an individual, or to which the company belongs when the original disc co-owner is associated with the company but not as an individual.

(2)-14 organization name to which the original disc co-owner belongs or to which the company associated with the original disc co-owner belongs: name representative of the organization to which the original disc co-owner belongs as an individual, or to which the company belongs when the original disc co-owner is associated with the company but not as an individual.

(3) Information Concerning Copyright Songwriter (3)-1 main songwriter code: code representative of the one(s) who mainly conducts the songwriting of the musical composition.

(3)-2 main songwriter name: name representative of the one(s) who mainly conducts the songwriting of the musical composition.

(3)-3 representative original publisher code: code representative of the original publisher which enters into a contract with the songwriter.

(3)-4 representative original publisher name: name representative of the original publisher which enters into a contract with the songwriter.

(3)-5 a first organization code; code representative of the administrative organization to which the main songwriter belongs.

(3)-6 a first organization name; name representative of the administrative organization to which the main songwriter belongs. [note: the mechanical rights and performing rights might be administered by different organizations separately]

(3)-7 a second organization code; code representative of the administrative organization to which the representative original publisher belongs when the main songwriter enters into a contract with the original publisher. [note: the mechanical rights and performing rights might be administered by different organizations separately]

(3)-8 a second organization name; name representative of the administrative organization to which the representative original publisher belongs when the main songwriter enters into a contract with the original publisher. [note: the mechanical rights and performing rights might be administered by different organizations separately]

(3)-9 code of the original music co-publisher: code representative of a co-publisher to whom the representative original publisher enters into a contract of co-owning the publishing right.

(3)-10 name of the original co-publisher: name representative of a co-publisher to whom the representative original publisher enters into a contract of co-owning the publishing right.

(3)-11 organization code: code representative of the administrative organization to which the original co-publisher belongs.

(3)-12 organization name: name representative of the administrative organization to which the original co-publisher belongs. [note: the mechanical rights and performing rights might be administered by different organizations separately]

(3)-13 first sub-publisher code; code representative of the publisher of which the original publisher enters into a contact of allowing the publisher to exercise the publishing right in a territory other than the ones in which the original publisher has a right to exercise the publishing right thereof.

(3)-14 first sub-publisher name; name representative of the publisher of which the original publisher enters into a contact of allowing the publisher to exercise the publishing right in a territory other than the ones in which the original publisher has a right to exercise the publishing right thereof.

(3)-15 organization code: code representative of the administrative organization to which the first sub-publisher belongs.

(3)-16 organization name: name representative of the administrative organization to which the first sub-publisher belongs. [note: the mechanical rights and performing rights might be administered by different organizations separately]

(3)-17 secondary sub-publisher code; code representative of the secondary sub-publisher of which the first publisher enters into a contact of allowing the secondary sub-publisher to exercise the publishing right in the specific area (areas) or country (countries) if the first publisher exist. Otherwise, it represents the code representative of the secondary sub-publisher of which the original publisher enters into a contact of allowing the secondary sub-publisher to exercise the publishing right in a territory other than the ones in which the original publisher has a right to exercise the publishing right thereof.

(3)-18 secondary sub-publisher name; name representative of the secondary sub-publisher of which the first publisher enters into a contact of allowing the secondary sub-publisher to exercise the publishing right in the specific area (areas) or country (countries) if the first publisher exist. Otherwise, it represents the name representative of the secondary sub-publisher of which the original publisher enters into a contact of allowing the secondary sub-publisher to exercise the publishing right in a territory other than the ones in which the original publisher has a right to exercise the publishing right thereof.

(3)-19 administrative organization code: code representative of the administrative organization to which secondary sub-publisher belongs. [note: the mechanical rights and performing rights might be administered by different organizations separately]

(3)-20 administrative organization name: name representative of the administrative organization to which the secondary sub-publisher belongs. [note: the mechanical rights and performing rights might be administered by different organizations separately]

(3)-21 co-songwriter code: code representative of a co-songwriter who co-operates with the main songwriter in the songwriting.

(3)-22 co-songwriter name: name representative of a co-songwriter who co-operates with the main songwriter in the songwriting company which enters into a contract with the co-owner.

(3)-23 representative the original publisher code: code of the representative publisher to which the co-songwriter enters into a contract.

(3)-24 representative the original publisher name: name of the representative publisher to which the co-songwriter enters into a contract.

(3)-25 first organization code: code representative of the administrative organization to which the co-songwriter belongs. [note: the mechanical rights and performing rights might be administered by different organizations separately]

(3)-26 first organization name: name representative of the administrative organization to which the co-songwriter belongs. [note: the mechanical rights and performing rights might be administered by different organizations separately]

(3)-27 a second organization code; code representative of the administrative organization to which the representative original publisher belongs when the co-songwriter enters into a contract with the original publisher. [note: the mechanical rights and performing rights might be administered by different organizations separately]

(3)-28 a second organization name; name representative of the administrative organization to which the representative original publisher belongs when the co-songwriter enters into a contract with the original publisher. [note: the mechanical rights and performing rights might be administered by different organizations separately]

(3)-29 code of the original music co-publisher: code representative of a co-publisher to whom the representative original publisher enters into a contract of co-owning the publishing right.

(3)-30 name of the original co-publisher: name representative of a co-publisher to whom the representative original publisher enters into a contract of co-owning the publishing right.

(3)-31 organization code: code representative of the administrative organization to which the original co-publisher belongs.

(3)-32 organization name: name representative of the administrative organization to which the original co-publisher belongs. [note: the mechanical rights and performing rights might be administered by different organizations separately]

(3)-33 first sub-publisher code; code representative of the publisher of which the original publisher enters into a contact of allowing the publisher to exercise the publishing right in a territory other than the ones in which the original publisher has a right to exercise the publishing right thereof.

(3)-34 first sub-publisher name; name representative of the publisher of which the original publisher enters into a contact of allowing the publisher to exercise the publishing right in a territory other than the ones in which the original publisher has a right to exercise the publishing right thereof.

(3)-35 organization code: code representative of the administrative organization to which the first sub-publisher belongs. [note: the mechanical rights and performing rights might be administered by different organizations separately]

(3)-36 organization name: name representative of the administrative organization to which the first sub-publisher belongs. [note: the mechanical rights and performing rights might be administered by different organizations separately]

(3)-37 secondary sub-publisher code; code representative of the secondary sub-publisher of which the first publisher enters into a contact of allowing the secondary sub-publisher to exercise the publishing right in the specific area (areas) or country (countries) if the first publisher exist. Otherwise, it represents the code representative of the secondary sub-publisher of which the original publisher enters into a contact of allowing the secondary sub-publisher to exercise the publishing right in a territory other than the ones in which the original publisher has a right to exercise the publishing right thereof.

(3)-38 secondary sub-publisher name; name representative of the secondary sub-publisher of which the first publisher enters into a contact of allowing the secondary sub-publisher to exercise the publishing right in the specific area (areas) or country (countries) if the first publisher exist. Otherwise, it represents the name representative of the secondary sub-publisher of which the original publisher enters into a contact of allowing the secondary sub-publisher to exercise the publishing right in a territory other than the ones in which the original publisher has a right to exercise the publishing right thereof.

(3)-39 administrative organization code: code representative of the administrative organization to which secondary sub-publisher belongs. [note: the mechanical rights and performing rights might be administered by different organizations separately]

(3)-40 administrative organization name: name representative of the administrative organization to which the secondary sub-publisher belongs. [note: the mechanical rights and performing rights might be administered by different organizations separately]

Musical Composer (3)-41 main musical composer code: code representative of the one(s) who mainly conducts the songwriting of the musical composition.

(3)-42 main musical composer name: name representative of the one(s) who mainly conducts the songwriting of the musical composition.

(3)-43 representative original publisher code: code representative of the original publisher which enters into a contract with the musical composer.

(3)-44 representative original publisher name: name representative of the original publisher which enters into a contract with the musical composer.

(3)-45 a first organization code; code representative of the administrative organization to which the main musical composer belongs.

(3)-46 a first organization name; name representative of the administrative organization to which the main musical composer belongs. [note: the mechanical rights and performing rights might be administered by different organizations separately]

(3)-47 a second organization code; code representative of the administrative organization to which the representative original publisher belongs when the main musical composer enters into a contract with the original publisher. [note: the mechanical rights and performing rights might be administered by different organizations separately]

(3)-48 a second organization name; name representative of the administrative organization to which the representative original publisher belongs when the main musical composer enters into a contract with the original publisher. [note: the mechanical rights and performing rights might be administered by different organizations separately]

(3)-49 code of the original music co-publisher: code representative of a co-publisher to whom the representative original publisher enters into a contract of co-owning the publishing right.

(3)-50 name of the original co-publisher: name representative of a co-publisher to whom the representative original publisher enters into a contract of co-owning the publishing right.

(3)-51 organization code: code representative of the administrative organization to which the original co-publisher belongs.

(3)-52 organization name: name representative of the administrative organization to which the original co-publisher belongs. [note: the mechanical rights and performing rights might be administered by different organizations separately]

(3)-53 first sub-publisher code; code representative of the publisher of which the original publisher enters into a contact of allowing the publisher to exercise the publishing right in a territory other than the ones in which the original publisher has a right to exercise the publishing right thereof.

(3)-54 first sub-publisher name; name representative of the publisher of which the original publisher enters into a contact of allowing the publisher to exercise the publishing right in a territory other than the ones in which the original publisher has a right to exercise the publishing right thereof.

(3)-55 organization code : code representative of the administrative organization to which the first sub-publisher belongs.

(3)-56 organization name: name representative of the administrative organization to which the first sub-publisher belongs. [note: the mechanical rights and performing rights might be administered by different organizations separately]

(3)-57 secondary sub-publisher code; code representative of the secondary sub-publisher of which the first publisher enters into a contact of allowing the secondary sub-publisher to exercise the publishing right in the specific area (areas) or country (countries) if the first publisher exist. Otherwise, it represents the code representative of the secondary sub-publisher of which the original publisher enters into a contact of allowing the secondary sub-publisher to exercise the publishing right in a territory other than the ones in which the original publisher has a right to exercise the publishing right thereof.

(3)-58 secondary sub-publisher name; name representative of the secondary sub-publisher of which the first publisher enters into a contact of allowing the secondary sub-publisher to exercise the publishing right in the specific area (areas) or country (countries) if the first publisher exist. Otherwise, it represents the name representative of the secondary sub-publisher of which the original publisher enters into a contact of allowing the secondary sub-publisher to exercise the publishing right in a territory other than the ones in which the original publisher has a right to exercise the publishing right thereof.

(3)-59 administrative organization code: code representative of the administrative organization to which secondary sub-publisher belongs. [note: the mechanical rights and performing rights might be administered by different organizations separately]

(3)-60 administrative organization name: name representative of the administrative organization to which the secondary sub-publisher belongs. [note: the mechanical rights and performing rights might be administered by different organizations separately]

(3)-61 co-musical composer code: code representative of a co-musical composer who co-operates with the main musical composer in the songwriting.

(3)-62 co-musical composer name: name representative of a co-musical composer who co-operates with the main musical composer in the songwriting.

(3)-63 representative the original publisher code: code of the representative publisher to which the co-musical composer enters into a contact.

(3)-64 representative the original publisher name: name of the representative publisher to which the co-musical composer enters into a contract.

(3)-65 first organization code: code representative of the administrative organization to which the co-musical composer belongs. [note: the mechanical rights and performing rights might be administered by different organizations separately]

(3)-66 first organization name: name representative of the administrative organization to which the co-musical composer belongs. [note: the mechanical rights and performing rights might be administered by different organizations separately]

(3)-67 a second organization code; code representative of the administrative organization to which the representative original publisher belongs when the co-musical composer enters into a contract with the original publisher. [note: the mechanical rights and performing rights might be administered by different organizations separately]

(3)-68 a second organization name; name representative of the administrative organization to which the representative original publisher belongs when the co-musical composer enters into a contract with the original publisher. [note: the mechanical rights and performing rights might be administered by different organizations separately]

(3)-69 code of the original music co-publisher: code representative of a co-publisher to whom the representative original publisher enters into a contract of co-owning the publishing right.

(3)-70 name of the original co-publisher: name representative of a co-publisher to whom the representative original publisher enters into a contract of co-owning the publishing right.

(3)-71 organization code: code representative of the administrative organization to which the original co-publisher belongs.

(3)-72 organization name: name representative of the administrative organization to which the original co-publisher belongs. [note: the mechanical rights and performing rights might be administered by different organizations separately]

(3)-73 first sub-publisher code; code representative of the publisher of which the original publisher enters into a contact of allowing the publisher to exercise the publishing right in a territory other than the ones in which the original publisher has a right to exercise the publishing right thereof.

(3)-74 first sub-publisher name; name representative of the publisher of which the original publisher enters into a contact of allowing the publisher to exercise the publishing right in a territory other than the ones in which the original publisher has a right to exercise the publishing right thereof.

(3)-75 organization code: code representative of the administrative organization to which the first sub-publisher belongs. [note: the mechanical rights and performing rights might be administered by different organizations separately]

(3)-76 organization name: name representative of the administrative organization to which the first sub-publisher belongs. [note: the mechanical rights and performing rights might be administered by different organizations separately]

(3)-77 secondary sub-publisher code; code representative of the secondary sub-publisher of which the first publisher enters into a contact of allowing the secondary sub-publisher to exercise the publishing right in the specific area (areas) or country (countries) if the first publisher exist. Otherwise, it represents the code representative of the secondary sub-publisher of which the original publisher enters into a contact of allowing the secondary sub-publisher to exercise the publishing right in a territory other than the ones in which the original publisher has a right to exercise the publishing right thereof.

(3)-78 secondary sub-publisher name; name representative of the secondary sub-publisher of which the first publisher enters into a contact of allowing the secondary sub-publisher to exercise the publishing right in the specific area (areas) or country (countries) if the first publisher exist. Otherwise, it represents the name representative of the secondary sub-publisher of which the original publisher enters into a contact of allowing the secondary sub-publisher to exercise the publishing right in a territory other than the ones in which the original publisher has a right to exercise the publishing right thereof.

(3)-79 administrative organization code: code representative of the administrative organization to which secondary sub-publisher belongs; [note: the mechanical rights and performing rights might be administered by different organizations separately]

(3)-80 administrative organization name: name representative of the administrative organization to which the secondary sub-publisher belongs. [note: the mechanical rights and performing rights might be administered by different organizations separately]

Musical Arranger (3)-81 main musical arranger code: code representative of the one(s) who mainly conducts the songwriting of the musical composition.
(3)-82 main musical arranger name: name representative of the one(s) who mainly conducts the songwriting of the musical composition.
(3)-83 representative original publisher code: code representative of the original publisher which enters into a contract with the musical arranger.
(3)-84 representative original publisher name: name representative of the original publisher which enters into a contract with the musical arranger.
(3)-85 a first organization code; code representative of the administrative organization to which the main musical arranger belongs.
(3)-86 a first organization name; name representative of the administrative organization to which the main musical arranger belongs. [note: the mechanical rights and performing rights might be administered by different organizations separately]
(3)-87 a second organization code; code representative of the administrative organization to which the representative original publisher belongs when the main musical arranger enters into a contract with the original publisher. [note: the mechanical rights and performing rights might be administered by different organizations separately]
(3)-88 a second organization name; name representative of the administrative organization to which the representative original publisher belongs when the main musical arranger enters into a contract with the original publisher. [note: the mechanical rights and performing rights might be administered by different organizations separately]
(3)-89 code of the original music co-publisher: code representative of a co-publisher to whom the representative original publisher enters into a contract of co-owning the publishing right.
(3)-90 name of the original co-publisher: name representative of a co-publisher to whom the representative original publisher enters into a contract of co-owning the publishing right.
(3)-91 organization code: code representative of the administrative organization to which the original co-publisher belongs.
(3)-92 organization name: name representative of the administrative organization to which the original co-publisher belongs. [note: the mechanical rights and performing rights might be administered by different organizations separately]
(3)-93 first sub-publisher code; code representative of the publisher of which the original publisher enters into a contact of allowing the publisher to exercise the publishing right in a territory other than the ones in which the original publisher has a right to exercise the publishing right thereof.
(3)-94 first sub-publisher name; name representative of the publisher of which the original publisher enters into a contact of allowing the publisher to exercise the publishing right in a territory other than the ones in which the original publisher has a right to exercise the publishing right thereof.
(3)-95 organization code: code representative of the administrative organization to which the first sub-publisher belongs.
(3)-96 organization name: name representative of the administrative organization to which the first sub-publisher belongs.
[note: the mechanical rights and performing rights might be administered by different organizations separately]
(3)-97 secondary sub-publisher code; code representative of the secondary sub-publisher of which the first publisher enters into a contact of allowing the secondary sub-publisher to exercise the publishing right in the specific area (areas) or country (countries) if the first publisher exist. Otherwise, it represents the code representative of the secondary sub-publisher of which the original publisher enters into a contact of allowing the secondary sub-publisher to exercise the publishing right in a territory other than the ones in which the original publisher has a right to exercise the publishing right thereof.
(3)-98 secondary sub-publisher name; name representative of the secondary sub-publisher of which the first publisher enters into a contact of allowing the secondary sub-publisher to exercise the publishing right in the specific area (areas) or country (countries) if the first publisher exist. Otherwise, it represents the name representative of the secondary sub-publisher of which the original publisher enters into a contact of allowing the secondary sub-publisher to exercise the publishing right in a territory other than the ones in which the original publisher has a right to exercise the publishing right thereof.
(3)-99 administrative organization code: code representative of the administrative organization to which secondary sub-publisher belongs. [note: the mechanical rights and performing rights might be administered by different organizations separately]
(3)-100 administrative organization name: name representative of the administrative organization to which the secondary sub-publisher belongs. [note: the mechanical rights and performing rights might be administered by different organizations separately]
(3)-101 co-musical arranger code: code representative of a co-musical arranger who co-operates with the main musical arranger in the songwriting.
(3)-102 co-musical arranger name: name representative of a co-musical arranger who co-operates with the main musical arranger in the songwriting, company which enters into a contract with the co-owner.
(3)-103 representative the original publisher code: code of the representative publisher to which the co-musical arranger enters into a contract.
(3)-104 representative the original publisher name: name of the representative publisher to which the co-musical arranger enters into a contract.
(3)-105 first organization code: code representative of the administrative organization to which the co-musical arranger belongs. [note: the mechanical rights and performing rights might be administered by different organizations separately]
(3)-106 first organization name: name representative of the administrative organization to which the co-musical arranger belongs. [note: the mechanical rights and performing rights might be administered by different organizations separately]
(3)-107 a second organization code; code representative of the administrative organization to which the representative original publisher belongs when the co-musical arranger enters into a contract with the original publisher. [note: the mechanical rights and performing rights might be administered by different organizations separately]

(3)-108 a second organization name; name representative of the administrative organization to which the representative original publisher belongs when the co-musical arranger enters into a contract with the original publisher. [note: the mechanical rights and performing rights might be administered by different organizations separately]

(3)-109 code of the original music co-publisher: code representative of a co-publisher to whom the representative original publisher enters into a contract of co-owning the publishing right.

(3)-110 name of the original co-publisher: name representative of a co-publisher to whom the representative original publisher enters into a contract of co-owning the publishing right.

(3)-111 organization code: code representative of the administrative organization to which the original co-publisher belongs.

(3)-112 organization name: name representative of the administrative organization to which the original co-publisher belongs. [note: the mechanical rights and performing rights might be administered by different organizations separately]

(3)-113 first sub-publisher code; code representative of the publisher of which the original publisher enters into a contact of allowing the publisher to exercise the publishing right in a territory other than the ones in which the original publisher has a right to exercise the publishing right thereof.

(3)-114 first sub-publisher name; name representative of the publisher of which the original publisher enters into a contact of allowing the publisher to exercise the publishing right in a territory other than the ones in which the original publisher has a right to exercise the publishing right thereof.

(3)-115 organization code: code representative of the administrative organization to which the first sub-publisher belongs. [note: the mechanical rights and performing rights might be administered by different organizations separately]

(3)-116 organization name: name representative of the administrative organization to which the first sub-publisher belongs. [note: the mechanical rights and performing rights might be administered by different organizations separately]

(3)-117 secondary sub-publisher code; code representative of the secondary sub-publisher of which the first publisher enters into a contact of allowing the secondary sub-publisher to exercise the publishing right in the specific area (areas) or country (countries) if the first publisher exist. Otherwise, it represents the code representative of the secondary sub-publisher of which the original publisher enters into a contact of allowing the secondary sub-publisher to exercise the publishing right in a territory other than the ones in which the original publisher has a right to exercise the publishing right thereof.

(3)-118 secondary sub-publisher name; name representative of the secondary sub-publisher of which the first publisher enters into a contact of allowing the secondary sub-publisher to exercise the publishing right in the specific area (areas) or country (countries) if the first publisher exist. Otherwise, it represents the name representative of the secondary sub-publisher of which the original publisher enters into a contact of allowing the secondary sub-publisher to exercise the publishing right in a territory other than the ones in which the original publisher has a right to exercise the publishing right thereof.

(3)-119 administrative organization code: code representative of the administrative organization to which secondary sub-publisher belongs. [note: the mechanical rights and performing rights might be administered by different organizations separately]

(3)-120 administrative organization name: name representative of the administrative organization to which the secondary sub-publisher belongs. [note: the mechanical rights and performing rights might be administered by different organizations separately]

(4) Music Score
(4)-1 MIDI data
(4)-2 Live music score
(4)-3 Words (Lyric)
(5) Sound Source
(5)-1 Digital sound source It is apparent that the above described items are not limited to the ones as shown. Further expansion will be easily made if necessary. This condition will be equally applicable for any lists described in this document, unless otherwise so specified.

FIG. 36 shows a display menu on the display monitor of the system. The display menu, so-called "the retrieval screen", is constituted of the following items:

A: Genre of Titles
  A-1. Title of Musical Composition
  A-2. Title of Western Music
  A-3. Title of Modem Japanese Music
  A-4. Other B: Genre of Personal Names
  B-1. Name(s) of Artist(s)
  B-2. Name(s) of Songwriter(s)
  B-3. Name(s) of Musical Composer(s)
  B-4. Name(s) of Musical Arranger(s)
  B-5. Other C: Genre of Corporations
  C-1. Name(s) of Recording Company (Companies)
  C-2. Name(s) of Publisher(s)
  C-3. Name(s) of Entertainment Production(s)
  C-4. Other D: Genre of Organizations
  D-1. JASRAC (Japan)
  D-2. BMI (U.S.A.)
  D-3. ASCAP (U.S.A.)
  D-4. MCPS (U.K.)
  D-5. SDRM (France)
  D-6. Other E: Date of Production
  E-1. Year
  E-2. Month
  E-3. Day The above items can be entered using a keyboard or other type of the input device such as an electronic pen by the user of the system at a time when the user accesses the system by inserting the IC card into the IC card-reader installed in the system. The user is identified by this procedure. At the same time, it may arrange to identify the equipment of which the user log-in the system in order to avoid an unauthorized use of the IC-card and/or the equipment.

By entering the applicable items on the "retrieval screen", i.e., by entering the attributes of the musical composition, the ISRC thereof is specified. Once the ISRC is specified, then the "Permission File" and the "Charging Rate & Fee File" (both of which are described below in more details) are automatically linked in accordance with the specified ISRC.

Figure 37:
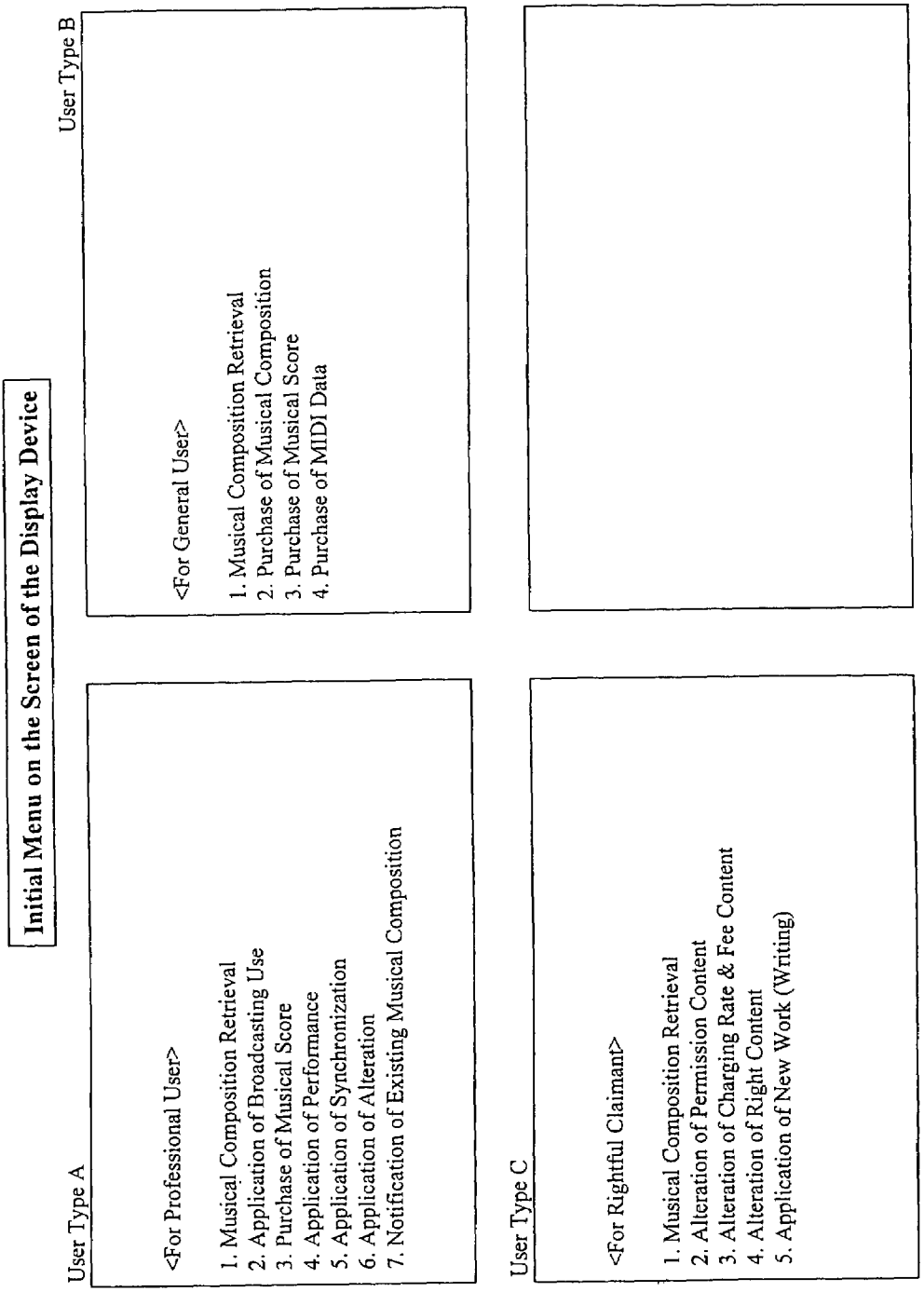
FIG. 37 is a diagram showing three different kinds of initial menu that are displayed on the display screen.

Then, the menu on the display screen changes to the "initial menu" such as shown in FIGS. 37a, 37b, or 37c, depending on a type of the user as identified by the above process through the information stored in the memory of the IC card.

When the identified user is a business user, such as a Radio broadcasting station, the menu on the screen changes to the initial menu for the business user as shown in FIG. 37a, which includes the selection items of:
1. Musical Composition Retrieval
2. Application of Broadcasting Use
3. Purchase of Musical Score
4. Application of Performance
5. Application of Synchronization
6. Application of Alteration.

When the identified user is a general user, such as a college student, the menu on the screen changes to the initial menu for the general user as shown in FIG. 37b, which includes the selection items of:
1. Musical Composition Retrieval
2. Purchase of Musical Composition
3. Purchase of Musical Score
4. Purchase of MIDI DATA.

When the identified user is a rightful claimant, such as a publisher, the menu on the screen changes to the initial menu for the rightful claimant as shown in FIG. 37c, which includes the selection items of:
1. Alteration of Permission Content
2. Alteration of Charging Rate & Fee Content
3. Alteration of Right Content
Application of New Writing.

FIG. 38 shows the content of the Permission File to be used for the system of the present invention. FIG. 39 shows the content of the Charging Rate & Fee File also to be used for the system of the present invention. In the following, the respective items of the Permission File, as well as the respective items of the Charging Rate & Fee File will be listed with the detailed explanations.

Permission File:
1. Key code: Music Code (=ISRC code)
2. Genre A: Audition
When retrieving the musical composition, or when purchasing the musical composition, it is flagged whether the audition can be implemented for a full chorus, one chorus, or specific seconds.

A1 Business Use
A1-1 full chorus
A1-2 one chorus
A1-3 45 seconds
A1-4 60 seconds
(other variations of time)

A2 Personal Use
A2-1 full chorus
A2-2 one chorus
A2-3 45 seconds
A2-4 60 seconds
(other variations of time)

3. Genre B: Purchase of Musical Composition Audition:
Preparing for flag areas corresponding to a variety of services which will be generated in future.
B1 Business Use: Distributing the Sound Source to the local FM radio broadcasting stations coupling to the Broadcasting Use of Genre F as shown below.
B2 Personal Use: Subdivided into further segments in future (response to the desires of customers, artists, etc.) [existing recording permit]
B2-1 Juke box: Listening only once=no accumulation/recording can be made (distinguish it in a view point of the audition of A being free of charge).
B2-2 CD: Applying a group of the favorite musical compositions using the Internet at home, and then the CD recorded with the favorite musical compositions is delivered to the home, or delivered to the record shop nearby.
B2-3 MD: Applying a group of the favorite musical compositions using the Internet at home, and then the MD recorded with the favorite musical compositions is delivered to the home, or delivered to the record shop nearby.
B2-4 CD-R: Applying a group of the favorite musical compositions using the Internet at home, and the Music Sources are downloaded, and then recorded/fixed on the CD at home.
B2-5 MD-R: Applying a group of the favorite musical compositions using the Internet at home, and the Music Sources are downloaded, and then recorded/fixed on the MD at home.
B2-6 DVD-R: Applying a group of the favorite musical compositions using the Internet at home, and the Music Sources are downloaded, and then recorded/fixed on the DVD at home.
B2-7 PC
4. Genre C: Purchase of Music Score(s)
C1 Business Use
C1-1 Purchasing it (them) as the data on the network.
C1-2 Applying on the network, and then purchasing it (them) as the music score(s) written on the paper(s)
C2 Personal Use
C2-1 Purchasing it (them) as the data on the network.
C2-2 Applying on the network, and then purchasing it (them) as the music score(s) written on the paper(s)
5. Genre D: Purchase of MIDI DATA
It will turn to be a new business when producing the MIDI data at a time of producing the original sound source(s).
D1 Business Use: Selling to the Karaoke business
D1-1 Purchasing it (them) as the data on the network.
D2 Personal Use
D2-1 Purchasing it (them) as the data on the network.
6. Genre E: Application for Performance
E1 Business Use: Applications at a time of performance by the professional artists or musicians at the concert, the live-house, etc.
E2 Personal Use: Applications at a time of performance by the Amateur artists or musicians at the concert, the live-house, etc. No charge will be made for the performance, but only for the survey of the musical compositions to be used.
7. Genre F: Broadcasting Use of Musical Composition(s)
In principle, all musical compositions can be used for broadcasting.

F1 Business Use
  F1-1 Broadcasting Program(s) for the Radio Station(s).
  F1-2 Broadcasting Program(s) for the TV Station(s).
8. Genre G: Synchronization
  For use in the TV image(s), the movie image(s), and the commercial image(s) as the background music.
G1 Business Use
  G1-1 Synchronization for use in the movie image(s)
  G1-2 Synchronization for use in the TV image(s)
  G1-3 Synchronization for use in the video-gram image(s)
  G1-4 Synchronization for use in the game soft image(s)
  G1-5 Synchronization for use in the CM image(s)
9. Genre H: Application for Alteration
  For producing a new music by altering the existing musical composition(s) [sound source(s), musical score(s)], it is desirable to produce a cover music of the existing musical composition(s), and/or to produce an entirely different musical composition by sampling the existing sound source(s) at a time of producing the dance music and the like which are popular at the present time.
H1 Business Use
  H1-1 Usage permit of the existing sound sources sampling
  H1-2 at a time when producing the cover music of the existing musical composition(s) [such as the Japanese Cover version of the western music]
  Charging Rate & Fee File:
ISRC
  Ratio of the Original Disc: the Copyright
    1. Ratio within the Original Disc
      Initial Original Disc: Common Original Disc
      Original Disc: Licensee
      Individual: Company: Organization
      Produce Royalty Rate
      Main Artist Royalty Rate
      Sub-main Artist Royalty Rate
    2. Ratio within the Copyright
      Songwriter: Composer: Arranger: Publisher
      Publisher: Common Publishers
      OP: FSP: SP
      Individual: Company: Organization
      Organization: Organization In the following, some examples for illustrating the above mentioned Files will be described in detail. Here, it is assumed that the user is a business person (hereinafter it is just referred to as the user) who is in charge of selecting the music for the music program to be broadcast on the radio, by using the system of the present invention. Then, the user activates the facing equipment and inserts the IC card which also functions as the ID card of the registered user. By entering the password (or this process may be omitted since the IC card contains the information of the identification number, which will function the same), the display device on the monitor equipment displays the initial screen for the business user such as shown in FIG. 37a.

At this time, the ID number and the using equipment number are constituted as a user data. ([User Data A]

First of all, an operation of specifying the musical composition is to be implemented. Since the information of the candidate musical compositions has been entered in advance by applicably fulfilling the respective items on the "retrieval menu" displayed on the screen of the display device such as shown in FIG. 36.

After having specified the candidate musical compositions, the menu on the screen changes to the "initial menu" for the business user such as shown in FIG. 37a, and as a default the item "Musical Composition Retrieval" is accentuated with a color and the retrieval of candidate musical compositions are implemented as whether or not these candidate musical compositions have already been registered in the system. Then, as the result of the retrieval, a list of the candidate musical compositions together with the indications of whether or not the respective candidate musical compositions have already been registered in the system are shown on the screen. The candidate musical compositions with the "OK" marks indicate that these candidate musical compositions have already been registered, and thus these candidate musical compositions can proceed to the next step. ([Musical Composition List B]

Herein, it is assumed that the "Permission File" and the "Charging Rate & Fee File" corresponding to these candidate musical compositions have also been registered in advance when the candidate musical compositions have been registered in the system. Thus, the items in the respective files as shown in FIGS. 38 and 39 have been either flagged (or non-flagged if not applicable) or fulfilled (or emptied if not applicable) in advance by the copyright owner(s) of the corresponding musical composition(s) in accordance with the preferences by the rightful claimant(s).

The user, then, selects the item(s) in the "initial menu" either by touching the item(s) on the menu or the number (s) corresponding to the respective item(s) with a touch-pen.

In the present example, it is assumed that the user selects "2. Application of Broadcasting Use" from the items in the "initial menu". When the user selected the item 2 by touching the item with the touch pen, the screen changes to the "broadcasting attributes entering menu". The use then enters the broadcasting date, the net station name(s), and the number of the net stations and the like on the "broadcasting attributes entering menu". ([Broadcasting Attribution Data C]

After having completed the above processes, the respective "Permission File" and the "Charging Rate & Fee File" for each of the candidate musical compositions are referred (for example, see FIG. 40), and the information of the permitted contents, the original disc and the copyright regarding the candidate musical compositions are obtained as in the form of the data A, B, and C describe as above. Then, a wave-packet is constituted by these data A, B and C, and the wave-packet is transmitted to the host-computer 5302 such as the one shown in FIG. 33 in the so-called the "Music Global Access System (MGAS)" of the present invention for the evaluation of the candidate musical compositions concerning the status or the states of the original disc and the copyright, as well as the permitted contents for the items.

In the present example, the referred item in the Permission Files for the candidate musical composition is just the item of the "Broadcasting Use", and the content thereof consists of F1-1 "the broadcasting program for the radio station" and F1-2 "the broadcasting program for the TV station". Therefore, when the content of F1-1 is flagged, but the content of F1-2 is non-flagged for one of the candidate musical compositions, then that candidate musical composition is only permitted for use in the broadcasting program for the radio station. Thus, together with the information in the "Charging Rate & Fee File" for that candidate musical composition, the information of that content is transmitted to the MGAS for evaluating the copyright and the original recording right based on the updated various rights and contents in the "Permission File" and the "Charging Rate & Fee File", while the user is informed that one of the candidate musical compositions is only permitted for the radio broadcasting and thus no restriction will be applied for that candidate musical composition through the display screen.

In the following, as an example, the process for the FM radio station J-WAVE used the following musical composition:

a) Seiko Matsuda/"AKAI SWEET-PEA"
b) Bon Jovi/"LIVIN' ON A PRAYER"

in the radio music program "J-WAVE SELECTION" which was broadcast on 22:00 of Mar. 24, 1998, will be described in detail.

There is the tracking operation for evaluating whether or not the above musical compositions were accurately broadcast on the scheduled broadcasting data along the broadcasting list. Here, the matching will be made between the group of transmitted musical compositions which are accumulated in the transmission unit of the broadcasting stationed and the broadcasting list in the evaluation unit (not shown). In case of the broadcasting accident, the sudden change of the broadcasting schedule, and the like, the correct data of the group of transmitted musical compositions of the LOGIN system in the broadcasting unit is re-written as the data of use in the evaluation unit.

The data of use in the evaluation unit are re-written everyday, and transmitted to the MGAS in accordance with the contract agreement between the broadcasting station and the MGAS, for example every week, or every month, and the like.

In the following, the process of publishing rights will be described with reference to the above-mentioned example.

Presently, in Japan, a payment for the broadcasting fee of the copyright between the JASRAC and the TV/Radio station(s) is conducted based on the annual blanket contract. For instance, if the annual sales volume of the Radio station were to be 10,000,000,000 yen, then 2% of that amount, i.e., 200,000,000 yen is to be paid to the JASRAC. Thereafter, the further distribution will be conducted as described before.

Now, a process similar to the one just described will be illustrated using the MGAS of the present invention. Assuming that the above-mentioned two musical compositions were broadcast 100 times annually, and further assuming that the total number of use for the musical compositions at the J-WAVE is to be 100,000, then yen can be obtained for each musical composition. This 200,000 yen is then distributed to the songwriter, the broadcasting fee of (100/100,000)×200,000,000 yen=200,000, the musical composer, the musical arranger, and the publisher in accordance with the distribution ratio indicated in the respective "Charging Rate & Fee File" corresponding to the Seiko Matsuda's musical compositions, after the commission of the JASRAC is subtracted therefrom. In case of Bon Jovi, the remaining amount of broadcasting fee after the commission of the JASRAC being subtracted is distributed to the ASCAP, the songwriter, the musical composer, the musical arranger, and the publisher in accordance with the distribution ratio indicated in the respective "Charging Rate & Fee File" corresponding to the Bon Jovi's musical composition.

Now, the process of the original disc right will be described in detail.

1. For the recording producer:

Presently, there is an agreement for the broadcasting fee of the original disc between the Recording Industry Association of Japan (RIAJ) and the National Association of Commercial Broadcasters In Japan (NACBJ) which is a parent organization of the TV/Radio stations.

1% of the annual total sales volume of the commercial broadcasting stations in Japan is being paid to the RIAJ as the use fee of the original disc. For instance, if the annual total sales volume of all commercial broadcasting stations were 1,000,000,000,000 yen, then the 1% thereof (=1,000,000,000 yen) is to be paid to the RIAJ. Presently, the broadcasting fee of the original disc is distributed to the respective recording companies by using the system with less degraded than the sampling system. However, using the MGAS of the present invention, for example, 1% of the annual total sales volume by the J-WAVE, i.e., 10,000,000,000 yen×~1%=100,000,000 yen is paid to the RIAJ as the broadcasting fee of the original disc. Then the similar procedures as for the publishing rights will take place with reference to the "Charging Rate & Fee File".

Assuming that the above-mentioned two musical compositions were broadcast 100 times annually, and further assuming that the total number of use for the musical compositions at the J-WAVE is to be 100,000, then, the broadcasting fee of (100/100,000)×~100,000,000 yen=100,000 yen can be obtained for each musical composition. This 100,000 yen is then distributed to the recording company, the entertainment production, and the like in accordance with the original disc contribution ratio indicated in the respective "Charging Rate & Fee File" corresponding to the Seiko Matsuda's musical compositions, after the commission of the RIAJ is subtracted therefrom. In case of Bon Jovi, the remaining amount of broadcasting fee after the commission of the RIAJ being subtracted is distributed to the recording company outside of Japan through the licensed recording company in accordance with the ratio indicated in the respective "Charging Rate & Fee File" corresponding to the Bon Jovi's musical composition.

2. For the artist(s):

At the same time, the payment of the secondary use fee of the original disc right is conducted by the NACBJ to the artist(s). For instance, if the annual total sales volume of all commercial broadcasting stations were 1,000,000,000,000 yen, then the 1% thereof (=1,000,000,000 yen) is to be paid to the Japan Council of Performer's Organizations (JCPO). Then, from there, the payments are made to the respective organizations.

Now the flow of the payment by using the MGAS of the present invention will be described.

For example, assuming that the above-mentioned two musical compositions were broadcast 100 times annually, and further assuming that the total number of use for the musical compositions at the J-WAVE is to be 100,000, then, the broadcasting fee of (100/100,000)×~100,000,000 yen=100,000 yen can be obtained for each musical composition. This 100,000 yen is then distributed to the artist(s), the entertainment production with which the artist(s) is associated, and the organization(s) with the entertainment production(s) is associated and the like in accordance with the contract distribution ratio indicated in the respective "Charging Rate & Fee File" corresponding to the Seiko Matsuda's musical compositions, after the commission of the JCPO is subtracted therefrom. In case of Bon Jovi, the remaining amount of broadcasting fee after the commission of the JCPO being subtracted is distributed to the artist(s), the entertainment production with which the artist(s) is associated, and the organization(s) such as AFM, AFTRA, and the like with which the entertainment production(s) is associated and the like in accordance with the ratio indicated in the respective "Charging Rate & Fee File" corresponding to the Bon Jovi's musical composition.

Figure 40:
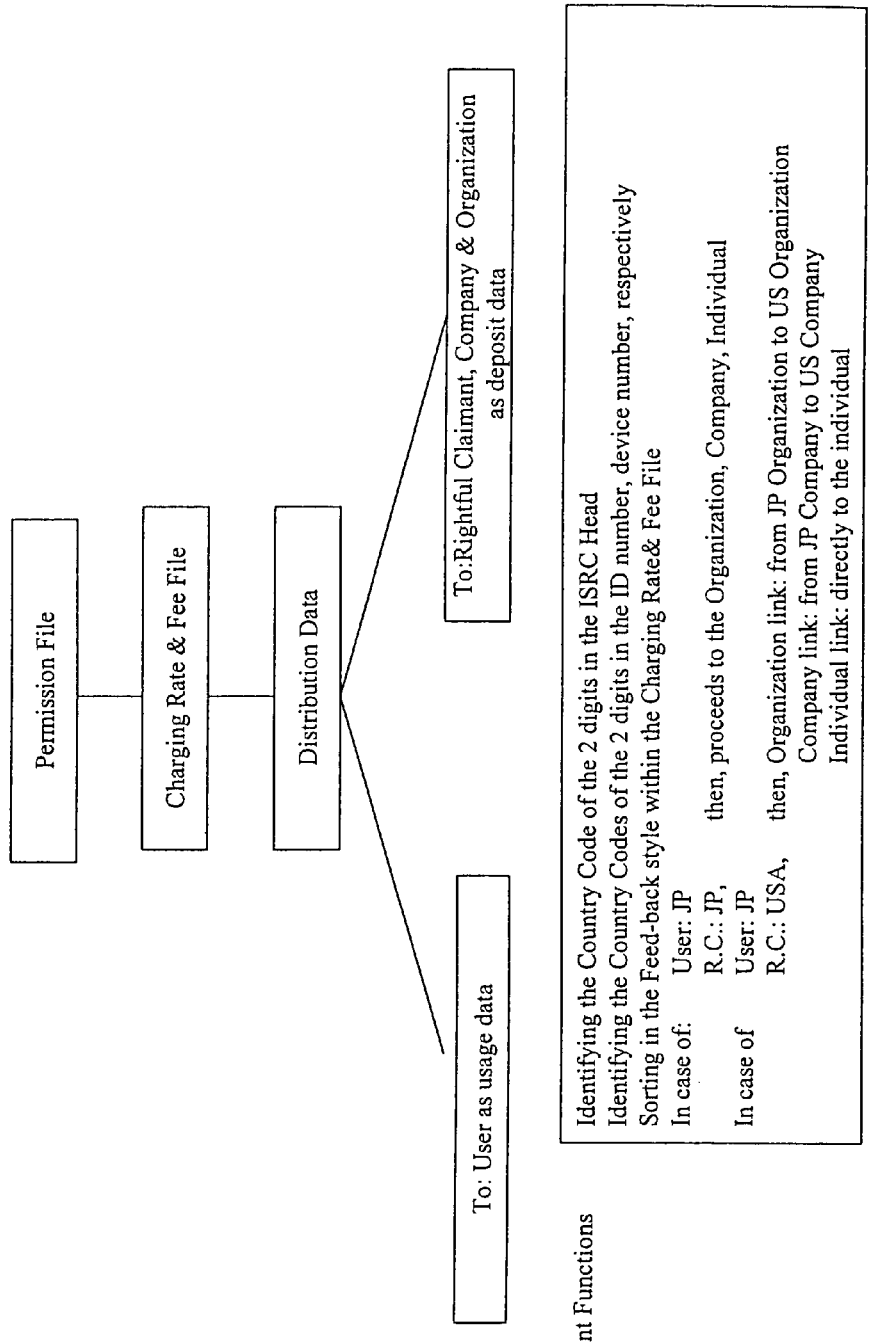
FIG. 40 is a schematic diagram illustrating the overall processes using the "Permission File" shown in FIG. 38 and the "Charging Rate & Fee File" shown in FIG. 39 according to the present invention.

The outline of the above processes is shown in FIG. 40. As can be seen from the above explanation, the similar procedures as described above will take place for the different types of users.

Figure 41A:
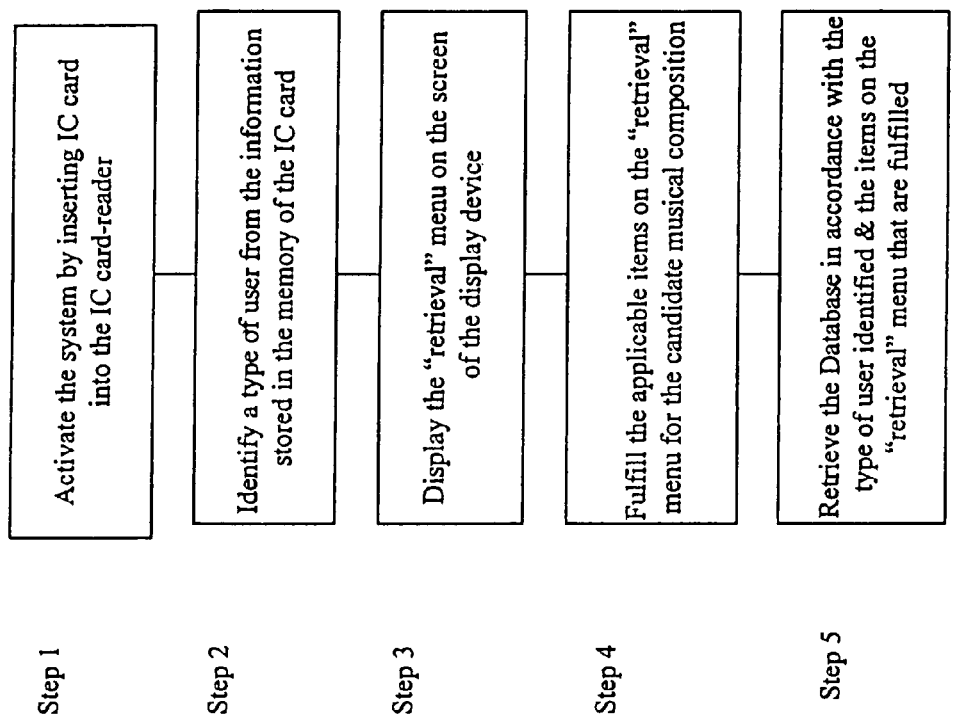
FIGS. 41a, 41b, and 41c are a diagram illustrating the processes shown in FIG. 40.
Figure 41B:
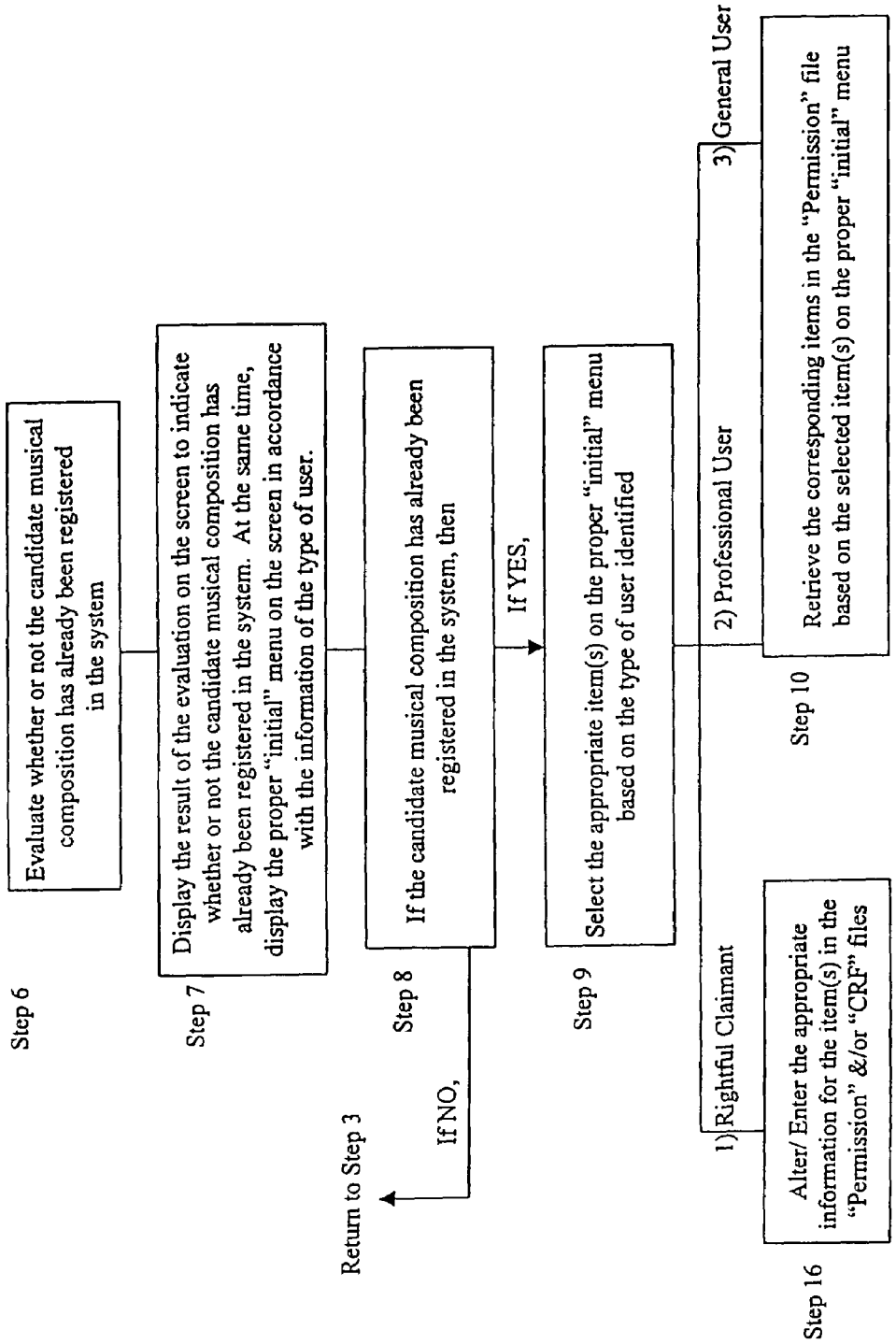
Figure 41C:
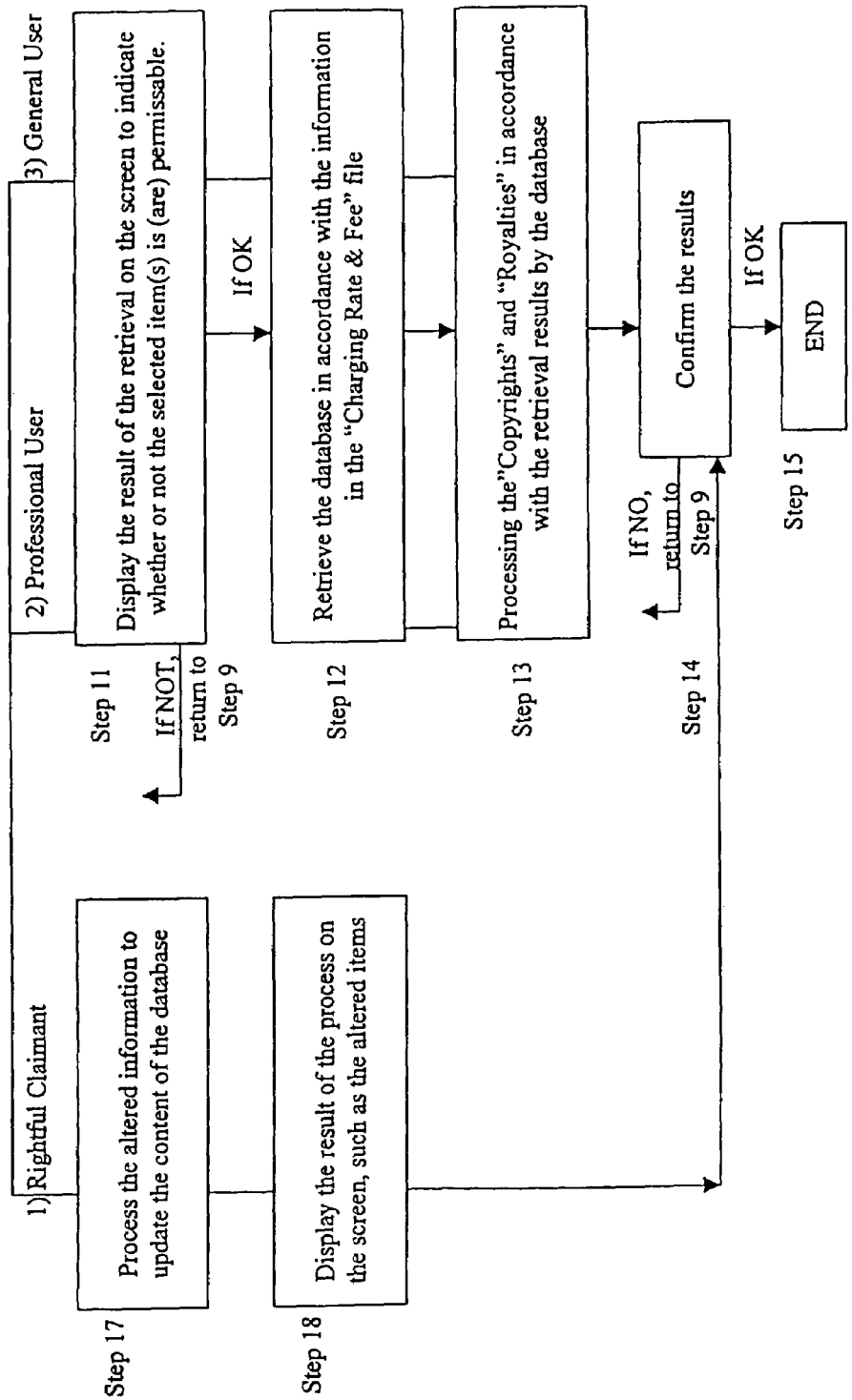

Referring to FIG. 41, the above mentioned process will be described in detail.

The MGAS system of the present invention is activated by inserting the IC card into the IC card-read (step ST1). Then, a type of the user who has just activated the MGAS system is identified from the information stored in the memory of the IC card (step ST2). Next, the "retrieval" menu is displayed on the screen of the display device (step ST3), and the applicable items on the "retrieval" menu for the candidate musical composition are fulfilled (step ST4). The DB (the musical database) is retrieved in accordance with the information of the type of user which is identified as well as the items on the "retrieval" menu fulfilled (step ST5). It is evaluated whether or not the candidate musical composition has already been registered in the system prior to the activation of the MGAS system (step ST6), and the result of the evaluation is displayed on the screen to indicate whether or not the candidate musical composition has already been registered in the MGAS system and at the same time the proper "initial" menu is displayed on the screen in accordance with the information of the type of user identified as above (step ST7). If the candidate musical composition has already been registered in the MGAS system (step ST8), then the appropriate items on the "initial" menu is selected in accordance with the type of user identified as above (step ST9). When either the professional user or the general user is selected in the step ST9, then the corresponding items in the "Permission File" is retrieved based on the selected item(s) on the proper "initial" menu (step ST10), and the result of the retrieval is displayed on the screen to indicate whether or not the selected item(s) is permissible one(s) (step ST11). When the selected item(s) is not permissible in the step ST11, then returns to the step ST9. On the other hand, when the selected item(s) is permissible, then the DB is retrieved in accordance with the information of the "Charging Rate & Fee File" (step ST12), and the applicable copyright & royalties are processed in accordance with the result of the retrieval of the DB (step ST13). Then, the result is to be confirmed whether or not it is an appropriate (step ST14), and if the result is confirmed, then the process is terminated (step ST15).

When the type of user is a rightful claimant such as the copyright owner/publisher, and the like in the step ST9, then an appropriate information for the item(s) is altered/entered in the "Permission File" and/or the "Charging Rate and Fee File" (step ST16). Then the altered/entered information is processed to update the content of the DB (step ST17), and the result of the process such as the altered/entered item is displayed on the screen (step ST18), and proceeds to the step ST 14 as described above.

Although the above-described embodiments of the present invention are mainly directed to the music, the present invention is not limited to the music only.

The present invention is also applicable to other forms of the multimedia such as the printed matters including books, magazines, newspapers, any kinds of journals, as well as the photographs, the game software programs, the motion pictures, the still pictures, the videos, and the likes, which can be treated in the digital forms (electronics forms) or which can be transformed from the analogue forms to the digital forms, through Internet and/or other communication network systems.

More particularly, the schemes for the permission codes and the related methods of coding the contents according to the present invention are also applicable to all of the above-mentioned multimedia in the similar manner as described in the above-described embodiments for the music, without departing from the concepts used for the music.

In the present invention, the set of permitted potential uses of the musical composition information may include play, copy, transmit and distribute, but not limited thereto, and the possible forms of transmit may include surface, cable, internet or satellite, but not limited thereto, and the possible forms of medium for copy may include stream, local-HDD, flash memory, stick memory or MD, but other forms of media may be used.

Figure 42:
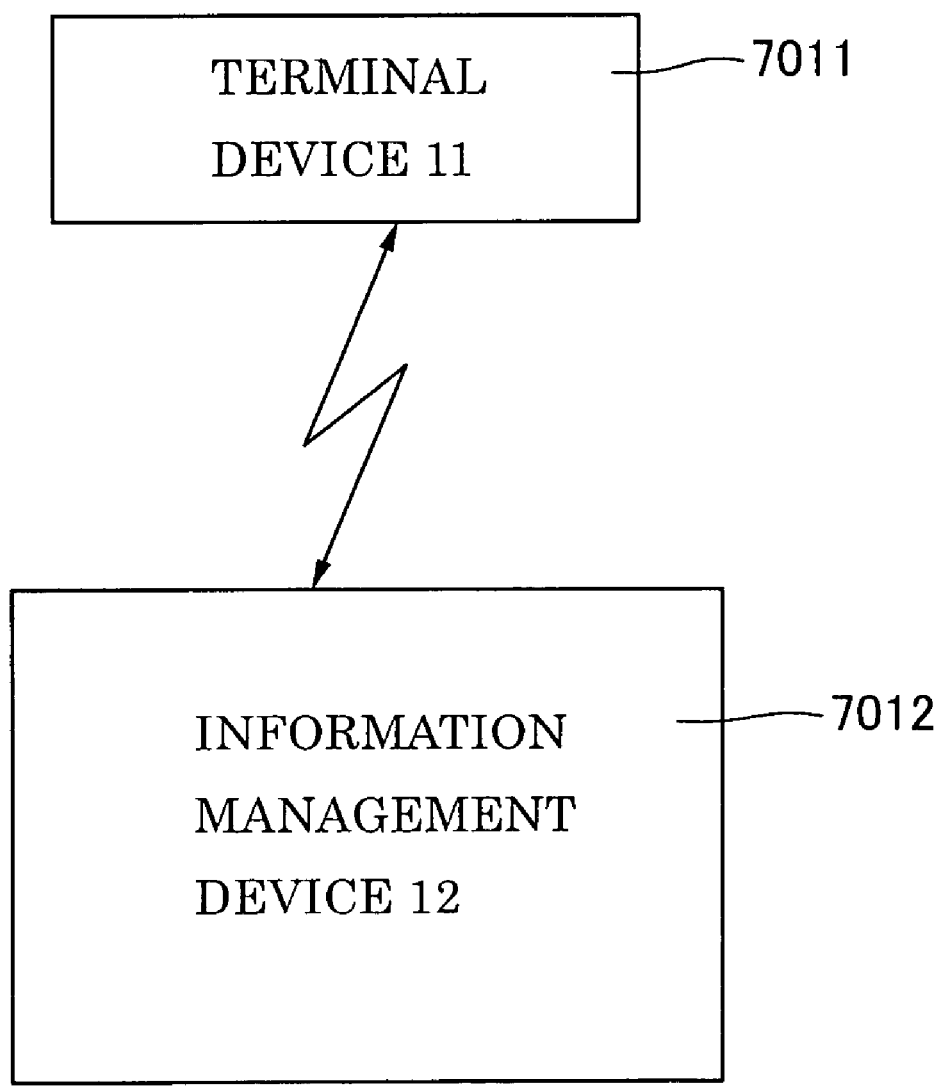
FIG. 42 is a schematic diagram showing one embodiment of a system for granting permission of user's personal information to a third party according to the present invention.

FIG. 42 shows one embodiment of a system for granting permission of user's personal information to a third party according to the present invention. In the present invention, the third party is any one of or a combination of two or more of an information distributor, an advertising agency, an advertiser, a merchandise agency and other user.

As shown in FIG. 42, the system 7010 for granting permission of a user's personal information to a third party, includes:

a terminal device 7011 for entering a personal information of the user and a permission information indicating at least one permissible use of the personal information of the user by a third party, for storing the personal information and the permission information entered, for receiving from the third party an item in accordance with the permission information stored therein from the third party; and an information management device 7012 electrically connected to the terminal device 7011 for managing the personal information and the permission information stored in the terminal device 7011, for evaluating the personal information stored therein in accordance with the permission information stored therein if an access to the personal information is requested from the third party, and for providing to the third party the requested personal information if the access to the requested personal information is permissible in accordance with a result of the evaluation.

In the embodiment of the present invention, the system 7010 may be configured as any form of a mobile phone, a PDA, a notebook type computer, or a desktop type computer, and the terminal device 7011 and the information management device 7012 may be incorporated into the mobile phone, the PDA, the notebook type computer or the desktop type computer.

Figure 43:
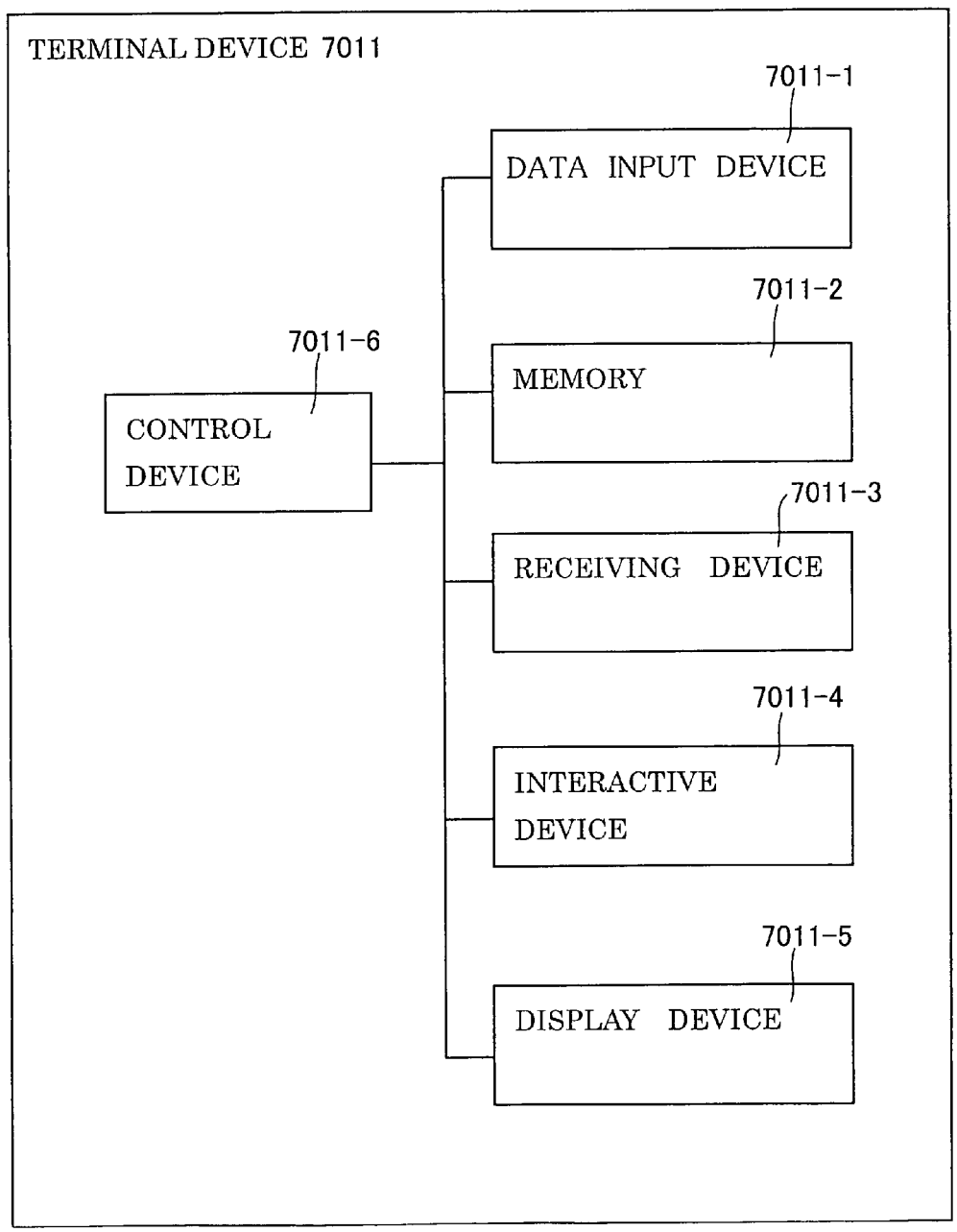
FIG. 43 is a schematic diagram showing a detailed structure of the terminal device shown in FIG. 42.

FIG. 43 shows a detailed structure of the terminal device 7011 shown in FIG. 62. As shown in FIG. 43, the terminal device 7011 shown in FIG. 42 consists of;

a data input device 7011-1 operable by a user for entering a personal information of a user and a permission information indicating at least one permissible use of the personal information by a third party;

a memory 7011-2 for storing the personal information and the permission information entered from the data input device;

a receiving device 7011-3 for receiving from the third party an item in accordance with the permission information stored in the memory 7011-2 as a consequence of permitting the access to the personal information requested from the third party, and wherein the item is an advertisement and/or a latest information of a product and/or a service pertinent to the personal information of the user, the receiving device 7011-3 is capable of receiving a content selected by the user from a library of multimedia LIM;

an interactive device 7011-4 for interacting the user with the third party associated with the advertisement and/or the latest information, wherein the interactive device 7011-4 is operable by the user for ordering the product and/or the service to the third party, the interactive device 7011-4 is capable of interacting the user with the third party associated with the content selected by the user;

a display device 7011-5 for displaying the information entered from the data input device 7011-1, the advertisement and/or the latest information, and the content received by the receiving device 7011-3; and a control device 7011-6 electrically connected to all of the devices 7011-1 to 7011-5 for controlling these devices 7011-1 to 7011-5.

Figure 44:
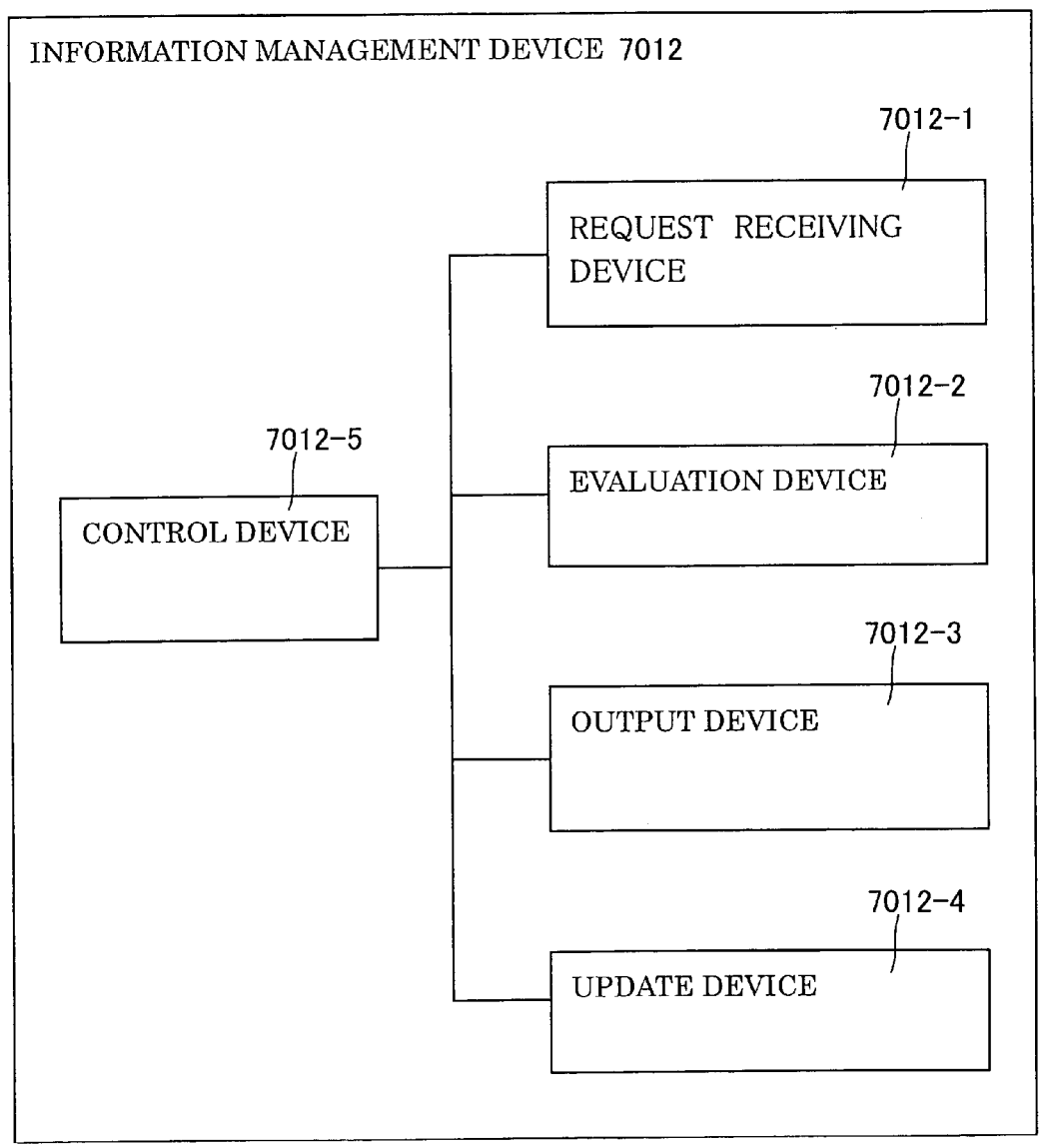
FIG. 44 is a schematic diagram showing a detailed structure of the information management device shown in FIG. 42.

FIG. 44 shows a detailed structure of the information management device 7012 shown in FIG. 42. As shown in FIG. 44, the information management device 7012 includes:

a request receiving device 7012-1 for receiving from the third party a request of accessing to the personal information stored in the memory 7011-2;

an evaluation device 7012-2 for evaluating whether or not the request of accessing to the personal information from the third party is permissible in accordance with the permission information stored in the memory 7011-2;

an output device 7012-3 for providing to the third party the requested personal information in accordance with the result of the evaluation performed by the evaluation device 7012-2; and an update device 7012-4 for updating the permission information stored in the memory 7011-2 if the user enters an updated permission information for the permission information stored in the memory 7011-2 using the data input device 7011-1. The update device 7012-4 is also capable of updating the personal information stored in the memory 7011-2 if the user enters an updated personal information for the personal information stored in the memory 7011-2 using the data input device 7011-1. The update device 7012-4 may be configured as to be only operable by the user.

Figure 45:
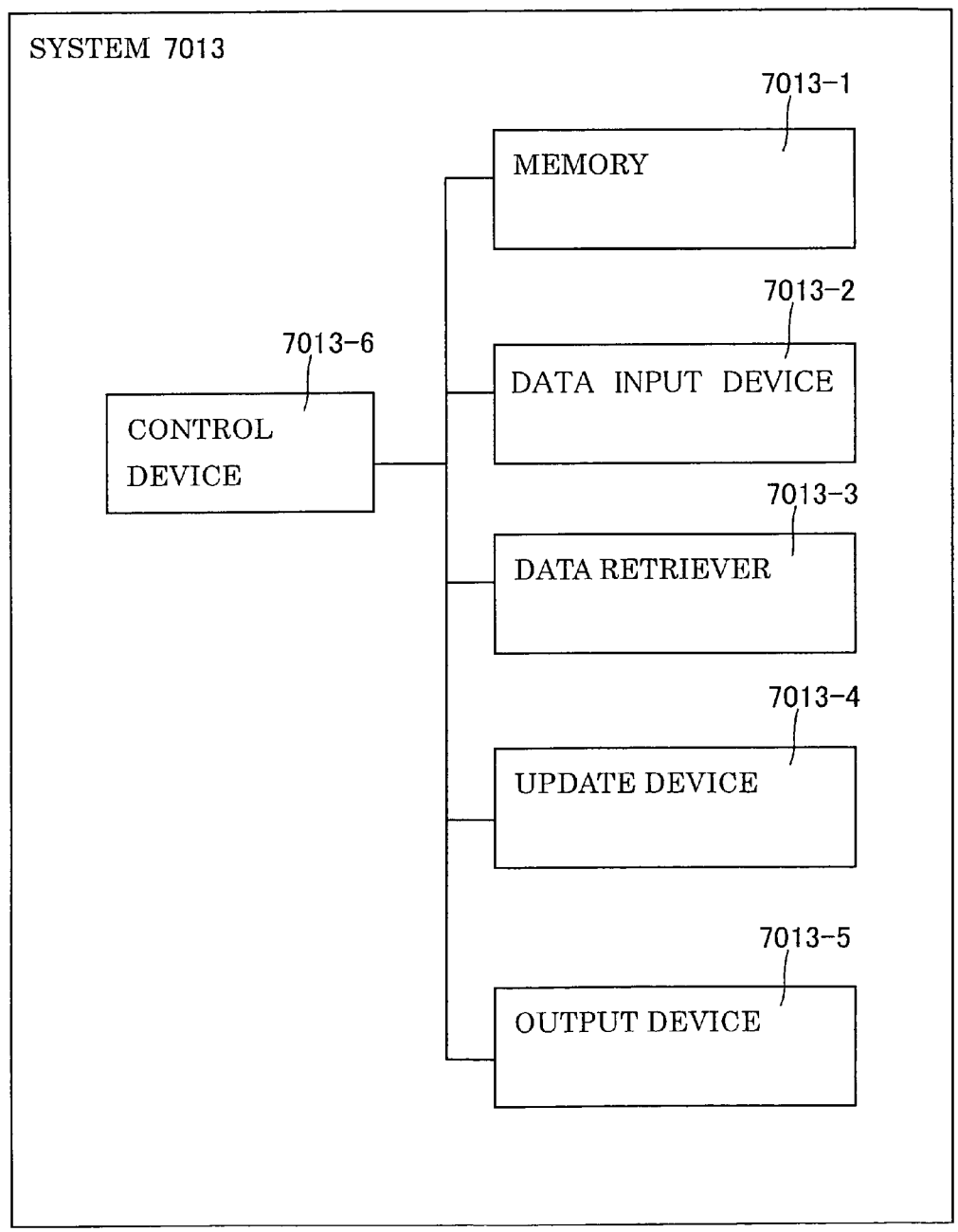
FIG. 45 is a schematic diagram showing a system for granting access to selected of the library of multimedia according to the present invention.

FIG. 45 shows a system 7013 for granting access to selected of the library of multimedia LIM, which may be is incorporated with the information management device 7012 to form a content and information management station 7014 as shown in FIG. 42. The system 7013 includes:

a memory 7013-1 for storing the library of multimedia LIM and a content permission information associated with each content in the library of multimedia LIM;

a data input device 7013-2 for entering a set of attributes for the multimedia stored in the memory 7013-1;

a data retriever 7013-3 for retrieving information about a particular medium of the library LIM in accordance with the entered set of attributes;

an update device 7013-4 for updating the retrieved information about the particular medium of the library LIM, if necessary; and an output device 7013-5 for providing the retrieved information or the updated information if it were updated in accordance with the content permission information.

The update device 7013-4 in the system 7013 is capable of updating the content permission information stored in the memory 7013-1.

The update device 7013-4 in the system 7013 may be configured so as to be only operable by at least one claimant of each of the rights associated with a particular content of the library of multimedia LIM.

Figure 46:
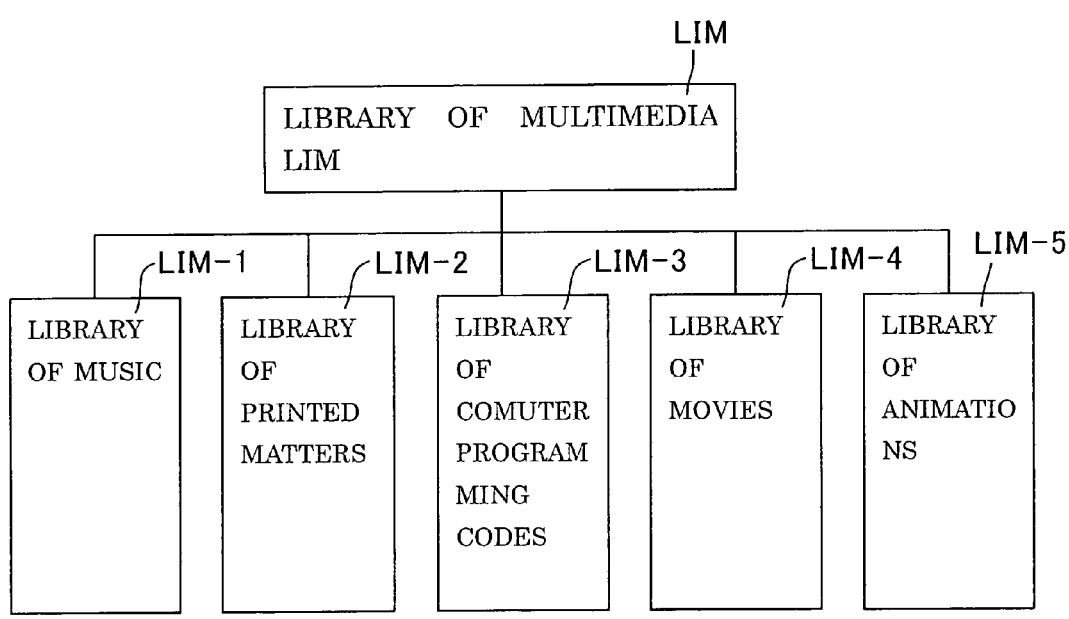
FIG. 46 is a schematic diagram showing a library of multimedia according to the present invention.

The library LIM, as shown in FIG. 46, is any one of or a combination of two or more of:
 a) a library of music LIM-1;
 b) a library of printed matters LIM-2, said printed matter including books, magazines, newspapers, any types of journals;
 c) a library of computer programming codes LIM-3, said computer programming codes including open source codes and/or closed source codes to be used for producing a computer program;
 d) a library of movies LIM-4; and
 e) a library of animations LIM-5.

The personal information according to the present invention comprises:
 a) fixed personal information, the fixed personal information including a name, a date of birth, and a sex of the user; and
 b) variable personal information, the variable personal information including an age, an occupation, a status of marriage, a dependent (if applicable), an annual income, and a preference of the user.

Figure 47:
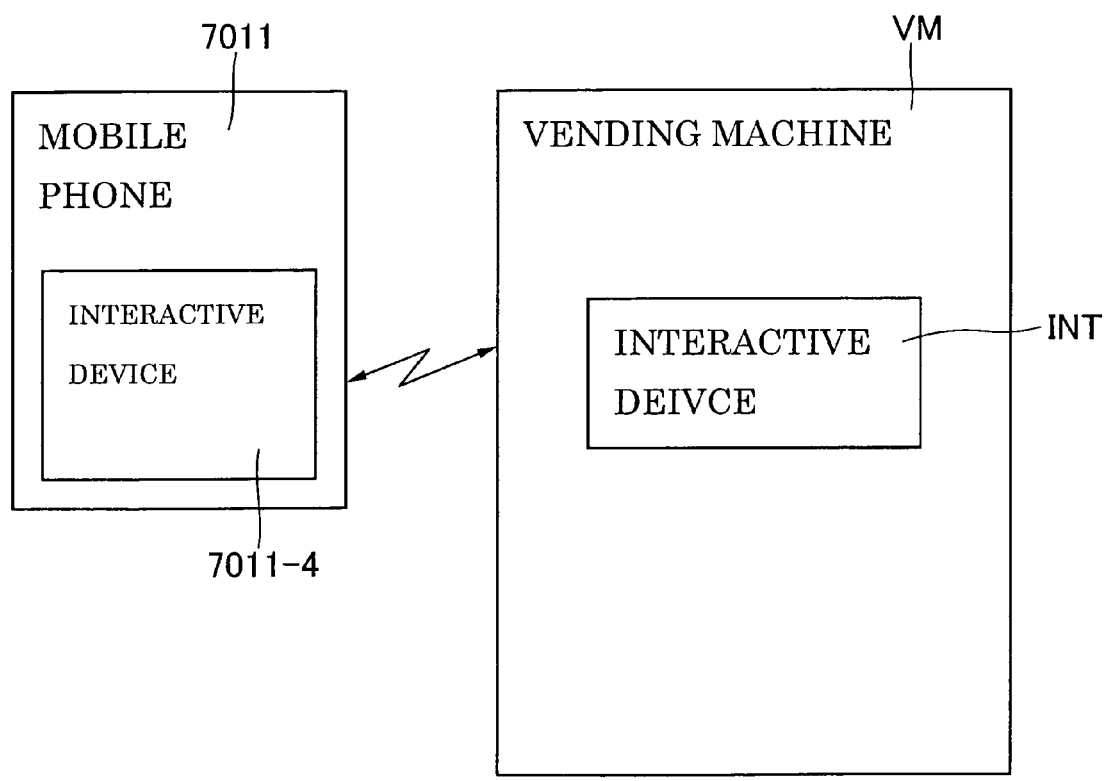
FIG. 47 is a schematic diagram showing another embodiment of the present invention.

In another embodiment of the present invention, as shown in FIG. 47, the system 7010 may be configured such that the terminal device 7011 may be in the form of the mobile phone, the PDA, the notebook type computer, or the desktop type computer, while the information management device 7012 may be incorporated in a form of an information management center or station, which communicates with the terminal device 7011 through a broadband communication scheme, an Internet, or any other means for communication available at the present time or to be available near future.

The permission information is a Privacy Information Use Permission (PIUP), the PIUP comprises:
 a) permitted privacy information described with privacy information identification (ID);
 b) permitted relations described with a user ID and a trader ID; and
 c) permitted conditions described with user permission codes The content permission information according to the present invention is Content Use Permission (CUP), wherein the CUP comprises:
 a) permitted content described with content identification (ID);
 b) permitted relation described with right holder ID, trader ID and consumer ID; and
 c) permitted conditions described with content permission codes.

The permitted conditions according to the present invention include intellectual property rights associated with the permitted content.

(1) Content Use Permission (CUP) from the right holders to the traders concerned, and then to the end-consumers (end-user);
 (1-a) Permitted content described with the content ID
 (1-b) Permitted relations
  Sponsor Classifications described with the right holder ID, the trader ID and the consumer ID
 (1-c) Permitted condition(s) described with the Content Permission Codes (include a duration)

(2) Privacy Information Use Permission (PIUP) from the consumers to the traders concerned, and then to the rights holders;
(2-a) Permitted privacy information described with the privacy information ID
(2-b) Permitted relation
Sponsor Accept/Non-Accept Classifications described with the consumer ID and the trader ID
(2-c) Permitted condition(s) described with the User Permission Codes (include duration)
The above-mentioned Privacy Information ID includes:
1) Photo Data: It can be described as IFJP01xxxxxxxxxxxx defined by the content ID schema, where "x" indicates any numerical number or alphabetical character or a combination thereof.
2) Audio Data (or AudioVisual Data): It can be described as SO or VOJP
3) Attribution Data: It can be described as TIJPyyyyyyyyyy defined by the content ID schema, where "y" indicates any numerical number or alphabetical character or a combination thereof.
   (3-a) Basics
      (3-a-1) Name
      (3-a-2) Birth date
      (3-a-3) Address
      (3-a-4) Gender
      (3-a-5) Single/Married
      (3-a-6) Children
      (3-a-7) Highest Education
      (3-a-8) Occupation
   (3-b) Variable basics
      (3-b-1) Income
      (3-b-2) Debts
      (3-b-3) Main Bank
      (3-b-4) Credit Card
      (3-b-5) Recent Activities
         (3-b-5-1) Travel
         (3-b-5-2) Career up
   (3-c) Options
      (3-c-1) Hobby
         (3-c-1-1) Sports
         (3-c-1-2) Music
         (3-c-1-3) Movie
         (3-c-1-4) Arts
      (3-c-2) Interests
         (3-c-2-1) Religion
         (3-c-2-2) Politics
      (3-c-3) Favorites The above-mentioned "User Permission Codes" consist of:
  (a) <Permission to Privacy Information>
    (a-1) Accept
    (a-2) Not Accept
  (b) <Permission Condition>If "Accept" is selected in (a)
    (b-1) Open [No Condition specified by a customer]
    (b-2) Closed [Under Certain Condition(s) specified by a customer]
  (c) <Charging Classification>
    (c-1) Charged
    (c-2) Free (of Charge)
  (d) <Sponsor Accept/Non-Accept Classification>
    (d-1) Non-Accept
    (d-2) Accept
      (d-2-1) Advertisement Accepted
        (d-2-1-1) Audit with Synchronized Enforcement
        (d-2-1-2) Advanced Audit
        (d-2-1-3) Posted Audit
        (d-2-1-4) Time Option
        (d-2-1-5) Blanket
      (d-2-2) Premier Accepted
      (d-2-3) Coupon Accepted
      (d-2-4) Privacy Information Disclosure Models
        Note:
  (e) <Information Disclosure Classification>
    (e-1) Personal Information Disclosure
    (e-2) Family Information Disclosure
  (f) <Fixed Personal Information Determination Element(s)>
    (f-1) Name (First & Last)
    (f-2) Date of Birth
    (f-3) Sex
  (g) <Variable Personal Information Determination Element(s)>
    (g-1) Age
    (g-2) Occupation
      (g-2-1) Position
    (g-3) Single/Married
    (g-4) Dependent(s)
    (g-5) Annual Income
    (g-6) Preference (Liking)
  (h) <Condition(s)>If "Closed" is selected in (b)
    [Closed] Condition(s)::
    (h-1) names of traders, agencies;
    (h-2) genre of services, products
    (h-3) Specified time (duration)
    (h-4) Specified period (duration)
    (h-5) Permit All Advertisements
    (h-6) Permit Only Ads matched with any one of the above
    (h-7) with Charge(s) (for supplying the PI)
    (h-8) No Charge (for supplying the PI)
    (h-9) Trading with the requested items (contents)
    (h-10) others
  (i) <Update Classification>
    (i-1) Annual
    (i-2) Irregular In the following, with reference to a flow diagram of FIG. 48, a first embodiment of an operation of the system for granting permission of user's personal information to the third party shown in FIG. 42 will be described in a concrete manner.

A consumer (i.e., a user) CON likes to listen to music through radio programs which are broadcast from FM/AM radio stations, so he has purchased a particular type of a mobile phone (i.e., a terminal device) 7011 equipped with a click radio device (i.e., a receiving device) 7011-3 which is adapted to receive radio programs broadcast from FM/AM radio stations, and which is also capable of downloading music into a memory 7011-2 (or any applicable equipments) installed in the mobile phone 7011.

In order to activate the click radio device 7011-3, the consumer CON is required to pre-register his personal information (STEP Y1), so that the consumer CON clicks a function key provided in the mobile phone 7011 to display a pull-down menu PDM on a display device 7011-5 of the mobile phone 7011 (STEP Y2). In the menu PDM the consumer CON selects a "Register Form" RF (STEP Y3), and enters his personal information for each items of he "Register Form" RF in accordance with the guidelines indicated on the menu PDM (STEP Y4).

After having filled out all items of the "Register Form" RF, the consumer CON clicks the "Completed" button displayed in the menu PDM (STEP Y5), thereby the data of consumer CON's personal information is stored in the memory 7011-2 of the mobile phone 7011 as the data of "Privacy Information Use Permission (PIUP)" of the consumer CON (STEP Y6). At the same time, in response thereto, the message of "Now You Can Utilize The Click Radio Device. Thank You." is displayed on the display device 7011-5 of the mobile phone 11 for the consumer CON (STEP Y7).

While the consumer CON is listening to a FM radio program "XX" broadcast from one of the FM radio stations through the click radio device 7011-3 of the mobile phone 7011, an announcement from the FM radio program "XX" has just broadcast, indicating that any listener to the FM radio program "XX" is enable to download any favorite music of predetermined numbers (e.g., five music) that are being played in the FM radio program "XX" into either a web-jukebox service provided on the website of the FM radio program "XX" or into the memory 7011-2 of the mobile phone 11 as desired by the consumer, absolutely free of charge (STEP Y8).

In so doing, the consumer permits an AD agency "H" to access to his personal information, i.e., "PIUP" stored in the memory 7011-2 of the mobile phone 7011 (STEP Y9). Reviewing this condition and other regulations posted on the website of the FM radio program "XX", the consumer CON has decided to permit the AD agency "H" to access to his "PIUP" stored in the memory 7011-2 of the mobile phone 7011 (STEP Y10).

When a request of accessing to his "PIUP" stored in the memory 7011-2 is received by the request receiving device 7012-1 of the information management device (IMD) 7012, the evaluation device 7012-2 of the IMD 7012 evaluates whether or not the request received by the request receiving device 7012-1 is the request of accessing to the "PIUP" of the consumer CON from the AD agency "H" permitted by the consumer CON (STEP Y11). If it is the request of accessing to the "PIUP" of the consumer CON from the AD agency "H" in accordance with a result of the evaluation by the evaluation device 7012-2 (STEP Y12), then the output device 7012-3 of the IMD 7012 provides the "PIUP" of the consumer CON stored in the memory 7011-2 of the mobile telephone 7011 to the AD agency "H" (STEP Y13).

Once having received the "PIUP" of the consumer CON (STEP Y14), the AD agency "H" may transmit one or more of the targeted advertisements (ADs) of the sponsor or sponsors of the FM radio program "XX" to the mobile phone 11 of the consumer CON in accordance with the conditions indicated in the "PIUP" (STEP Y15).

In the "PIUP" the consumer CON indicates that he likes to smoke a cigarette, and he is actually a heavy smoker as he consumes 5 packs of "Mild Seven" (1 pack contains 20 cigarettes) a day (STEP Y16). Since one of the FM program "XX" 's sponsors is the JT (Japan Tobacco Co., Ltd.), the AD agency "H" has transmitted the targeted AD of the "Mild Seven" from the JT to the consumer CON (STEP Y17). As a result, the consumer CON receives a targeted AD from the JT by the receiving device 7011-3 of the mobile phone 7011 (STEP Y18), and then the targeted AD received by the receiving device 11-3 is displayed on the display device 7011-5 of the mobile phone 7011 (STEP Y19).

Once the AD has been transmitted to the mobile phone 7011 of the consumer CON, he can download his favorite five songs from the FM program "XX" by just clicking the click radio device 7011-3 whenever the songs are playing on air (STEP Y20). If his favorite song is playing in the middle, the mobile phone 7011 enables to record the attributes of that song instantaneously into the memory 7011-2 by clicking the appropriate button on the click radio device 7011-3 (STEP Y21). Then, at a later time, it enables to download that song from the library of music LIM-1 through the system 7013 in accordance with the recorded attributes of that song, and then to store that song into the memory 7011-2 of the mobile phone 7011 (STEP Y22).

The following is another embodiment of the operation of the system according to the present invention, and only the description thereof is provided below since the above-described operation is applicable thereto in principle.

In the meantime, in the AD received from the JT, a campaign of the "Mild Seven" is shown, which announces that "when purchasing one pack of the "Mild Seven" from a vending machine using a mobile phone with a pre-registered "PIUP" of a consumer, a 10-point coupon is obtainable, and when the total of 1000 points are accumulated by collecting the coupons, then the consumer can download any five songs from the "JT's Miles Davis Jazz Collections", a website of which can be accessed through the Internet, into his desired medium such as a MD, for free".

Watching this AD on the display device 7011-5 of the mobile phone 7011, the consumer CON has decided to collect the coupons that are necessary to download his favorite five songs from the "JT's Miles Davis Jazz Collections" into a Smart Card as his desired medium, which is configured as an attachable/detachable to the mobile phone 7011.

Figure 48D:
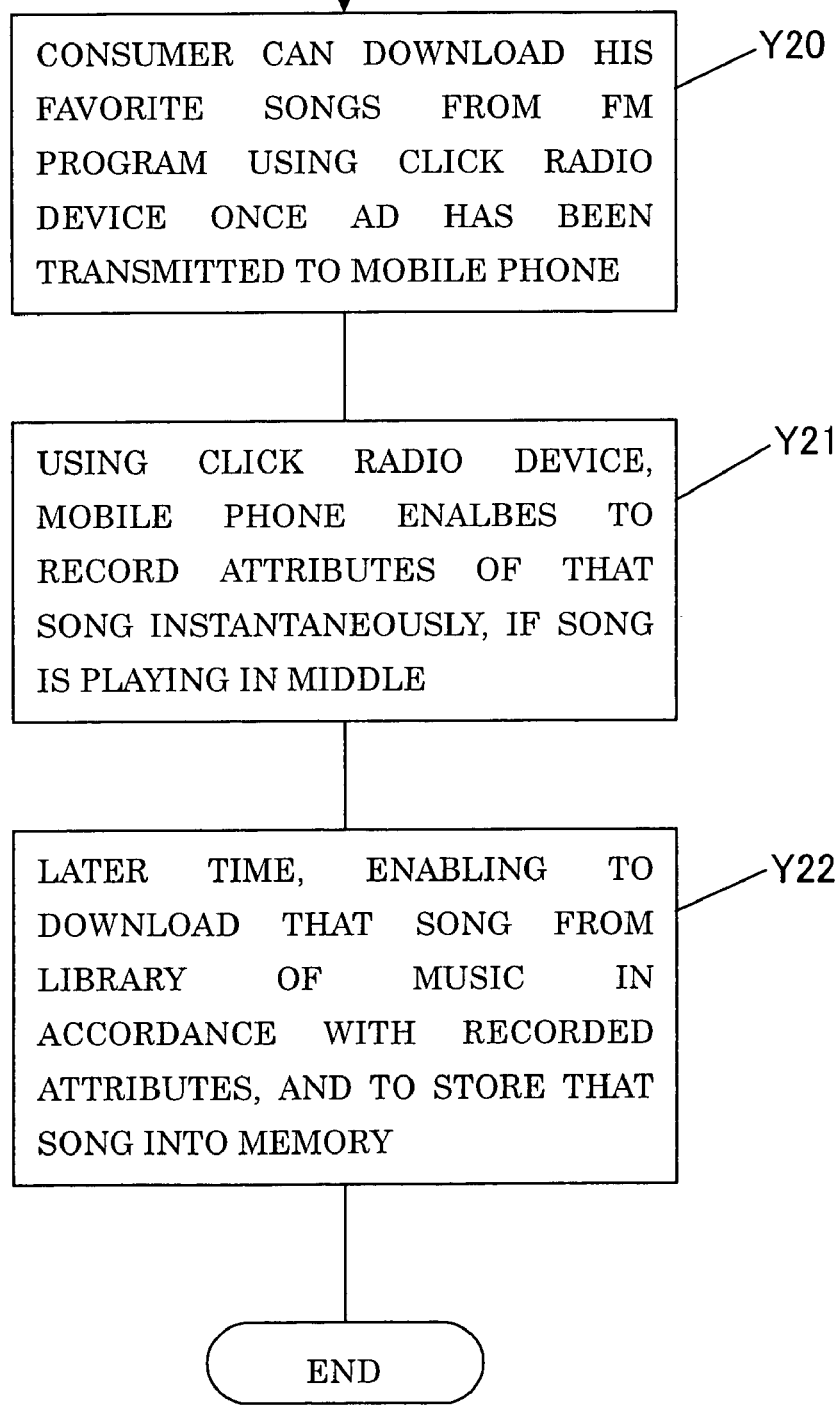

As the consumer CON is walking toward a park in the vicinity of his home, he stops by a cigarette vending machine VM on the way. As shown in FIG. 48, the cigarette vending machine VM is equipped with an interactive device INT which interacts with the interactive device 7011-4 of the mobile phone 7011 when the mobile phone 7011 is placed near the interactive device INT of the vending machine VM.

By interacting with the interactive device 7011-4 of the mobile phone 7011, the interactive device INT in the vending machine VM identifies a status (eligibility) of the consumer CON for purchasing a cigarette (in particular, his age) and evaluates the consumer CON 's preference for cigarette (i.e., "Mild Seven" in this case) in accordance with the "PIUP" stored in the memory 7011-2 of the mobile telephone 7011. Then the cigarette vending machine VM vends one pack of the "Mild Seven" when the consumer CON has deposited or inserted an proper amount of coins or bill for the pack into the vending machine VM while the interactive device INT in the vending machine VM issues a 10 point coupon to the mobile phone 7011. The above-mentioned deposition process may be performed in a different manner. That is, it may be configured to charge the cost for purchasing the pack of "Mild Seven" into the account of the consumer CON, which can be used as the account for withdrawing a payment of the mobile phone 7011's use by the consumer CON.

In the meantime, the interactive device INT in the vending machine VM also transmits to the JT information indicating that the consumer CON has purchased one pack of "Mild Seven" through the vending machine VM located near the park.

The interactive device 7011-4 of the mobile phone 7011 receives the 10 point coupon from the interactive device INT of the vending machine VM and stores it into the memory 7011-2 of the mobile telephone 7011.

When the consumer CON has collected the sufficient amount of coupons, i.e., 1000 point or more coupons into the memory 7011-2 of the mobile phone 7011 in the similar manner described above, he accesses to the website of the "JT's Miles Davis Jazz Collections" and selects his favorite five songs, for example, "So What", "Freddie Freeloader", "Blue in Green", "All Blues" and "Flamenco Sketches" (which constitutes the famous album "Kind of Blue" of Miles Davis and his group) from the menu of "JT's Miles Davis Jazz Collections" listed on the website and downloads them into the Smart Card attached to the mobile phone 7011.

Using the sub-system 7013, the JT has obtained the permissions of using the substantial numbers of the Miles Davis' music collections from the rights holders thereof in advance, and the Miles Davis' music collections may form the library of music LIM-1MD.

In the meantime, the update device 7012-4 is capable of updating the conditions and/or information in the "PIUP" of the consumer CON whenever it is necessary. For example, when the consumer CON was a single (not married) at a time when registering his "PIUP", but just recently he has married with his wife "B". Then the consumer CON could update his "PIUP" using the update device 7012-4 of the information management device 7012 in the similar manner as described above.

The detailed operation of the sub-system 7013 is described in the fore-mentioned embodiments in the present application, and according it will be omitted here. In addition, although it is not described explicitly in the above-described embodiment it should be understood that the devices 7012-1 to 7012-4 of the information management device 7012 are controlled by the control device 7012-5. Similarly, it should be understood that the devices 7013-1 to 7013-5 of the system 7013 are controlled by the control device 7013-6.

The invention may be embodied in other specific forms without departing from the spirit or essential characteristics thereof. The present embodiment is therefore to be considered in all respects as illustrative and not restrictive, the scope of the invention being indicated by the appended claims rather than by foregoing description, and all changes that come within the meaning and range of equivalency of the claims are therefore intended to be embraced therein.

What is claimed is:

1. A system for purchasing a personal recording media, comprising:
    a) a first station for converting at least one data composition and a data information corresponding to said one data composition to predetermined signals, respectively, and for transmitting said signals;
    b) a card-type storage medium including a storage device and an integrated circuit;
    c) a receiving device capable of attaching/detaching said card-type storage medium, and of enabling a user to sense said data composition by receiving said signal transmitted from said first station, and of selectively storing into said storage device of said card-type storage medium, by a predetermined operation, data information corresponding to said data composition being transmitted when said card-type storage medium is attached thereto;
    d) a second station including an entering device capable of attaching/detaching said card-type storage medium into which said data information is stored, and of reading an identification information stored in said storage device of said card-type storage medium when said card-type storage medium is attached thereto, and of reading said data information stored in said storage device of said card-type storage medium;
    e) a third station connected to said second station and including a data composition information storage means for storing a plurality of data composition information, said third station being capable of:
        1) identifying whether or not a user of said system is an authorized user based on said identification information,
        2) reading said data composition information associated with said data information by retrieving data composition information from said data composition information storage means based on said data information entered with said entering means, and
        3) recording said data composition information read from said data composition information storage means into a predetermined recording medium, and
        4) implementing a predetermined accounting process based on an accounting information stored in said card-type storage medium, regarding said recording medium into which said data composition information is recorded,
    wherein a data information corresponding to said data composition is stored into said card-type storage medium by a predetermined operation when a user is sensing said data composition being transmitted from said first station, and
    said user can purchase said recording medium into which at least one desired data composition is recorded, by inserting said card-type storage medium of which said data information is stored therein into a predetermined entering means at said second station.

2. A system according to claim 1, wherein said third station includes:
    1) an identification means for identifying whether or not said user is an authorized user based on said identification information entered with said entering means of said second station;
    2) a data composition information reading means for reading said data composition information associated with said data information by retrieving said plurality of data composition information in said data composition information storage means based on said data information entered with said entering means;
    3) a data information recording means connected to said data composition information reading means, for recording said data composition information read from said data composition information storage means into a predetermined recording medium; and
    4) means for implementing a predetermined accounting process based on an accounting information stored in said card-type storage medium regarding said recording medium into which said data composition information is recorded.

3. A system according to claim 1, further comprising:
    f) a rights-associated information storage means for storing information associated with a copyright and other rights associated with at least one data composition;
    g) an input/output means for inputting/outputting said data composition information;
    h) a data composition information registration means for registering and storing said data composition information inputted with said input/output means into said data composition information storage means;
    i) a rights-associated information retrieval and discrimination means for retrieving and discriminating a rights-associated information regarding said data composition information registered in said data composition information registration means from said rights-associated information storage means based on a data composition to be used;
    j) an account and royalty determination means for determining an account for a user of said data composition and for determining a royalty for a rights owner of said data composition based on said rights-associated information and said accounting information discriminated by said rights-associated information retrieval and discrimination means; and k) means for informing said account determined by said account and royalty determination means to said user of said musical composition, and for informing said royalty determined by said account and royalty determination means to said rights owner of said data composition.

4. A system according to claim 3, further comprising:

l) a usage purpose registration means for registering an information regarding a usage purpose of said data composition to be used; and m) an account information alteration means for altering said account information based on an information regarding said usage purpose of data composition registered with said usage purpose registration means.

5. A system according to claim 4, further comprising:

n) a rights-associated information alteration means connected to said entering means and to said rights-associated information storage means, for altering said rights-associated information based on said information of data composition to be used.

6. A system according to claim 1, wherein said card-type storage medium including a storage device and an integrated circuit is a smart card.

7. A system according to claim 1, wherein said receiving device is a radio receiver.

8. A system according to claim 1, wherein said signals transmitted by said first station relate to at least one data composition and data composition information corresponding thereto for which sound was used as an information source.

9. A system according to claim 8, wherein said at least one data composition is a musical composition.

10. A system according to claim 1, wherein said receiving device is a television receiver or a personal computer receiver.

11. A system according to claim 1, wherein said signals transmitted by said first station relate to at least one data composition and data composition information corresponding thereto for which video data was used as an information source.

12. A system according to claim 11, wherein said at least one data composition is an audio visual composition.

13. A system according to claim 11, wherein said at least one data composition is chosen from among the group consisting of a musical composition, an audio composition, a video composition, an audio visual composition and a software composition.

14. A system according to claim 1, wherein said receiving device enables a user to sense said data composition being transmitted from said first station by listening to, viewing, or both listening to and viewing the transmission of said data composition.

15. A system according to claim 1, wherein said third station is further capable of forwarding said recording medium containing said data composition information recorded thereon to said user after purchase thereof.

16. A system according to claim 1, wherein said receiving device comprises a data information storage button for causing storage of data information corresponding to a data composition being transmitted into said storage device of said card-type storage medium when said card-type storage medium is attached to said receiving device, and said predetermined operation that causes the selective storage of data information corresponding to a data composition being transmitted into said storage device of said card-type storage medium is a user pressing on said button on said receiving device while said data composition is being transmitted.

17. A system for purchasing a personal recording media, comprising:

a) a first station for converting at least one data composition and a data information corresponding to said one data composition to predetermined signals, respectively, and for transmitting said signals;

b) a card-type storage medium including a storage device and an integrated circuit;

c) a receiving device capable of attaching/detaching said card-type storage medium, and of enabling a user to sense said data composition by receiving said signal transmitted from said first station, and of selectively storing into said storage device of said card-type storage medium, by a predetermined operation, data information corresponding to said data composition being transmitted when said card-type storage medium is attached thereto;

d) a second station including a data composition information storage means for storing a plurality of data composition information and an entering device capable of:

1) attaching/detaching said card-type storage medium into which said data information is stored, 2) reading an identification information stored in said storage device of said card-type storage medium when said card-type storage medium is attached thereto, and 3) reading said data information stored in said storage device of said card-type storage medium when said card-type storage medium is attached thereto, said second station being capable of reading data composition information associated with said data information stored in said storage device of said card-type storage medium by retrieving data composition information from said data composition information storage means based on said data information entered with said entering means, and recording said data composition information read from said data composition information storage means into a predetermined recording medium;

e) a third station connected to said second station, said third station being capable of:

1) identifying whether or not a user of said system is an authorized user based on said identification information, and 2) implementing a predetermined accounting process based on an accounting information stored in said card-type storage medium, regarding said recording medium into which said data composition information is recorded, wherein a data information corresponding to said data composition is stored into said card-type storage medium by a predetermined operation when a user is sensing said data composition being transmitted from said first station, and said user can purchase said recording medium into which at least one desired data composition is recorded, by inserting said card-type storage medium of which said data information is stored therein into a predetermined entering means at said second station.

18. A system according to claim 17, wherein said second station includes:
1) a data composition information reading means for reading said data composition information associated with said data information by retrieving said plurality of data composition information in said data composition information storage means based on said data information entered with said entering means; and
2) a data information recording means connected to said data composition information reading means, for recording said data composition information read from said data composition information storage means into a predetermined recording medium.

19. A system according to claim 17, wherein said third station includes:
1) an identification means for identifying whether or not said user is an authorized user based on said identification information entered with said entering means of said second station; and
2) means for implementing a predetermined accounting process based on an accounting information stored in said card-type storage medium regarding said recording medium into which said data composition information is recorded.

20. A system according to claim 17, further comprising:
f) a rights-associated information storage means for storing information associated with a copyright and other rights associated with at least one data composition;
g) an input/output means for inputting/outputting said data composition information;
h) a data composition information registration means for registering and storing said data composition information inputted with said input/output means into said data composition information storage means;
i) a rights-associated information retrieval and discrimination means for retrieving and discriminating a rights-associated information regarding said data composition information registered in said data composition information registration means from said rights-associated information storage means based on a data composition to be used;
j) an account and royalty determination means for determining an account for a user of said data composition and for determining a royalty for a rights owner of said data composition based on said rights-associated information and said accounting information discriminated by said rights-associated information retrieval and discrimination means; and
k) means for informing said account determined by said account and royalty determination means to said user of said musical composition, and for informing said royalty determined by said account and royalty determination means to said rights owner of said data composition.

21. A system according to claim 20, further comprising:
l) a usage purpose registration means for registering an information regarding a usage purpose of said data composition to be used; and
m) an account information alteration means for altering said account information based on an information regarding said usage purpose of data composition registered with said usage purpose registration means.

22. A system according to claim 21, further comprising:
n) a rights-associated information alteration means connected to said entering means and to said rights-associated information storage means, for altering said rights-associated information based on said information of data composition to be used.

23. A system according to claim 17, wherein said card-type storage medium including a storage device and an integrated circuit is a smart card.

24. A system according to claim 17, wherein said receiving device is a radio receiver.

25. A system according to claim 17, wherein said signals transmitted by said first station relate to at least one data composition and data composition information corresponding thereto for which sound was used as an information source.

26. A system according to claim 25, wherein said at least one data composition is a musical composition.

27. A system according to claim 17, wherein said receiving device is a television receiver or a personal computer receiver.

28. A system according to claim 17, wherein said signals transmitted by said first station relate to at least one data composition and data composition information corresponding thereto for which video data was used as an information source.

29. A system according to claim 28, wherein said at least one data composition is an audio visual composition.

30. A system according to claim 17, wherein said at least one data composition is chosen from among the group consisting of a musical composition, an audio composition, a video composition, an audio visual composition and a software composition.

31. A system according to claim 17, wherein said receiving device enables a user to sense said data composition being transmitted from said first station by listening to, viewing, or both listening to and viewing the transmission of said data composition.

32. A system according to claim 17, wherein said second station is further capable of dispensing said predetermined recording medium containing said data composition information recorded thereon to said user after purchase thereof.

33. A system according to claim 17, wherein said third station further includes a master data composition information storage means, said third station capable of transmitting data composition information to said data composition information storage means of said second station.

34. A system according to claim 17, wherein
said receiving device comprises a data information storage button for causing storage of data information corresponding to a data composition being transmitted into said storage device of said card-type storage medium when said card-type storage medium is attached to said receiving device, and
said predetermined operation that causes the selective storage of data information corresponding to a data composition being transmitted into said storage device of said card-type storage medium is a user pressing on said button on said receiving device while said data composition is being transmitted.

35. A system for purchasing a personal recording media, comprising:
a) a first station for converting at least one data composition and a data information corresponding to said one data composition to predetermined signals, respectively, and for transmitting said signals;
b) a second station including a receiving device and a storage device containing at least an identification information, said second station capable of enabling a user to sense said data composition by receiving said signal transmitted from said first station and of selectively storing into said storage device, by a predetermined operation, data information corresponding to said at least one data composition being transmitted;

c) a third station connected to said second station and including a data composition information storage means for storing a plurality of data composition information, said third station being capable of:
   1) identifying whether or not a user of said system is an authorized user based on said identification information,
   2) reading data composition information associated with said data information by retrieving data composition information from said data composition information storage means based on said data information received from said second station,
   3) recording said data composition information read from said data composition information storage means into a predetermined recording medium, and
   4) implementing a predetermined accounting process based on an accounting information, regarding said recording medium into which said data composition information is recorded, wherein a data information corresponding to said data composition is stored into said second station storage device by a predetermined operation when a user is sensing said data composition being transmitted from said first station, and said user can purchase said recording medium into which at least one desired data composition is recorded, by transmitting a request for a purchase from said second station to said third station.

36. A system according to claim 35, wherein said third station includes:
   1) an identification means for identifying whether or not said user is an authorized user based on said identification information stored in said storage device of said second station;
   2) a data composition information reading means for reading said data composition information associated with said data information by retrieving said plurality of data composition information in said data composition information storage means based on said data information stored in said storage device of said second station;
   3) a data information recording means connected to said data composition information reading means, for recording said data composition information read from said data composition information storage means into a predetermined recording medium; and
   5) means for implementing a predetermined accounting process based on an accounting information regarding said recording medium into which said data composition information is recorded.

37. A system according to claim 35, further comprising:
f) a rights-associated information storage means for storing information associated with a copyright and other rights associated with at least one data composition;
g) an input/output means for inputting/outputting said data composition information;
h) a data composition information registration means for registering and storing said data composition information inputted with said input/output means into said data composition information storage means;
i) a rights-associated information retrieval and discrimination means for retrieving and discriminating a rights-associated information regarding said data composition information registered in said data composition information registration means from said rights-associated information storage means based on a data composition to be used;
j) an account and royalty determination means for determining an account for a user of said data composition and for determining a royalty for a rights owner of said data composition based on said rights-associated information and said accounting information discriminated by said rights-associated information retrieval and discrimination means; and
k) means for informing said account determined by said account and royalty determination means to said user of said musical composition, and for informing said royalty determined by said account and royalty determination means to said rights owner of said data composition.

38. A system according to claim 37, further comprising:
   l) a usage purpose registration means for registering an information regarding a usage purpose of said data composition to be used; and
   m) an account information alteration means for altering said account information based on an information regarding said usage purpose of data composition registered with said usage purpose registration means.

39. A system according to claim 38, further comprising:
   n) a rights-associated information alteration means connected to said entering means and to said rights-associated information storage means, for altering said rights-associated information based on said information of data composition to be used.

40. A system according to claim 35, wherein said receiving device is a radio receiver.

41. A system according to claim 35, wherein said signals transmitted by said first station relate to at least one data composition and data composition information corresponding thereto for which sound was used as an information source.

42. A system according to claim 41, wherein said at least one data composition is a musical composition.

43. A system according to claim 35, wherein said receiving device is a television receiver or a personal computer receiver.

44. A system according to claim 35, wherein said signals transmitted by said first station relate to at least one data composition and data composition information corresponding thereto for which video data was used as an information source.

45. A system according to claim 44, wherein said at least one data composition is an audio visual composition.

46. A system according to claim 35, wherein said at least one data composition is chosen from among the group consisting of a musical composition, an audio composition, a video composition, an audio visual composition and a software composition.

47. A system according to claim 35, wherein said receiving device enables a user to sense said data composition being transmitted from said first station by listening to, viewing, or both listening to and viewing the transmission of said data composition.

48. A system according to claim 35, wherein said third station is further capable of forwarding said predetermined recording medium containing said data composition information recorded thereon to said user after purchase thereof.

49. A system according to claim 35, wherein
said receiving device comprises a data information storage button for causing storage into said storage device of said second station of data information corresponding to a data composition being transmitted, and said predetermined operation that causes the selective storage into said storage device of said second station of data information corresponding to a data composition being transmitted is a user pressing on said button on said receiving device while said data composition is being transmitted.

50. A system according to claim 35, wherein said receiving device comprises a monitor screen capable of displaying a visual indication to said user that data information corresponding to a data composition being transmitted is available for storage into said storage device of said second station, and said predetermined operation that causes the selective storage into said storage device of said second station of data information corresponding to a data composition being transmitted is a user performing a predetermined operation on said monitor screen while said data composition is being transmitted.

51. A system for purchasing a personal recording media, comprising:

a) a first station for converting at least one data composition and a data information corresponding to said one data composition to predetermined signals, respectively, and for transmitting said signals;

b) a second station including a receiving device, a data composition information storage means for storing a plurality of data composition information, and a storage device containing at least an identification information, said second station capable of enabling a user to sense said data composition by receiving said signal transmitted from said first station and of selectively storing into said storage device, by a predetermined operation, data information corresponding to said at least one data composition being transmitted, said second station being further capable of reading data composition information associated with said data information stored in said storage device by retrieving data composition information from said data composition information storage means based on said data information stored in said storage device, and recording said data composition information read from said data composition information storage means into a predetermined recording medium;

c) a third station connected to said second station and including a data composition information storage means for storing a plurality of data composition information, said third station being capable of:

1) identifying whether or not a user of said system is an authorized user based on said identification information, 2) implementing a predetermined accounting process based on an accounting information, regarding said recording medium into which said data composition information is recorded;

wherein a data information corresponding to said data composition is stored into said second station storage device by a predetermined operation when a user is sensing said data composition being transmitted from said first station, and said user can purchase said recording medium into which at least one desired data composition is recorded, by transmitting a request for a purchase from said second station to said third station.

52. A system according to claim 51, wherein said second station includes:

1) a data composition information reading means for reading said data composition information associated with said data information by retrieving said plurality of data composition information in said data composition information storage means based on said data information stored in said storage device of said second station; and 2) a data information recording means connected to said data composition information reading means, for recording said data composition information read from said data composition information storage means into a predetermined recording medium.

53. A system according to claim 51, wherein said third station includes:

1) an identification means for identifying whether or not said user is an authorized user based on said identification information stored in said storage device of said second station; and 2) means for implementing a predetermined accounting process based on an accounting information regarding said recording medium into which said data composition information is recorded.

54. A system according to claim 51, further comprising:

f) a rights-associated information storage means for storing information associated with a copyright and other rights associated with at least one data composition;

g) an input/output means for inputting/outputting said data composition information;

h) a data composition information registration means for registering and storing said data composition information inputted with said input/output means into said data composition information storage means;

i) a rights-associated information retrieval and discrimination means for retrieving and discriminating a rights-associated information regarding said data composition information registered in said data composition information registration means from said rights-associated information storage means based on a data composition to be used;

j) an account and royalty determination means for determining an account for a user of said data composition and for determining a royalty for a rights owner of said data composition based on said rights-associated information and said accounting information discriminated by said rights-associated information retrieval and discrimination means; and k) means for informing said account determined by said account and royalty determination means to said user of said musical composition, and for informing said royalty determined by said account and royalty determination means to said rights owner of said data composition.

55. A system according to claim 54, further comprising:

l) a usage purpose registration means for registering an information regarding a usage purpose of said data composition to be used; and m) an account information alteration means for altering said account information based on an information regarding said usage purpose of data composition registered with said usage purpose registration means.

56. A system according to claim 55, further comprising:

n) a rights-associated information alteration means connected to said entering means and to said rights-associated information storage means, for altering said rights-associated information based on said information of data composition to be used.

57. A system according to claim 51, wherein said receiving device is a radio receiver.

58. A system according to claim 51, wherein said signals transmitted by said first station relate to at least one data composition and data composition information corresponding thereto for which sound was used as an information source.

59. A system according to claim 58, wherein said at least one data composition is a musical composition.

60. A system according to claim 51, wherein said receiving device is a television receiver or a personal computer receiver.

61. A system according to claim 51, wherein said signals transmitted by said first station relate to at least one data composition and data composition information corresponding thereto for which video data was used as an information source.

62. A system according to claim 51, wherein said at least one data composition is an audio visual composition.

63. A system according to claim 51, wherein said at least one data composition is chosen from among the group consisting of a musical composition, an audio composition, a video composition, an audio visual composition and a software composition.

64. A system according to claim 51, wherein said receiving device enables a user to sense said data composition being transmitted from said first station by listening to, viewing, or both listening to and viewing the transmission of said data composition.

65. A system according to claim 51, wherein said second station is further capable of dispensing said predetermined recording medium containing said data composition information recorded thereon to said user after purchase thereof.

66. A system according to claim 51, wherein
said receiving device comprises a data information storage button for causing storage into said storage device of said second station of data information corresponding to a data composition being transmitted, and
said predetermined operation that causes the selective storage into said storage device of said second station of data information corresponding to a data composition being transmitted is a user pressing on said button on said receiving device while said data composition is being transmitted.

67. A system according to claim 51, wherein
said receiving device comprises a monitor screen capable of displaying a visual indication to said user that data information corresponding to a data composition being transmitted is available for storage into said storage device of said second station, and
said predetermined operation that causes the selective storage into said storage device of said second station of data information corresponding to a data composition being transmitted is a user performing a predetermined operation on said monitor screen while said data composition is being transmitted.

68. A system for purchasing a personal recording media, comprising:
a) a first station for converting at least one data composition and a data information corresponding to said one data composition to predetermined signals, respectively, and for transmitting said signals;
b) a card-type storage medium including a storage device and an integrated circuit;
c) a receiving device capable of attaching/detaching said card-type storage medium, and of enabling a user to sense said data composition by receiving said signal transmitted from said first station, and of selectively storing into said storage device of said card-type storage medium, by a predetermined operation, data information corresponding to said data composition being transmitted when said card-type storage medium is attached thereto,
said receiving device comprising a data information storage button for causing storage, into said storage device of said card-type storage medium, of data information corresponding to a data composition being transmitted when said card-type storage medium is attached to said receiving device;
d) a second station including an entering device capable of attaching/detaching said card-type storage medium into which said data information is stored, and of reading an identification information stored in said storage device of said card-type storage medium when said card-type storage medium is attached thereto, and of reading said data information stored in said storage device of said card-type storage medium;
e) a third station connected to said second station and including a data composition information storage means for storing a plurality of data composition information, said third station being capable of:
1) identifying whether or not a user of said system is an authorized user based on said identification information,
2) reading said data composition information associated with said data information by retrieving data composition information in from said data composition information storage means based on said data information entered with said entering means, and
3) recording said data composition information read from said data composition information storage means into a predetermined recording medium, and
4) implementing a predetermined accounting process based on an accounting information stored in said card-type storage medium, regarding said recording medium into which said data composition information is recorded,
wherein a data information corresponding to said data composition is stored into said card-type storage medium by a predetermined operation when a user is sensing said data composition being transmitted from said first station, said predetermined operation being a user pressing on said button on said receiving device while said data composition is being transmitted, and
said user can purchase said recording medium into which at least one desired data composition is recorded, by inserting said card-type storage medium of which said data information is stored therein into a predetermined entering means at said second station.

69. A system for purchasing a personal recording media, comprising:
a) a first station for converting at least one data composition and a data information corresponding to said one data composition to predetermined signals, respectively, and for transmitting said signals;
b) a card-type storage medium including a storage device and an integrated circuit;
c) a receiving device capable of attaching/detaching said card-type storage medium, and of enabling a user to sense said data composition by receiving said signal transmitted from said first station, and of selectively storing into said storage device of said card-type storage medium, by a predetermined operation, data information corresponding to said data composition being transmitted when said card-type storage medium is attached thereto, said receiving device comprising a data information storage button for causing storage, into said storage device of said card-type storage medium, of data information corresponding to a data composition being transmitted when said card-type storage medium is attached to said receiving device;

d) a second station including a data composition information storage means for storing a plurality of data composition information and an entering device capable of:
  1) attaching/detaching said card-type storage medium into which said data information is stored,
  2) reading an identification information stored in said storage device of said card-type storage medium when said card-type storage medium is attached thereto, and
  3) reading said data information stored in said storage device of said card-type storage medium when said card-type storage medium is attached thereto, said second station being capable of reading data composition information associated with said data information stored in said storage device of said card-type storage medium by retrieving data composition information from said data composition information storage means based on said data information entered with said entering means, and recording said data composition information read from said data composition information storage means into a predetermined recording medium;

e) a third station connected to said second station, said third station being capable of:
  1) identifying whether or not a user of said system is an authorized user based on said identification information, and
  2) implementing a predetermined accounting process based on an accounting information stored in said card-type storage medium, regarding said recording medium into which said data composition information is recorded, wherein a data information corresponding to said data composition is stored into said card-type storage medium by a predetermined operation when a user is sensing said data composition being transmitted from said first station, said predetermined operation being a user pressing on said button on said receiving device while said data composition is being transmitted, and said user can purchase said recording medium into which at least one desired data composition is recorded, by inserting said card-type storage medium of which said data information is stored therein into a predetermined entering means at said second station.

70. A system for purchasing a personal recording media, comprising:
  a) a first station for converting at least one data composition and a data information corresponding to said one data composition to predetermined signals, respectively, and for transmitting said signals;
  b) a second station including a receiving device and a storage device containing at least an identification information, said second station capable of enabling a user to sense said data composition by receiving said signal transmitted from said first station and of selectively storing into said storage device, by a predetermined operation, data information corresponding to said at least one data composition being transmitted, said receiving device comprising a data information storage button for causing storage, into said storage device of said card-type storage medium, of data information corresponding to a data composition being transmitted when said card-type storage medium is attached to said receiving device;

c) a third station connected to said second station and including a data composition information storage means for storing a plurality of data composition information, said third station being capable of:
  1) identifying whether or not a user of said system is an authorized user based on said identification information,
  2) reading data composition information associated with said data information by retrieving data composition information from said data composition information storage means based on said data information received from said second station,
  3) recording said data composition information read from said data composition information storage means into a predetermined recording medium, and
  4) implementing a predetermined accounting process based on an accounting information, regarding said recording medium into which said data composition information is recorded, wherein a data information corresponding to said data composition is stored into said second station storage device by a predetermined operation when a user is sensing said data composition being transmitted from said first station, said predetermined operation being a user pressing on said button on said receiving device while said data composition is being transmitted, and said user can purchase said recording medium into which at least one desired data composition is recorded, by transmitting a request for a purchase from said second station to said third station.

71. A system for purchasing a personal recording media, comprising:
  a) a first station for converting at least one data composition and a data information corresponding to said one data composition to predetermined signals, respectively, and for transmitting said signals;
  b) a second station including a receiving device, a data composition information storage means for storing a plurality of data composition information, and a storage device containing at least an identification information, said second station capable of enabling a user to sense said data composition by receiving said signal transmitted from said first station and of selectively storing into said storage device, by a predetermined operation, data information corresponding to said at least one data composition being transmitted, said receiving device comprising a data information storage button for causing storage, into said storage device of said card-type storage medium, of data information corresponding to a data composition being transmitted when said card-type storage medium is attached to said receiving device, said second station being further capable of reading data composition information associated with said data information stored in said storage device by retrieving data composition information from said data composition information storage means based on said data information stored in said storage device, and recording said data composition information read from said data composition information storage means into a predetermined recording medium;

c) a third station connected to said second station and including a data composition information storage means for storing a plurality of data composition information, said third station being capable of:
  1) identifying whether or not a user of said system is an authorized user based on said identification information,
  2) implementing a predetermined accounting process based on an accounting information, regarding said recording medium into which said data composition information is recorded;

wherein a data information corresponding to said data composition is stored into said second station storage device by a predetermined operation when a user is sensing said data composition being transmitted from said first station, said predetermined operation being a user pressing on said button on said receiving device while said data composition is being transmitted, and said user can purchase said recording medium into which at least one desired data composition is recorded, by transmitting a request for a purchase from said second station to said third station.

* * * * *

UNITED STATES PATENT AND TRADEMARK OFFICE
CERTIFICATE OF CORRECTION

PATENT NO.       : 7,032,819 B2                                       Page 1 of 1
APPLICATION NO.  : 10/899179
DATED            : April 25, 2006
INVENTOR(S)      : Takahito Iida and Nicholas Givotovsky It is certified that error appears in the above-identified patent and that said Letters Patent is hereby corrected as shown below:

On the cover page, in item (75) Inventors, delete the second inventor Nicholas Givotovsky.

Signed and Sealed this

Second Day of September, 2008

JON W. DUDAS
*Director of the United States Patent and Trademark Office*